US008862248B2

(12) United States Patent
Yasui

(10) Patent No.: US 8,862,248 B2
(45) Date of Patent: Oct. 14, 2014

(54) CONTROL APPARATUS

(75) Inventor: Yuji Yasui, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 530 days.

(21) Appl. No.: 13/289,062

(22) Filed: Nov. 4, 2011

(65) Prior Publication Data

US 2012/0116545 A1  May 10, 2012

(30) Foreign Application Priority Data

Nov. 4, 2010 (JP) ................. 2010-247340

(51) Int. Cl.

| G05B 13/02 | (2006.01) |
| G05B 11/01 | (2006.01) |
| B60W 10/04 | (2006.01) |
| B60W 10/10 | (2012.01) |
| G06F 7/00 | (2006.01) |
| G06F 17/00 | (2006.01) |
| G06F 19/00 | (2011.01) |

(52) U.S. Cl.
CPC ...... G05B 13/42 (2013.01); G05B 2219/25298 (2013.01)
USPC ............... 700/28; 700/29; 700/71; 700/72; 477/107; 477/110; 701/51; 701/58; 701/60; 701/104

(58) Field of Classification Search
USPC ........ 700/28–29, 71–72; 701/51, 58, 60, 104; 477/107, 110
See application file for complete search history.

(56) References Cited

U.S. PATENT DOCUMENTS

| 5,343,700 | A | * | 9/1994 | Fujimoto et al. | 60/276 |
| 5,394,322 | A | * | 2/1995 | Hansen | 700/37 |
| 5,519,605 | A | * | 5/1996 | Cawlfield | 700/31 |
| 6,097,989 | A | * | 8/2000 | Maki et al. | 700/52 |
| 6,684,150 | B2 | * | 1/2004 | Yasui et al. | 701/106 |
| 6,840,214 | B2 | * | 1/2005 | Yasui | 123/344 |
| 7,024,336 | B2 | * | 4/2006 | Salsbury et al. | 702/182 |
| 7,409,283 | B2 | * | 8/2008 | Yasui | 701/106 |
| 7,505,877 | B2 | * | 3/2009 | Salsbury | 703/2 |
| 8,140,174 | B2 | * | 3/2012 | Yasui | 700/31 |
| 2003/0125865 | A1 | * | 7/2003 | Yasui | 701/109 |
| 2003/0153990 | A1 | * | 8/2003 | Boiko | 700/37 |
| 2006/0103339 | A1 | * | 5/2006 | Yamada et al. | 318/623 |
| 2006/0173604 | A1 | * | 8/2006 | Yasui et al. | 701/103 |
| 2012/0095658 | A1 | * | 4/2012 | Yasui | 701/60 |

FOREIGN PATENT DOCUMENTS

| EP | 0 899 441 A2 | 3/1999 |
| EP | 1 045 124 A2 | 10/2000 |
| EP | 1 293 851 A1 | 3/2003 |
| JP | 2000-234550 A | 8/2000 |
| JP | 2006-118428 A | 5/2006 |

* cited by examiner

Primary Examiner — Ronald Hartman, Jr.
(74) Attorney, Agent, or Firm — Mori & Ward, LLP

(57) ABSTRACT

A control apparatus capable of improving the control accuracy and stability when controlling a controlled object with a predetermined restraint condition between a plurality of model parameters, or a controlled object having a lag characteristic, using a control target model of a discrete-time system. The control apparatus has an ECU which arranges a control target model including two model parameters such that terms not multiplied by the model parameters and terms multiplied by the same are on different sides of the model, respectively. Assuming the different sides represent a combined signal value and an estimated combined signal value, respectively, the ECU calculates onboard identified values of the model parameters such that an identification error between the signal values is minimized, and calculates an air-fuel ratio correction coefficient using the identified values and a control algorithm derived from the control target model.

22 Claims, 43 Drawing Sheets

F I G. 1 9
THERE IS NO DEAD TIME
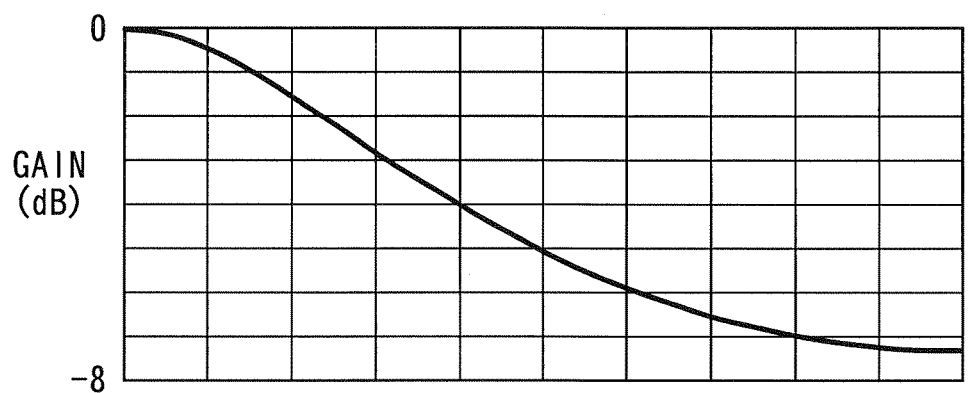
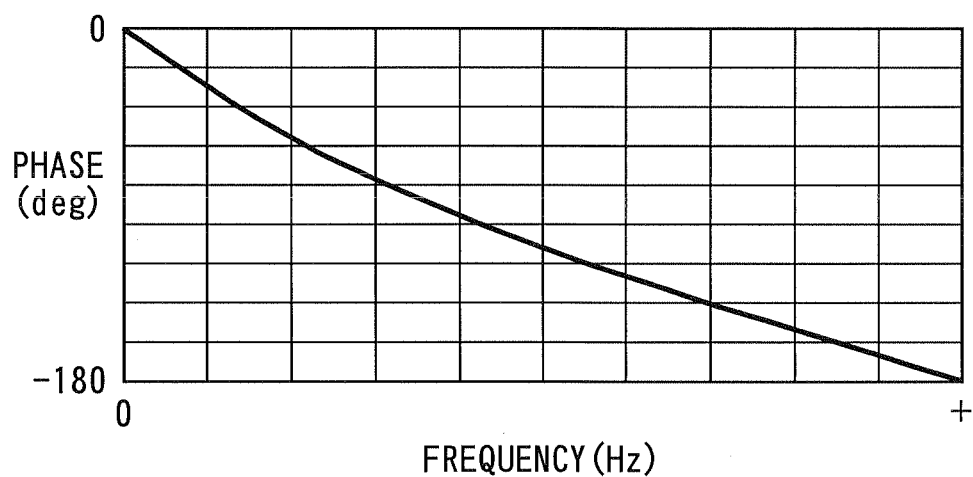

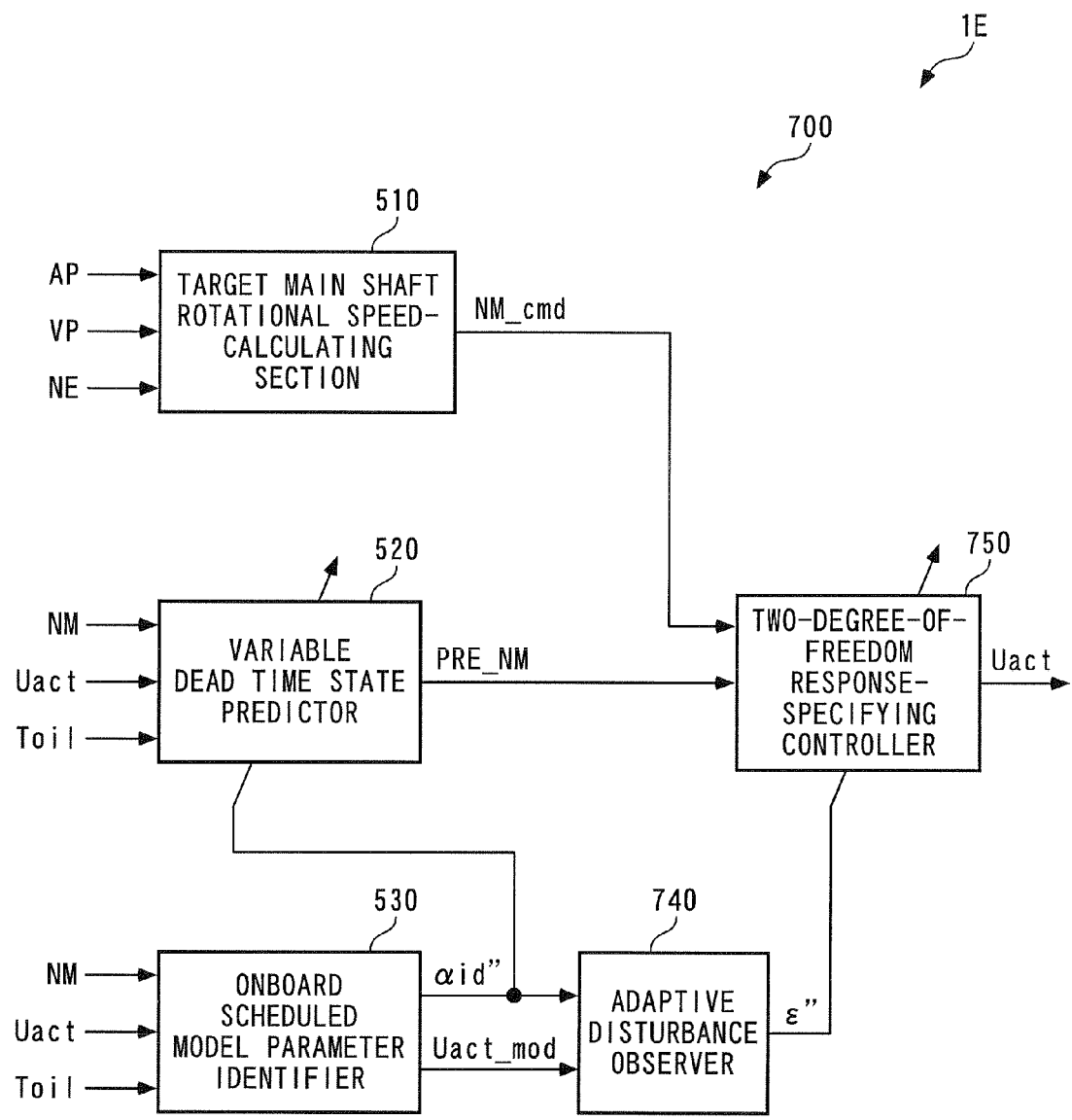
F I G. 4 8

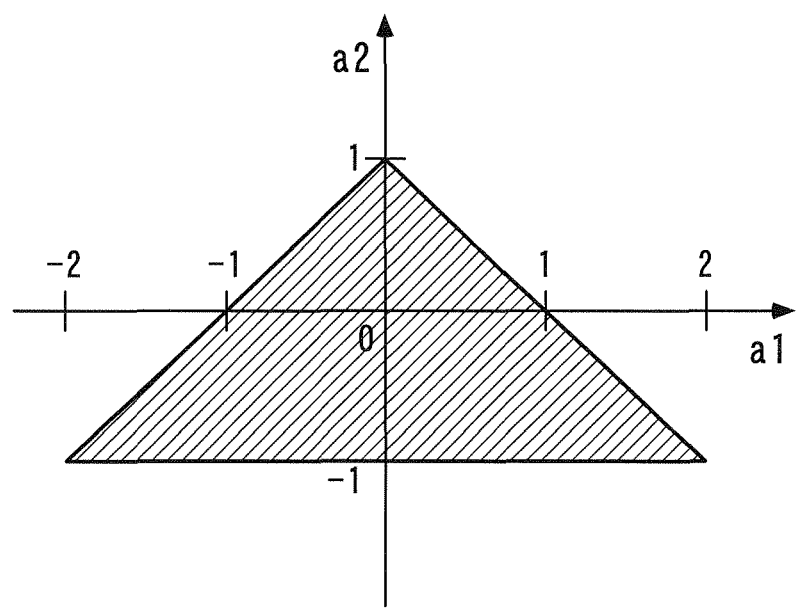
F I G. 5 2

CONTROL APPARATUS

FIELD OF THE INVENTION

The present invention relates to a control apparatus for controlling a controlled object having a lag characteristic, such as a first-order lag characteristic, using a control target model of a discrete-time system.

DESCRIPTION OF THE RELATED ART

Conventionally, the present assignee has already proposed a control apparatus disclosed in Japanese Laid-Open Patent Publication (Kokai) No. 2000-234550 as a control apparatus for controlling the air-fuel ratio of an air-fuel mixture supplied to an internal combustion engine. The control apparatus includes a LAF sensor, an oxygen concentration sensor, a state predictor, an onboard identifier, a sliding mode controller, a target air-fuel ratio-calculating section, and so forth. Both the LAF sensor and the oxygen concentration sensor detect a value indicative of the concentration of oxygen in exhaust gases, i.e. an air-furl ratio, in an exhaust passage of the engine and are provided in the exhaust passage at locations downstream of a collector thereof.

This control apparatus uses a control target model of a discrete-time system (hereinafter referred to as the "discrete-time system model") as a control target model, and the discrete-time system model defines a relationship between a difference kact between an air-fuel ratio KACT detected by the LAF sensor and an air-fuel ratio reference value FLAF-BASE (hereinafter referred to as the "air-fuel ratio difference kact"), and a difference VO2 between an output VOUT from the oxygen concentration sensor and a predetermined target value VOUT_TARGET (hereinafter referred to as the "output difference VO2"), as shown in the equation (1) in Japanese Laid-Open Patent Publication (Kokai) No. 2000-234550.

Further, the onboard identifier identifies onboard model parameters a1, a2, and b1 of the discrete-time system model using the sequential least-squares method, and the sliding mode controller calculates a target air-fuel ratio KCMD using the results of identification of the model parameters and an adaptive sliding mode control algorithm. Then, a fuel injection amount is calculated such that the detected air-fuel ratio KACT output from the LAF sensor converges to the target air-fuel ratio KCMD. As a result, the detected air-fuel ratio KACT output from the LAF sensor is controlled to converge to the target air-fuel ratio KCMD, whereby an output VO2OUT from an O2 sensor is controlled to converge to a target value VO2TARGET.

When the above-described control apparatus disclosed in Japanese Laid-Open Patent Publication (Kokai) No. 2000-234550 is applied to a controlled object having a lag characteristic as the dynamic characteristics, such as a first-order lag characteristic, the following problem may be caused: In general, the lag characteristic in a controlled object, such as a first-order lag characteristic, has a characteristic that it is susceptible to a predetermined parameter other than a control input and a controlled variable (hereinafter referred to as the "reference parameter"), and is liable to change with changes in the reference parameter. For this reason, in the case of a controlled object having a lag characteristic, if a model parameter of a control target model of a discrete-time system is attempted to be identified onboard by the sequential least-squares method in the same manner as performed by the onboard identifier of the conventional control apparatus disclosed in Japanese Laid-Open Patent Publication (Kokai) No. 2000-234550, there is a fear that a delay is caused in the update of the model parameter with respect to changes in the lag characteristic of the controlled object caused by changes in the reference parameter, which may result in the degraded accuracy of identification of the model parameter.

Further, for example, when a controlled object of the first-order, lag system is modeled as a discrete-time system model, the model parameters of the control target model can be set such that if one model parameter is a value of "a" (a is an actual number), the other is a value of "1−a", and these model parameters a and 1−a have a relationship in which the sum thereof becomes equal to 1, and as one increases, the other decreases. That is, to identify the two model parameters a and 1−a, it is necessary to identify the two model parameters a and 1−a such that such a mutual restraint condition as mentioned above (hereinafter referred to the "restraint condition") is satisfied.

In regard to this point, in the case of the sequential least-squares method used in the onboard identifier disclosed in Japanese Laid-Open Patent Publication (Kokai) No. 2000-234550, it is impossible to identify the model parameters such that the above-mentioned restraint condition is satisfied. Therefore, in the case of the controlled object in which the restraint condition exists between a plurality of model parameters thereof, such as a controlled object of the above-mentioned first order lag system, it is impossible to identify onboard the model parameters, so that for example, it is necessary to use fixed values as the model parameters. This causes a problem that a modeling error is increased due to variation between individual products and aging of the component parts of the apparatus, which results in the degraded accuracy of control and the degraded stability of the control system.

SUMMARY OF THE INVENTION

It is an object of the present invention to provide a control apparatus which is capable of improving the accuracy of control and the stability of control when controlling, using a control target model of a discrete-time system, a controlled object in which a predetermined restraint condition exists between a plurality of model parameters thereof or a controlled object having a lag characteristic, such as a first-order lag characteristic.

To attain the above object, in a first aspect of the present invention, there is provided a control apparatus for controlling a controlled variable of a controlled object using a control target model of a discrete-time system which represents a dynamic characteristic of the controlled object, wherein the control target model includes, as model parameters, at least one set of model parameters, each set being formed by a plurality of model parameters defined to be required to satisfy a predetermined restraint condition, and the predetermined restraint condition is that a predetermined one model parameter of the plurality of model parameters defines the other model parameters, the control apparatus comprising identification means for arranging the control target model such that a group of terms which are not multiplied by at least one model parameter including the predetermined model parameter and a group of terms which are multiplied by the same are on respective different sides of the control target model, and, assuming that one of the different sides of the control target model represents a combined signal value and the other of the different sides of the control target model represents an estimated combined signal value, identifying onboard the at least one model parameter such that an error between the combined signal value and the estimated combined signal value is minimized, and control input-calculating means for calculating a control input for controlling the controlled variable, using the identified at least one model parameter and a control algorithm derived from the control target model.

With the configuration of this control apparatus, the controlled variable of the controlled object is controlled using the control target model of a discrete-time system which represents a dynamic characteristic of the controlled object. This control target model includes at least one set of model parameters, each set being formed by a plurality of model parameters, defined such that a predetermined restraint condition is satisfied. Therefore, as described hereinabove, if a general identification algorithm, such as the sequential least-squares method, is used, it is impossible to identify the model parameters such that the restraint condition is satisfied. In contrast, with the configuration of the present control apparatus, the predetermined condition is that one predetermined model parameter of the plurality of model parameters defines the other model parameters, and hence the control target model is arranged by applying this condition such that a group of terms which are not multiplied by at least one model parameter including the predetermined model parameter and a group of terms which are multiplied by the same are on respective different sides of the control target model, and assuming that one of the different sides represents a combined signal value and the other represents as an estimated combined signal value, the at least one model parameter is identified onboard such that an error between the combined signal value and the estimated combined signal value is minimized. As a result, by applying the predetermined model parameter included in the identified at least one model parameter to the above-mentioned predetermined restraint condition, it is possible to calculate the other model parameters. That is, even when the plurality of model parameters of the control target model are defined such that the predetermined restraint condition are required to be satisfied, it is possible to accurately identify onboard the model parameters while satisfying the predetermined restraint condition. Then, the control input for controlling the controlled variable is calculated using the model parameters identified as above and the control algorithm derived from the control target model, and hence it is possible to prevent a modeling error due to variation between individual products and aging of the component parts from increasing, which makes it possible to improve the control accuracy and stability.

In the first aspect of the invention, preferably, the controlled object has a first-order lag characteristic as the dynamic characteristics, and the at least one model parameter is the predetermined model parameter, the control apparatus further comprising reference parameter-detecting means for detecting a reference parameter which influences the first-order lag characteristic, wherein the identification means comprises weight function value-calculating means for calculating, according to the detected reference parameter, M weight function values (M represents an integer not smaller than 2) associated with the reference parameter, range identification error-calculating means for calculating M first products by multiplying the error by the M calculated weight function values, and calculating M range identification errors using the M first products, modification value-calculating means for calculating M modification values such that the M calculated range identification errors are each minimized, and identified value-calculating means for calculating M second products by multiplying the M modification values by the M weight function values, respectively, and calculating an identified value of the predetermined model parameter using a total sum of the M second products, and wherein the M weight function values are associated with M ranges of the reference parameter, respectively, the M weight function values each being set to values other than 0 in an associated range and set to 0 in ranges other than the associated range, and adjacent ones of the M ranges overlap each other.

With the configuration of the preferred embodiment, the controlled object has the first-order lag characteristic as the dynamic characteristic, the M weight function values associated with the reference parameter are calculated according to the reference parameter which influences the first-order lag characteristic. The M first products are calculated by multiplying the error by the M weight function values, and the M range identification errors are calculated using the M first products. Further, the M modification values are calculated such that the M range identification errors are each minimized, and the M second products are calculated by multiplying the M modification values by the M weight function values, respectively. The identified value of the predetermined model parameter is calculated onboard using the total sum of the M second products.

The identified value of the predetermined model parameter is calculated as described above, and hence even when the first-order lag characteristic of the controlled object changes along with changes in the reference parameter, it is possible to calculate the identified value of the predetermined model parameter while causing the changes in the first-order lag characteristic to be reflected on the identified value. In addition to this, the M weight function values are associated with the M ranges of the reference parameter, respectively, and are each set to a value other than 0 in the associated range, and set to 0 in ranges other than the associated range. Further, the adjacent ones of the M ranges overlap each other. Therefore, even when the first-order lag characteristic suddenly changes along with a sudden change in the reference parameter, it is possible to calculate the identified value of the predetermined model parameter such that it changes steplessly and smoothly while properly compensating for the sudden change in the first-order lag characteristic. For this reason, when the controlled object is in a transient condition, it is possible to accurately calculate the identified value. As a result, it is possible to further improve the control accuracy and stability.

In the first aspect of the present invention, preferably, the controlled object has a first-order lag characteristic as the dynamic characteristics, and the at least one model parameter is the predetermined model parameter, the control apparatus further comprising first reference parameter-detecting means for detecting a first reference parameter which influences the first-order lag characteristic, and second reference parameter-detecting means for detecting a second reference parameter which influences the first-order lag characteristic, wherein the identification means comprises reference model parameter-calculating means for calculating, according to the detected first reference parameter, a reference model parameter as a reference value of the predetermined model parameter, weight function value-calculating means for calculating, according to the detected second reference parameter, M weight function values (M represents an integer not smaller than 2) associated with the second reference parameter, range identification error-calculating means for calculating M first products by multiplying the error by the M calculated weight function values, and calculating M range identification errors using the M first products, modification value-calculating means for calculating M modification values such that the M calculated range identification errors are each minimized, and identified value-calculating means for calculating M second products by multiplying the M modification values by the M weight function values, respectively, and calculating onboard an identified value of the predetermined model parameter by adding a total sum of the M second products to the reference model parameter, and wherein the M weight function values are associated with M ranges of the second reference parameter, respectively, the M weight function values each being set to values other than 0 in an associated range and set to 0 in ranges other than the associated range, and adjacent ones of the M ranges overlap each other.

With the configuration of the preferred embodiment, the controlled object has the first-order lag characteristic as the dynamic characteristic, and the reference model parameter is calculated as a reference value of the predetermined model parameter according to the first reference parameter which influences the first-order lag characteristic. Further, the M weight function values associated with the second reference parameter are calculated according to the second reference parameter which influences the first-order lag characteristic, and the M first products are calculated by multiplying the error by the M weight function values. The M range identification errors are calculated using the M first products. Further, the M modification values are calculated such that the M range identification errors are each minimized, and the M second products are calculated by multiplying the M modification values by the M weight function values, respectively. Further, the identified value of the predetermined model parameter is calculated onboard by adding the total sum of the M second products to the reference model parameter.

The identified value of the predetermined model parameter is calculated as above, and hence even when the first-order lag characteristic of the controlled object changes along with changes in the first reference parameter and/or the second reference parameter, it is possible to calculate the identified value while causing such changes in the first-order lag characteristic to be reflected on the identified value. In addition to this, the M weight function values are associated with the M ranges of the reference parameter, respectively, and are each set to a value other than 0 in the associated range, and set to 0 in ranges other than the associated range. Further, the adjacent ones of the M ranges overlap each other. Therefore, even when the first-order lag characteristic suddenly changes along with a sudden change in the reference parameter, it is possible to calculate the identified value of the predetermined model parameter such that it changes steplessly and smoothly while properly compensating for the sudden change in the first-order lag characteristic. For the above reason, even when the controlled object is in a transient condition, it is possible to accurately calculate the identified value.

Further, the M modification values are calculated such that the M range identification errors are each minimized, and the identified value of the predetermined model parameter is calculated by adding the total sum of the M second products obtained by multiplying the M modification values by the M weight function values, respectively, to the reference model parameter. Therefore, the reference model parameter is used as an initial value at a time when the identification computation is started, and the reference model parameter is calculated according to the first reference parameter which influences the first-order lag characteristic. Therefore, even immediately after the start of the computation of the identified value of the model parameter, it is possible to calculate the identified value while causing the actual first-order lag characteristic of the controlled object to be reflected on the identified value, whereby it is possible to improve the accuracy of the calculation. For the above reason, it is possible to further improve the control accuracy and stability.

In the first aspect of the present invention, preferably, the controlled object has a first-order lag characteristic as the dynamic characteristic, the at least one model parameter is the predetermined model parameter, and the identification means calculates an identification gain according to the control input and the controlled variable, and identifies the predetermined model parameter such that a product of the calculated identification gain and the error is minimized.

With the configuration of the preferred embodiment, the identification gains are calculated according to the control input and the controlled variable, and the predetermined model parameter is identified such that the products of the identification gain and the errors are each minimized. Therefore, even when it is necessary to change the direction of modification of the model parameters with respect to the errors in the controlled object because of the relationship between the control input and the controlled variable, it is possible to modify the model parameters in an appropriate direction, which makes it possible to further improve the stability of control.

In the first aspect of the present invention, more preferably, the identification means further comprises identification gain-calculating means for calculating an identification gain according to the control input and the controlled variable, and the range identification error-calculating means calculates products of the calculated identification gain and the M first products, as the M range identification errors.

With the configuration of the more preferred embodiment, the identification gain is calculated according to the control input and the controlled variable, and the products of the identification gain and the M first products are calculated as the M range identification errors. Further, the M modification values are calculated such that the M range identification errors are each minimized, respectively. Therefore, even when it is necessary to change the direction of modification of the model parameters with respect to the errors in the controlled object because of the relationship between the control input and the controlled variable, it is possible to modify the model parameters in an appropriate direction by the M modification values, which makes it possible to further improve the stability of control.

In the first aspect of the present invention, preferably, the controlled object has a second or higher order lag characteristic as the dynamic characteristic, and the at least one model parameter comprises N model parameters (N represents an integer not smaller than 2), the control apparatus further comprising reference parameter-detecting means for detecting a reference parameter which influences the lag characteristic, wherein the identification means comprises weight function value-calculating means for calculating, according to the detected reference parameter, M weight function values (M represents an integer not smaller than 2) associated with the reference parameter, range identification error vector-calculating means for calculating M first products by multiplying the error by the calculated M weight function values, and calculating M range identification error vectors each composed of N range identification errors as elements, using the M first products, modification value vector-calculating means for calculating M modification value vectors each composed of N modification values as elements such that the calculated M range identification error vectors are each minimized, and model parameter vector-identifying means for calculating M second product vectors each composed of N second products as elements by multiplying the M modification value vectors by the M weight function values, respectively, and identifying onboard a model parameter vector which is composed of the N model parameters as elements, using a total sum of the M second product vectors, and wherein the M weight function values are associated with M ranges of the reference parameter, respectively, the M weight function values each being set to values other than 0 in an associated range and set to 0 in ranges other than the associated range, and adjacent ones of the M ranges overlap each other.

With the configuration of the preferred embodiment, the controlled object has the second or higher order lag characteristic as the dynamic characteristics, and the M weight function values associated with the reference parameter are calculated according to the reference parameter which influences the lag characteristic, respectively. The M first products are calculated by multiplying the error by the M weight function values, and the M range identification error vectors each composed of the elements of the N range identification errors are calculated using the M first products. Further, the M modification value vectors each composed of the elements of the N modification values are calculated such that the M range identification error vectors are each minimized, and the M second product vectors each composed of the elements of the N second products are calculated by multiplying the M modification values by the M weight function values, respectively. The model parameter vector which is composed of the N model parameters is identified onboard using the total sum of the M second product vectors.

The model parameter vector is identified as described above, and hence even when the lag characteristic of the controlled object changes along with changes in the reference parameter, it is possible to calculate the model parameter vector while causing such changes in the lag characteristic to be reflected on the model parameter vector. In addition to this, the M weight function values are associated with M ranges of the reference parameter, respectively, and are each set to a value other than 0 in the associated range, and set to 0 in ranges other than the associated range. Further, the adjacent ones of the M ranges overlap each other. Therefore, even when the lag characteristic suddenly changes along with a sudden change in the reference parameter, it is possible to calculate the model parameter vector such that it changes steplessly and smoothly while properly compensating for the sudden change in the lag characteristic. For the above reason, even when the controlled object is in a transient condition, it is possible to accurately identify the model parameter vector. As a result, it is possible to further improve the control accuracy and stability.

In the first aspect of the present invention, preferably, the controlled object has a second or higher order lag characteristic as the dynamic characteristics, and the at least one model parameter comprises N model parameters (N represents an integer not smaller than 2), the control apparatus further comprising first reference parameter-detecting means for detecting a first reference parameter which influences the lag characteristic, and second reference parameter-detecting means for detecting a second reference parameter which influences the lag characteristic, the identification means comprising reference model parameter vector-calculating means for calculating, according to the detected first reference parameter, a reference model parameter vector which is composed of N reference model parameters as elements, which are reference values of the N model parameters, weight function value-calculating means for calculating, according to the detected second reference parameter, M weight function values (M represents an integer not smaller than 2) associated with the second reference parameter, range identification error vector-calculating means for calculating M first products by multiplying the error by the calculated M weight function values, and calculating M range identification error vectors each composed of N range identification errors as elements, using the M first products, modification value vector-calculating means for calculating M modification value vectors each composed of N modification values as elements such that the calculated M range identification error vectors are each minimized, model parameter vector-identifying means for calculating M second product vectors each composed of N second products as elements by multiplying the M modification value vectors by the M weight function values, respectively, and identifying onboard a model parameter vector which is composed of the N model parameters as elements by adding a total sum of the M second product vectors to the reference model parameter vector, and wherein the M weight function values are associated with M ranges of the second reference parameter, respectively, the M weight function values each being set to values other than 0 in an associated range and set to 0 in ranges other than the associated range, and adjacent ones of the M ranges overlap each other.

With the configuration of the preferred embodiment, the controlled object has the second or higher order lag characteristic as the dynamic characteristic, and the reference model parameter vector which is composed of the elements of the N reference model parameters, which are the reference values of the N model parameters, is calculated according to the first reference parameter which influences the lag characteristic. Further, the M weight function values associated with the second reference parameter are calculated according to the second reference parameter which influences the lag characteristic, and the M first products are calculated by multiplying the error by the M weight function values. The M range identification error vectors each composed of the elements of the N range identification errors are calculated using the M first products. Further, the M modification value vectors each composed of the elements of the N modification values are calculated such that the M range identification error vectors are each minimized, and the M second product value vectors each composed of the elements of the N second products are calculated by multiplying the M modification values by the M weight function values, respectively. Further, the model parameter vector which is composed of the elements of the N model parameters is identified onboard by adding the total sum of the M second product vectors to the reference model parameter vector.

The model parameter vector is identified as described above, even when the lag characteristic of the controlled object changes along with changes in the first reference parameter and/or the second reference parameter, it is possible to calculate the model parameter vector while causing such changes in the lag characteristic to be reflected on the model parameter vector. In addition to this, the M weight function values are associated with M ranges of the reference parameter, respectively, and are each set to a value other than 0 in the associated range, and set to 0 in ranges other than the associated range. Further, the adjacent ones of the M ranges overlap each other. Therefore, even when the lag characteristic suddenly changes along with a sudden change in the first reference parameter and/or the second reference parameter, it is possible to calculate the model parameter vector such that it changes steplessly and smoothly while properly compensating for the sudden change in the lag characteristic. For the above reason, even when the controlled object is in a transient condition, it is possible to accurately identify the model parameter vector. As a result, it is possible to further improve the control accuracy and stability.

In the first aspect of the present invention, more preferably, the identification means further comprises identification gain vector-calculating means for calculating an identification gain vector which is composed of N identification gains as elements, according to the control input and the controlled variable, and the range identification error vector-calculating means calculates products of the calculated identification gain vector and the M first products, as the M range identification error vectors.

With the configuration of the more preferred embodiment, the identification gain vector which is composed of the elements of the N identification gains is calculated according to the control input and the controlled variable, and the products of the identification gain vector and the M first products are calculated as the M range identification error vectors. Further, the M modification value vectors are calculated such that the M range identification error vectors are each minimized. Therefore, even when it is necessary to change the direction of modification of the model parameter vector with respect to the errors in the controlled object because of the relationship between the control input and the controlled variable, it is possible to modify the model parameter vector in an appropriate direction by the M modification value vectors, which makes it possible to further improve the stability of control.

In the first aspect of the present invention, preferably, the control input-calculating means calculates the control input with a control algorithm derived based on one of a sensitivity function, a complementary sensitivity function, and a transfer function that are set such that a predetermined frequency characteristic is obtained, and the control target model.

With the configuration of the preferred embodiment, the control input is calculated with a control algorithm derived based on one of a sensitivity function, a complementary sensitivity function, and a transfer function that are set such that a predetermined frequency characteristic is obtained. Therefore, it is possible to directly specify (set) a disturbance suppression characteristic and robustness of the control apparatus on a frequency axis while properly compensating for changes in the lag characteristic as described above. This makes it possible to make a dramatic improvement in the ability of suppressing a disturbance and the robustness in a frequency range within which fluctuation in the controlled variable caused by the disturbance is desired to be suppressed.

To attain the above object, in a second aspect of the present invention, there is provided a control apparatus for controlling a controlled variable of a controlled object having a first or higher order lag characteristic by a control input, comprising reference parameter-detecting means for detecting a reference parameter which influences the lag characteristic, weight function value-calculating means for calculating, according to the detected reference parameter, M weight function values (M represents an integer not smaller than 2) associated with the reference parameter, estimated controlled variable-calculating means for calculating an estimated controlled variable, which is an estimated value of the controlled variable, using a control target model of a discrete-time system defining a relationship between the controlled variable and the control input of the controlled object, error-calculating means for calculating an error between the calculated estimated controlled variable and the controlled variable, range identification error-calculating means for calculating M first products by multiplying the calculated error by the calculated M weight function values, and calculating M range identification errors using the M first products, modification value-calculating means for calculating M modification values such that the calculated M range identification errors are each minimized, identification means for calculating M second products by multiplying the calculated M modification values by the M weight function values, respectively, and identifying onboard a model parameter of the control target model using a total sum of the M second products, and control input-calculating means for calculating the control input using the identified model parameter and a control algorithm derived based on the control target model, wherein the M weight function values are associated with M ranges of the reference parameter, respectively, the M weight function values each being set to values other than 0 in an associated range and set to 0 in ranges other than the associated range, and adjacent ones of the M ranges overlap each other.

With the configuration of this control apparatus, the controlled object has the first or higher order lag characteristic, and the M weight function values associated with the reference parameter are calculated according to the reference parameter which influences the lag characteristic, respectively. Further, the estimated controlled variable is calculated using the control target model of the discrete-time system defining the relationship between the controlled variable of the controlled object and the control input, and the M first products are calculated by multiplying the error between the estimated controlled variable and the controlled variable by the M weight function values, and the M range identification errors are calculated using the M first products. Further, the M modification values are calculated such that the M range identification errors are minimized, respectively, and the M second products are calculated by multiplying the M modification values by the M weight function values, respectively. The model parameters of the control target model is identified onboard using the total sum of the M second products.

The model parameters are identified as described above, and hence even when the lag characteristic of the controlled object changes along with changes in the reference parameter, it is possible to identify the model parameters while causing such changes in the lag characteristic to be reflected on the model parameters. In addition to this, the M weight function values are associated with M ranges of the reference parameter, respectively, and are each set to a value other than 0 in the associated range, and set to 0 in ranges other than the associated range. Further, the adjacent ones of the M ranges overlap each other. Therefore, even when the lag characteristic suddenly changes along with a sudden change in the reference parameter, it is possible to identify the model parameters such that they change steplessly and smoothly while properly compensating for the sudden change in the lag characteristic. For the above reason, even when the controlled object is in a transient condition, it is possible to accurately identify the model parameters. As a result, it is possible to further improve the control accuracy and stability.

In the second aspect of the present invention, preferably, the control target model includes N model parameters (N represents an integer not smaller than 2), the range identification error-calculating means calculates M range identification error vectors each composed of N values as elements, as the M range identification errors, wherein the modification value-calculating means calculates M modification value vectors each composed of N values as elements, as the M modification values, the identification means calculates M second product vectors each composed of N values as elements, as the M second products, by multiplying the M modification value vectors by the M weight function values, respectively, and identifies onboard a model parameter vector which is composed of the N model parameters as elements, using a total sum of the M second product vectors, and the control input-calculating means calculates the control input using the identified model parameter vector and the control algorithm.

With the configuration of the preferred embodiment, in a case where the control target model of the controlled object having the first or higher order lag characteristic includes the N model parameters, it is possible to obtain the same advantageous effects as described above. More specifically, even when the lag characteristic of the controlled object changes along with changes in the reference parameter, it is possible to identify the N model parameters while causing such changes in the lag characteristic to be reflected on the model parameters. In addition to this, since the M weight function values are set as mentioned above, even when the lag characteristic suddenly changes along with a sudden change in the reference parameter, it is possible to identify the N model parameters such that they change steplessly and smoothly while properly compensating for the sudden change in the lag characteristic. For the above reason, even when the controlled object is in a transient condition, it is possible to accurately identify the N model parameters. As a result, it is possible to further improve the control accuracy and stability.

To attain the above object, in a third aspect of the present invention, there is provided a control apparatus for controlling a controlled variable of a controlled object having a first or higher order lag characteristic, by a control input, comprising first reference parameter-detecting means for detecting a first reference parameter which influences the lag characteristic, second reference parameter-detecting means for detecting a second reference parameter which influences the lag characteristic, reference model parameter-calculating means for calculating, according to the detected first reference parameter, a reference model parameter as a reference value of a model parameter of the control target model, weight function value-calculating means for calculating, according to the detected second reference parameter, M weight function values (M represents an integer not smaller than 2) associated with the second reference parameter, estimated controlled variable-calculating means for calculating an estimated controlled variable which is an estimated value of the controlled variable using a control target model of a discrete-time system defining a relationship between the controlled variable and the control input of the controlled object, error-calculating means for calculating an error between the calculated estimated controlled variable and the controlled variable, range identification error-calculating means for calculating M first products by multiplying the calculated error by the calculated M weight function values, and calculating M range identification errors using the M first products, modification value-calculating means for calculating M modification values such that the calculated M range identification errors are each minimized, identification means for calculating M second products by multiplying the M calculated modification values by the M weight function values, respectively, and identifying onboard the model parameter by adding a total sum of the M second products to the calculated reference model parameter, and control input-calculating means for calculating the control input using the identified model parameter and a control algorithm derived based on the control target model, wherein the M weight function values are associated with M ranges of the first reference parameter, respectively, the M weight function values each being set to values other than 0 in an associated range and set to 0 in ranges other than the associated range, and adjacent ones of the M ranges overlap each other.

With the configuration of this control apparatus, the controlled object has the first or higher order lag characteristic as the dynamic characteristic, and the reference model parameter is calculated as the reference value of the model parameters of the control target model according to the first reference parameter which influences the lag characteristic. Further, the M weight function values associated with the second reference parameter are calculated according to the second reference parameter which influences the lag characteristic. Further, the estimated controlled variable as an estimated value of the controlled variable is calculated using the control target model of the discrete-time system defining the relationship between the controlled variable of the controlled object and the control input, and the M first products are calculated by multiplying the error between the calculated estimated controlled variable and the controlled variable by the M weight function values. The M range identification errors are calculated using the M first products. Further, the M modification values are calculated such that the M range identification errors are each minimized, and the M second products are calculated by multiplying the M modification values by the M weight function values, respectively. The model parameters are identified onboard by adding the total sum of the M second products to the reference model parameter.

The model parameters are identified as described above, even when the lag characteristic changes along with changes in the first reference parameter and/or the second reference parameter, it is possible to identify the model parameters while causing such changes in the lag characteristic to be reflected on the model parameters. In addition to this, the M weight function values are associated with M ranges of the reference parameter, respectively, and are each set to a value other than 0 in the associated range, and set to 0 in ranges other than the associated range. Further, the adjacent ones of the M ranges overlap each other. Therefore, even when the lag characteristic suddenly changes along with a sudden change in the reference parameter, it is possible to identify the model parameters such that they change steplessly and smoothly while properly compensating for the sudden change in the lag characteristic. For the above reason, even when the controlled object is in a transient condition, it is possible to accurately identify the model parameters.

Further, the M modification values are calculated such that the M range identification errors are each minimized, and the model parameters are identified by adding the total sum of the M second products obtained by multiplying the calculated M modification values by the M weight function values, respectively to the reference model parameter. Therefore, the reference model parameter is used as an initial value at a time when the identification computation is started, and since the reference model parameter is calculated according to the first reference parameter which influences the lag characteristic, even immediately after the start of computation for identifying the model parameters, it is possible to identify the model parameters while causing the lag characteristic of the controlled object to be reflected on the model parameters, whereby it is possible to further improve the accuracy of identification of the model parameters. From the above, it is possible to further improve the control accuracy and stability.

In the third aspect of the present invention, preferably, the control target model includes N model parameters (N represents an integer not smaller than 2), the reference model parameter-calculating means calculates a reference model parameter vector which is composed of N reference model parameters as elements, which are reference values of the N model parameters, the range identification error-calculating means calculates M range identification error vectors each composed of N values as elements, as the M range identification errors, the modification value-calculating means calculates M modification value vectors each composed of N values as elements, as the M modification values, the identification means calculates M second product vectors each composed of N values as elements, as the M second products, by multiplying the M modification value vectors by the M weight function values, respectively, and identifies onboard a model parameter vector which is composed of the N model parameters as elements, by adding a total sum of the M second product vectors to the reference model parameter vector, and the control input-calculating means calculates the control input using the identified model parameter vector and the control algorithm.

With the configuration of the preferred embodiment, in a case where the control target model of the controlled object having the first or higher order lag characteristic includes the N model parameters, it is possible to obtain the same advantageous effects as described above. More specifically, even when the lag characteristic of the controlled object changes along with changes in the first reference parameter and/or the second reference parameter, it is possible to identify the N model parameters while causing such changes in the lag characteristic to be reflected on the N model parameters. In addition to this, since the M weight function values are set as mentioned above, even when the lag characteristic suddenly changes along with a sudden change in the reference parameter, it is possible to identify the N model parameters such that they change steplessly and smoothly while properly compensating for the sudden change in the lag characteristic. For the above reason, even when the controlled object is in a transient condition, it is possible to accurately identify the N model parameters. Further, the reference model parameter vector is used as an initial value at a time when the identification computation is started, and since the reference model parameter vector is calculated according to the first reference parameter which influences the lag characteristic, even immediately after the start of computation for identifying the N model parameters, it is possible to identify the N model parameters while causing the lag characteristic of the controlled object to be reflected on the N model parameters, whereby it is possible to further improve the accuracy of identification of the N model parameters. From the above, it is possible to further improve the control accuracy and stability.

In the third aspect of the present invention, preferably, the N reference model parameters include a plurality of reference model parameters defined such that a predetermined restraint condition is satisfied, and one of the plurality of reference model parameters is calculated according to the first reference parameter.

With the configuration of the more preferred embodiment, the reference model parameters include a plurality of reference model parameters defined such that the predetermined restraint condition is satisfied, and one of the plurality of reference model parameters is calculated according to the first reference parameter, and hence it is possible to identify the plurality of model parameters associated with the plurality of reference model parameters such that they are in the vicinity of a value satisfying the predetermined restraint condition, while causing the actual lag characteristic to be reflected on the model parameters. In other words, when the controlled object having the first or higher order lag characteristic is controlled, it is possible to accurately identify onboard the model parameters of the control target model while causing the actual lag characteristic to be reflected on the model parameters and substantially satisfying the predetermined restraint condition. Then, the control input for controlling the controlled variable is calculated using the model parameters identified as above and the control algorithm derived from the control target model. This makes it possible to prevent a modeling error due to changes in the reference parameter, variation between individual products, and aging of the component parts, from increasing, whereby it is possible to further improve the control accuracy and stability.

In the third aspect of the present invention, preferably, the control apparatus further comprises identification gain-calculating means for calculating an identification gain according to the control input and the controlled variable, and the range identification error-calculating means calculates products of the calculated identification gain and the M first products, as the M range identification errors.

With the configuration of the preferred embodiment, the identification gain is calculated according to the control input and the controlled variable, and the products of the identification gain and the M first products are calculated as the M range identification errors. Further, the M modification values are calculated such that the M range identification errors are each minimized. Therefore, even when it is necessary to change the direction of modification of the model parameters with respect to the errors in the controlled object because of the relationship between the control input and the controlled variable, it is possible to modify the model parameters in an appropriate direction by the M modification values, which makes it possible to further improve the stability of control.

In the preferred embodiment of the third aspect of the present invention, the control apparatus further comprises identification gain vector-calculating means for calculating an identification gain vector which is composed of N identification gains as elements, according to the control input and the controlled variable, and the range identification error-calculating means calculates products of the calculated identification gain vector and the M first products as the M range identification error vectors.

With the configuration of the more preferred embodiment, the identification gain vector is calculated according to the control input and the controlled variable, and the products of the identification gain and the M first products are calculated as the M range identification error vectors. Further, the M modification value vectors are calculated such that the M range identification error vectors are each minimized. Therefore, even when it is necessary to change the direction of modification of the N model parameters with respect to the errors in the controlled object because of the relationship between the control input and the controlled variable, it is possible to modify the N model parameters in an appropriate direction by the M modification values, which makes it possible to further improve the stability of control.

To attain the above object, in a fourth aspect of the present invention, there is provided a control apparatus for controlling a controlled variable of a controlled object having a first or higher order lag characteristic by a control input, comprising reference parameter-detecting means for detecting a reference parameter which influences the lag characteristic, reference model parameter-calculating means for calculating N reference model parameters as reference values of the N model parameters (N represents an integer not smaller than 2) in a control target model of a discrete-time system which represents a dynamic characteristic of the controlled object, according to the detected reference parameter, estimated controlled variable-calculating means for calculating an estimated controlled variable which is an estimated value of the controlled variable, using the control target model, error-calculating means for calculating an error between the calculated estimated controlled variable and the controlled variable, modification value-calculating means for calculating N modification values associated with the N reference model parameters, respectively, such that the calculated error is minimized, identification means for identifying onboard the N model parameters by adding the calculated N modification values to the N reference model parameters, respectively, and control input-calculating means for calculating a control input for controlling the controlled variable using the identified N model parameters and a control algorithm derived based on the control target model, wherein the reference model parameter-calculating means calculates one of the N reference model parameters according to the detected reference parameter, and calculates the reference model parameters other than the one reference model parameter such that a predetermined restraint condition is satisfied between the one reference model parameter and the other reference model parameters.

With the configuration of this control apparatus, the controlled object has the first or higher order lag characteristic, and the N reference model parameters are calculated according to the reference parameter which influences the lag characteristic as the reference values of the N model parameters of the control target model of the discrete-time system which represents the dynamic characteristic of the controlled object. Further, the estimated controlled variable as an estimated value of the controlled variable is calculated using the control target model. Further, the N modification values associated with the N reference model parameters are calculated such that an error between the estimated controlled variable and the controlled variable is minimized, and the N model parameters are identified onboard by adding the calculated N modification values to the N reference model parameters, respectively. The N model parameters are identified as described above, and hence the N reference model parameters are used as initial values at a time when the identification computation is started, and these reference model parameters are calculated according to the reference parameter which influences the lag characteristic. Therefore, even immediately after the start of computation for identifying the model parameters, it is possible to identify the N model parameters while causing the actual lag characteristic of the controlled object to be reflected on the model parameters, whereby it is possible to improve the accuracy of identification of the model parameters. This makes it possible to further improve the control accuracy and stability.

In the second to fourth aspects of the present invention, preferably, the control algorithm is derived based on not only the control target model, but also one of a sensitivity function, a complementary sensitivity function, and a transfer function that are set such that a predetermined frequency characteristic is obtained.

With the configuration of the preferred embodiment, it is possible to obtain the same advantageous effects as described above.

BRIEF DESCRIPTION OF THE DRAWINGS

FIG. 19 is a Bode diagram of a transfer function P of an equation (41);

FIG. 48 is a block diagram of a control apparatus according to a sixth embodiment of the present invention;

FIG. 52 is a diagram useful in explaining a restraint condition for two model parameters a1 and a2.

DETAILED DESCRIPTION OF PREFERRED EMBODIMENTS

Figure 1:
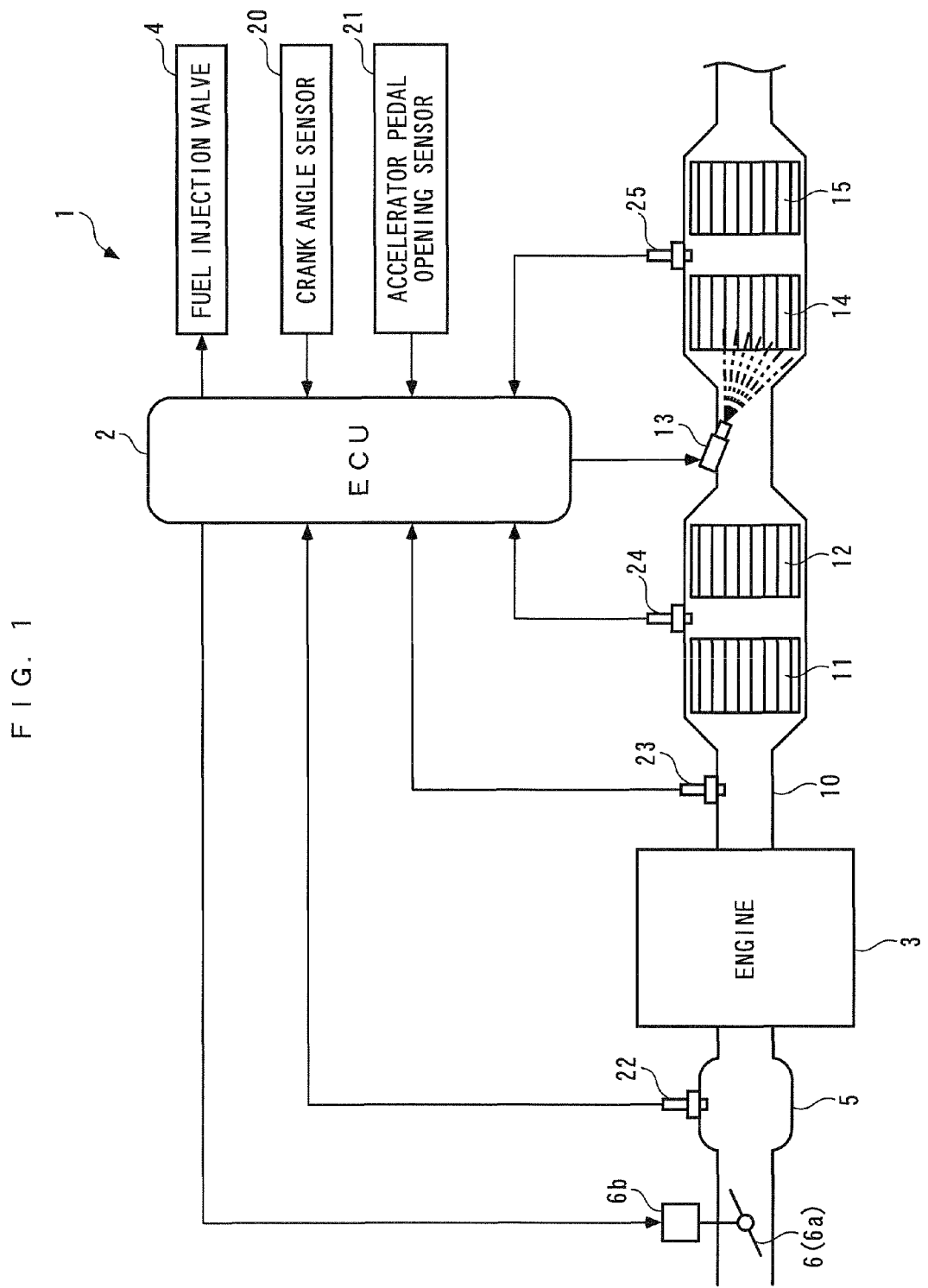
FIG. 1 is a schematic diagram of a control apparatus according to a first embodiment of the present invention, and an internal combustion engine to which is applied the control apparatus.

Hereafter, a control apparatus according to a first embodiment of the invention will be described with reference to drawings. The control apparatus according to the present embodiment, denoted by reference numeral 1 as illustrated in FIG. 1, controls the air-fuel ratio of an air-fuel mixture supplied to an internal combustion engine (hereinafter simply referred to as the "engine") 3, and includes an ECU 2.

The engine 3 is a direct injection gasoline engine installed on a vehicle, not shown, and includes fuel injection valves 4 (only one of which is shown) provided for respective cylinders. Each fuel injection valve 4 is electrically connected to the ECU 2, and a valve-opening time period and a valve-opening timing thereof are controlled by the ECU 2, whereby fuel injection control is performed. In this case, under normal operating conditions, the fuel injection control is executed such that the air-fuel ratio of the air-fuel mixture is controlled to a leaner value than the stoichiometric air-fuel ratio, whereby the engine 3 is subjected to a lean-burn operation.

A crank angle sensor 20 and an accelerator pedal opening sensor 21 are connected to the ECU 2. The crank angle sensor 20 is constituted by a magnet rotor and an MRE pickup, and delivers a CRK signal and a TDC signal, which are both pulse signals, to the ECU 2 along with rotation of a crankshaft (not shown).

Each pulse of the CRK signal is generated whenever the crankshaft rotates through a predetermined crank angle (e.g. 1°). The ECU 2 calculates the rotational speed NE of the engine 3 (hereinafter referred to as "the engine speed NE") based on the CRK signal. Further, the TDC signal indicates that a piston (not shown) in one of the cylinders is in a predetermined crank angle position slightly before the TDC position of the intake stroke, and each pulse thereof is delivered whenever the crankshaft rotates through a predetermined crank angle. In the present embodiment, the crank angle sensor 20 corresponds to reference parameter-detecting means, first reference parameter-detecting means, and second reference parameter-detecting means.

The accelerator pedal opening sensor 21 detects a stepped-on amount AP of an accelerator pedal, not shown, (hereinafter referred to as the "accelerator pedal opening AP"), and delivers a signal indicative of the detected accelerator pedal opening AP to the ECU 2.

On the other hand, a throttle valve mechanism 6 and an intake pressure sensor 22 are provided at respective locations of an intake passage 5 of the engine 3 from upstream to downstream in the mentioned order. The throttle valve mechanism 6 includes a throttle valve 6a, and a TH actuator 6b that actuates the throttle valve 6a to open and close the same. The throttle valve 6a is pivotally disposed in an intermediate portion of the intake passage 5 such that the degree of opening thereof is changed by the pivotal motion thereof to thereby change the amount of air passing through the throttle valve 6a. The TH actuator 6b is a combination of a motor (not shown) connected to the ECU 2, and a gear mechanism (not shown), and is controlled by a control signal input from the ECU 2, to thereby change the degree of opening of the throttle valve 6a.

Further, the intake pressure sensor 22 is inserted into a surge tank portion of the intake passage 5 at a location downstream of the throttle valve 6a, and detects a pressure PB within the intake passage 5 (hereinafter referred to as the "intake pressure PB"), to deliver a signal indicative of the detected intake pressure to the ECU 2. The ECU 2 calculates the intake pressure PB based on the detection signal output from intake pressure sensor 22. The intake pressure PB is calculated as absolute pressure. In the present embodiment, the intake pressure sensor 22 corresponds to the reference parameter-detecting means, the first reference parameter-detecting means, and the second reference parameter-detecting means.

On the other hand, a LAF sensor 23, an upstream three-way catalyst 11, an oxygen concentration sensor 24, a downstream three-way catalyst 12, a urea injection valve 13, an upstream selective reduction catalyst 14, an NH3 concentration sensor 25 and a downstream selective reduction catalyst 15 are provided at respective locations of an exhaust passage 10 of the engine 3 from upstream to downstream in the mentioned order.

The LAF sensor 23 comprises zirconia and platinum electrodes, and linearly detects the concentration of oxygen in exhaust gases flowing through the exhaust passage 10, in a broad air-fuel ratio range from a rich region richer than the stoichiometric air-fuel ratio to a very lean region, to deliver a signal indicative of the detected oxygen concentration to the ECU 2. The ECU 2 calculates a detected equivalent ratio KACT indicative of an equivalent ratio of exhaust gases, based on the value of the detection signal from the LAF sensor 23.

Further, the upstream three-way catalyst 11 has been activated in a region where the temperature thereof is higher than a predetermined activation temperature, and purifies harmful unburned components of exhaust gases. The downstream three-way catalyst 12 is of the same type as that of the upstream three-way catalyst 11, and is disposed on the upstream side of the upstream selective reduction catalyst 14 in order to adjust components of exhaust gases flowing into the upstream selective reduction catalyst 14 such that they are optimum for purifying NOx, to ensure a high NOx purification ratio in the upstream selective reduction catalyst 14.

Furthermore, the oxygen concentration sensor 24 comprises zirconia and platinum electrodes, and delivers an output based on the oxygen concentration of exhaust gases having passed through the upstream three-way catalyst 11 to the ECU 2. The output from the oxygen concentration sensor 24 has a high voltage value (e.g. 0.8 v) when an air-fuel mixture having a richer air-fuel ratio than the stoichiometric air-fuel ratio has been burned, whereas when an air-fuel mixture having a leaner air-fuel ratio than the stoichiometric air-fuel ratio has been burned, the output has a low voltage value (e.g. 0.2 v). Further, when the air-fuel ratio of the mixture is close to the stoichiometric air-fuel ratio, the sensor output has a predetermined target value (e.g. 0.6 V) between the high-level and low voltage values.

On the other hand, the urea injection valve 13 is electrically connected to the ECU 2. When the urea injection valve 13 is actuated by a control input signal from the ECU 2, to open, the urea injection valve 13 injects urea water supplied from a urea tank (not shown) into the exhaust passage 10. At this time, part of urea of the urea water injected from the urea injection valve 13 is changed into ammonia by heat of exhaust gases and contact with the upstream selective reduction catalyst 14.

Further, the upstream selective reduction catalyst 14 selectively reduces nitrogen oxide (NOx) in exhaust gases under an atmosphere in which urea exists as a reducing agent. In the upstream selective reduction catalyst 14, ammonia that is changed from urea during injection of urea water is also consumed together with the urea by a NOx reducing action of the catalyst 14, and ammonia that is not consumed is stored in the upstream selective reduction catalyst 14.

Further, the downstream selective reduction catalyst 15 is of the same type as that of the upstream selective reduction catalyst 14, and is disposed at a location downstream of the upstream selective reduction catalyst 14 in order not only to purify NOx in exhaust gases but also to trap ammonia having passed through the upstream selective reduction catalyst 14. In the present embodiment, a urea SCR (selective catalytic reduction) system is constituted by the above described urea injection valve 13 and the upstream and downstream selective reduction catalysts 14 and 15.

Furthermore, the NH3 concentration sensor 25 detects the concentration of ammonia in exhaust gases having passed through the upstream selective reduction catalyst 14, and delivers a signal indicative of the detected ammonia concentration to the ECU 2. The ECU 2 controls the amount of urea injection via the urea injection valve 13 based on the detection signal from the NH3 concentration sensor 25 to thereby control the ratio or amount of NOx purification by the urea SCR system.

On the other hand, the ECU 2 is implemented by a microcomputer comprising a CPU, a RAM, a ROM, an I/O interface and a drive circuit (none of which are specifically shown). The ECU 2 determines operating conditions of the engine 3 based on the detection signals from the aforementioned sensors 20 to 25, and carries out an air-fuel ratio control process, described hereinafter, and the like, based on the determined operating conditions.

In the present embodiment, the ECU 2 corresponds to identification means, control input-calculating means, the reference parameter-detecting means, weight function value-calculating means, range identification error-calculating means, modification value-calculating means, identified value-calculating means, the first reference parameter-detecting means, the second reference parameter-detecting means, reference model parameter-calculating means, and identification gain-calculating means.

Next, the control apparatus 1 according to the present embodiment will be described. First, a description will be given of a control target model used in the control apparatus 1 of the present embodiment. If the control target model is one formed by regarding a system of the engine 3 from the fuel injection valves 4 to the LAF sensor 23 as a controlled object of a first-order lag system, in which an air-fuel ratio correction coefficient KAF is a control input and the detected equivalent ratio KACT is a controlled variable, there is obtained the following equation (1). In this case, the air-fuel ratio correction coefficient KAF is calculated with a control algorithm, described hereinafter, as a value having the same dimension as that of the equivalent ratio.

$$KACT(k+1)=(1-\alpha)\cdot KACT(k)+\alpha\cdot KAF(k) \quad (1)$$

In this equation (1), $\alpha$ represents a model parameter. Further, in the equation (1), data with a symbol (k) indicates that it is discrete data sampled or calculated at a predetermined control period $\Delta T$ (repetition period at which the TDC signal is generated in the present embodiment). The symbol k (k is a positive integer) indicates a position in the sequence of sampling or calculating cycles of respective discrete data. This also applies to discrete data referred to hereinafter. Further, in the following description, the symbol (k) provided for the discrete data is omitted as deemed appropriate.

In the case of the above-mentioned equation (1), dead time "d" occurring between input of the air-fuel ratio correction coefficient KAF and output of the detected equivalent ratio KACT is not taken into account, so that if the dead time d is reflected on the equation (1), there is obtained the following equation (2). The reason for using the equation (2) as the control target model will be described hereinafter.

$$KACT(k+1)=(1-\alpha)\cdot KACT(k)+\alpha\cdot KAF(k-d) \quad (2)$$

Figure 2:
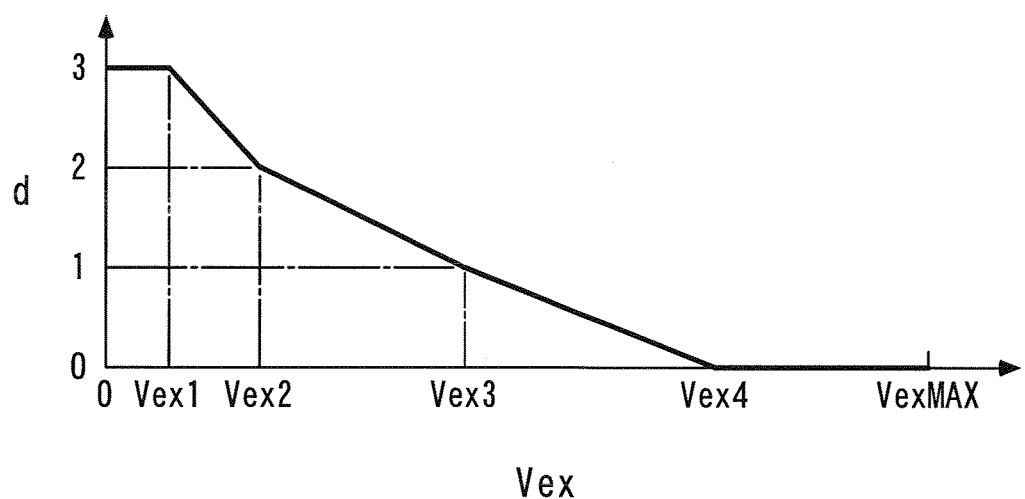
FIG. 2 is a diagram obtained by modeling the relationship between dead time d and an exhaust gas volume Vex.

In the above equation, the dead time d is changed according to the operating conditions of the engine 3, and when the relationship between the dead time d and a volume Vex of exhaust gases is modeled (mapped), a model (map) shown in FIG. 2 is obtained. The exhaust gas volume Vex is a value corresponding to the space velocity of exhaust gases. Specifically, the exhaust gas volume Vex is calculated by searching a map (not shown) according to the engine speed NE and the intake pressure PB.

In FIG. 2, Vex1 to Vex4 and VexMAX represent predetermined values of the exhaust gas volume Vex, which are set such that 0<Vex1<Vex2<Vex3<Vex4<VexMAX holds. Further, the predetermined value VexMAX is set to the maximum value of the exhaust gas volume Vex in a range within which the exhaust gas volume Vex can change during operation of the engine 3. In other words, the exhaust gas volume Vex has characteristics that it varies within the range of 0 to VexMAX.

Figure 3:
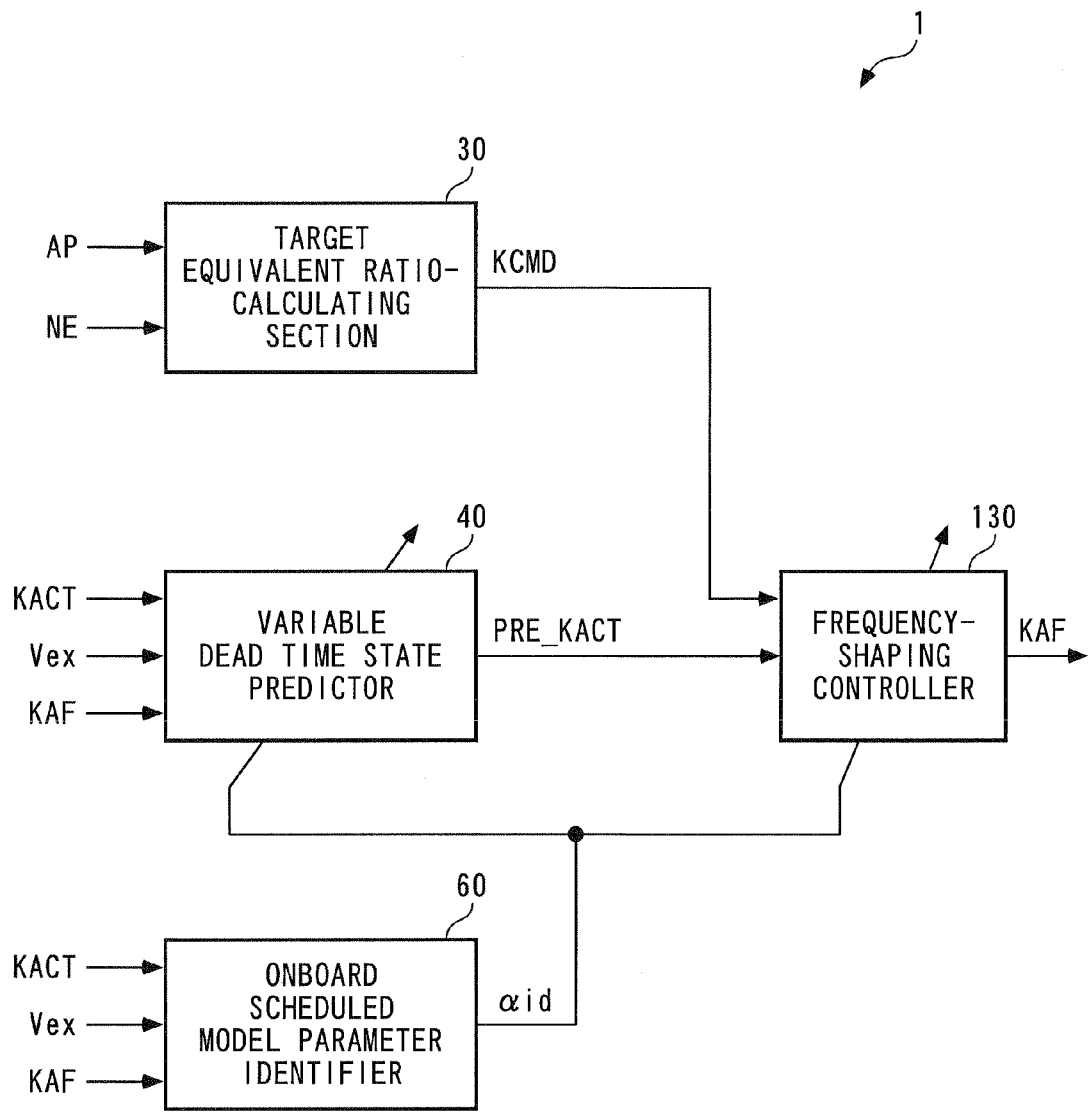
FIG. 3 is a block diagram of the control apparatus according to the first embodiment.

In the control apparatus 1 of the present embodiment, various calculated values, such as the air-fuel ratio correction coefficient KAF, are calculated using the control target model expressed by the equation (2) including the above-described dead time d, as described hereinafter. As shown in FIG. 3, the control apparatus 1 includes a target equivalent ratio-calculating section 30, a variable dead time state predictor (hereinafter referred to as the "state predictor") 40, an onboard scheduled model parameter identifier (hereinafter referred to as the "onboard identifier") 60, and a frequency shaping controller 130, all of which are implemented by the ECU 2.

Figure 4:
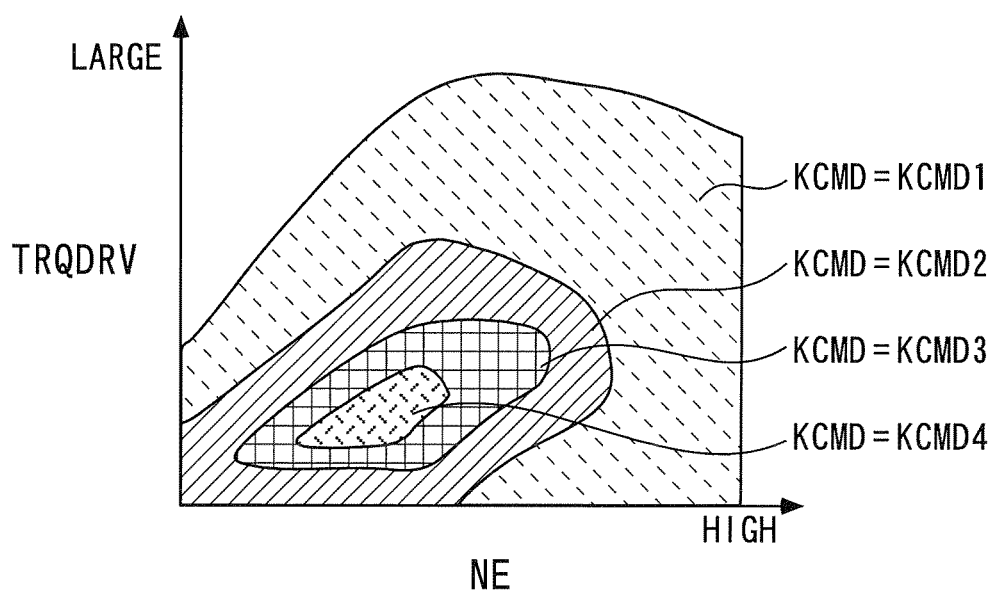
FIG. 4 is a diagram showing an example of a map for use in calculating a demanded torque TRQDRV.

The target equivalent ratio-calculating section 30 calculates a target equivalent ratio KCMD as a value which serves as the target of the above-described detected equivalent ratio KACT. Specifically, the target equivalent ratio-calculating section 30 calculates a demanded torque TRQDRV by searching a map, not shown, according to the engine speed NE and the accelerator pedal opening AP, and then calculates the target equivalent ratio KCMD by searching a map shown in FIG. 4 according to the demanded torque TRQDRV and the engine speed NE. In FIG. 4, KCMD 1 to KCMD 4 represent predetermined values of the target equivalent ratio KCMD, and are set such that KCMD 1=1 and KCMD 1>KCMD 2>KCMD 3>KCMD 4 hold.

The state predictor 40 calculates a predicted equivalent ratio PRE_KACT as a predicted value of the detected equivalent ratio KACT with a prediction algorithm, described hereinafter. The onboard identifier 60 calculates an identified value αid with an identification algorithm, described hereinafter, as a value obtained through onboard identification of the above-mentioned model parameter α. Further, the frequency shaping controller 130 calculates the air-fuel ratio correction coefficient KAF as a control input, with a control algorithm, described hereinafter.

In the present embodiment, the onboard identifier 60 corresponds to the identification means, the weight function value-calculating means, the range identification error-calculating means, the modification value-calculating means, the identified value-calculating means, the reference model parameter-calculating means, and the identification gain-calculating means. Further, the frequency shaping controller 130 corresponds to the control input-calculating means.

Next, a description will be given of the above-mentioned state predictor 40. The state predictor 40 calculates the predicted equivalent ratio PRE_KACT, with the prediction algorithm, described hereinafter. The predicted equivalent ratio PRE_KACT corresponds to a value which the detected equivalent ratio KACT is predicted to assume at a control time when the dead time d in the control system currently elapses.

Figure 5:
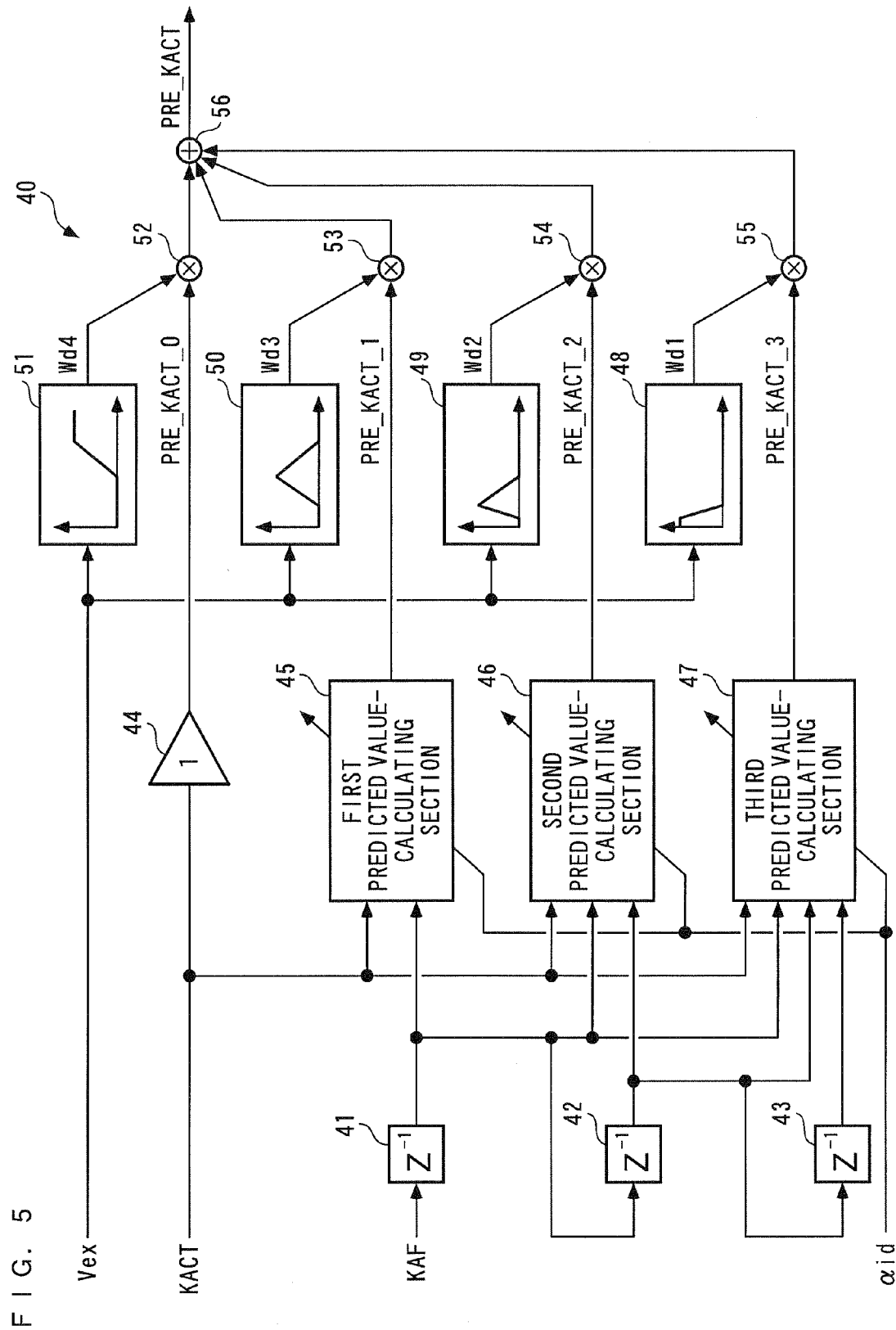
FIG. 5 is a block diagram of a variable dead time state predictor.

Referring to FIG. 5, the state predictor 40 includes three delay elements 41 to 43, an amplifier 44, three predicted value-calculating sections 45 to 47, four weight function value-calculating sections 48 to 51, four multipliers 52 to 55, and an adder 56.

First, the amplifier 44 calculates a zeroth predicted value PRE_KACT_0 by the following equation (3). That is, the zeroth predicted value PRE_KACT_0 is calculated as a detected equivalent ratio KACT(k) when the dead time d=0 holds.

$$PRE\_KACT\_0(k)=KACT(k) \quad (3)$$

Further, the first predicted value-calculating sections 45 calculates a first predicted value PRE_KACT_1 using a value KAF(k−1) of the air-fuel ratio correction coefficient, delayed by one control cycle by the delay element 41, by the following equation (4):

$$PRE\_KACT\_1(k)=(1-\alpha id(k))\cdot KACT(k)+\alpha id(k)\cdot KAF(k-1) \quad (4)$$

The first predicted value PRE_KACT1 corresponds to a value which the detected equivalent ratio KACT is predicted to assume at a time when the dead time d=1 elapses. A method of deriving the above equation (4) will be described hereinafter.

Further, the second predicted value-calculating sections 46 calculates a second predicted value PRE_KACT_2 using the value KAF(k−1) and a value KAF(k−2) of the air-fuel ratio correction coefficient, delayed by one and two control cycles by the delay elements 41 and 42, respectively, by the following equation (5)

$$PRE\_KACT\_2(k)=(1-\alpha id(k))^2\cdot KACT(k)+(1-\alpha id(k))\cdot \alpha id(k)\cdot KAF(k-2)+\alpha id(k)\cdot KAF(k-1) \quad (5)$$

The second predicted value PRE_KACT_2 corresponds to a value which the detected equivalent ratio KACT is predicted to assume at a time when the dead time d=2 elapses. A method of deriving the above equation (5) will be described hereinafter.

Further, the third predicted value-calculating sections 47 calculates a third predicted value PRE_KACT_3 using the above-described values KAF(k−1) and KAF(k−2), and a value KAF(k−3) of the air-fuel ratio correction coefficient, delayed by one to three control cycles by the three delay elements 41 to 43, respectively, by the following equation (6):

$$PRE\_KACT\_3(k)=(1-\alpha id(k))^3\cdot KACT(k)+(1-\alpha id(k))^2\cdot \alpha id(k)\cdot KAF(k-3)+(1-\alpha id(k))\cdot \alpha id(k)\cdot KAF(k-2)+\alpha id(k)\cdot KAF(k-1) \quad (6)$$

The third predicted value PRE_KACT_3 corresponds to a value which the detected equivalent ratio KACT is predicted to assume at a time when the dead time d=3 elapses. A method of deriving the above equation (6) will be described hereinafter.

Figure 6:
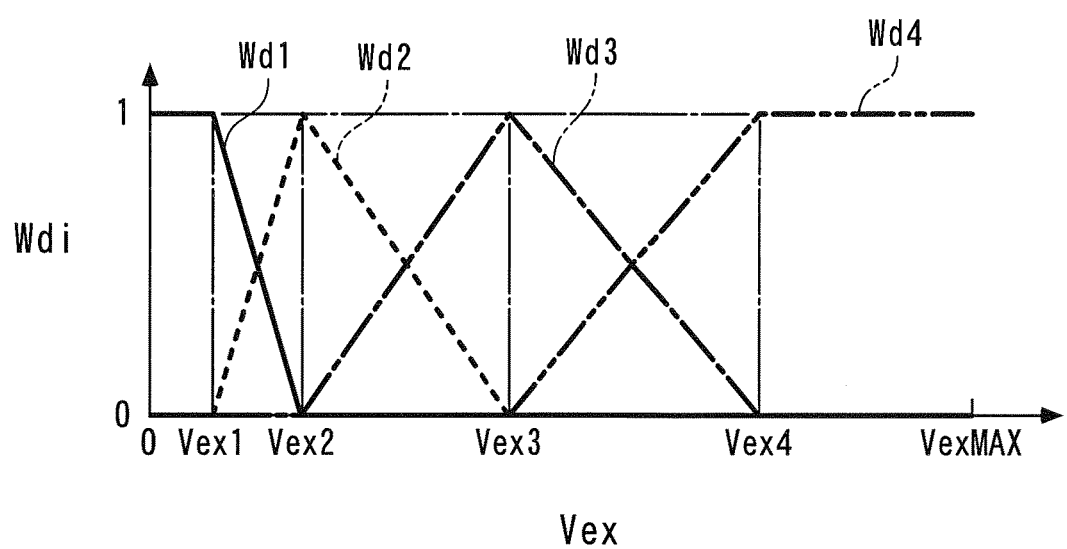
FIG. 6 is a diagram showing an example of a map for use in calculating a weight function value Wdi.

The four weight function value-calculating sections 48 to 51 calculate four weight function values Wd1 to Wd4, respectively, by searching a map shown in FIG. 6 according to the exhaust gas volume Vex. As shown in FIG. 6, when a range within which the exhaust gas volume Vex can change is divided into the four ranges of $0 \leq Vex \leq Vex2$, $Vex1 \leq Vex \leq Vex3$, $Vex2 \leq Vex \leq Vex4$, and $Vex3 \leq Vex \leq VexMAX$, the four weight function values Wd1 to Wd4 are set such that they are associated with the above four ranges, respectively, and are set to positive values not larger than 1 in the ranges associated therewith, whereas in ranges other than the associated ranges, they are set to 0.

Specifically, the weight function value Wd1 is set, in the range associated therewith ($0 \leq Vex \leq Vex2$), to a maximum value of 1 when $Vex \leq Vex1$ holds and to a smaller positive value as the exhaust gas volume Vex is larger in the range Vex1<Vex, while in the other ranges, it is set to 0. The weight function value Wd2 is set, in the range associated therewith ($Vex1 \leq Vex \leq Vex3$), to such a value as changes along the inclined sides of a triangle with a maximum value of 1 when Vex=Vex2 holds, and while in the other ranges, it is set to 0.

The weight function value Wd3 is set, in the range associated therewith ($Vex2 \leq Vex \leq Vex4$), to such a value as changes along the inclined sides of a triangle with a maximum value of 1 when Vex=Vex3 holds, while in the other ranges, it is set to 0. The weight function value Wd4 is set, in the range associated therewith ($Vex3 \leq Vex \leq VexMAX$), to a larger positive value as the exhaust gas volume Vex is larger with a maximum value of 1 when $Vex4 \leq Vex$ holds, while in the other ranges, it is set to 0.

Further to the above, the four ranges with which the respective four weight function values Wdi (i=1 to 4) are associated are set such that adjacent ones thereof overlap each other, as described above, and the sum of the values of the weight function values Wdi associated with each value of the exhaust gas volume Vex in the overlapping ranges becomes equal to the maximum value of 1 of each of the weight function values Wdi.

As is apparent from a comparison between FIG. 6 and FIG. 2, referred to hereinabove, the three ranges overlapping each other are set such that they correspond to three ranges, respectively, within which the slope of the dead time d is held constant. In addition, the weight function values Wd1, Wd2, Wd3, and Wd4 are set such that the respective weights determined thereby are maximized at the dead time d=3, the dead time d=2, the dead time d=1, and the dead time d 0, respectively.

The multiplier 52 calculates a product Wd4·PRE_KACT_0 by multiplying the weight function value Wd4 by the zeroth predicted value PRE_KACT_0. The multiplier 53 calculates a product Wd3·PRE_KACT_1 by multiplying the weight function value Wd3 by the first predicted value PRE_KACT_1. The multiplier 54 calculates a product Wd2·PRE_KACT_2 by multiplying the weight function value Wd2 by the second predicted value PRE_KACT_2 and the multiplier 55 calculates a product Wd1·PRE_KACT_3 by multiplying the weight function value Wd1 by the third predicted value PRE_KACT_3.

The adder 56 calculates the predicted equivalent ratio PRE_KACT by adding the four products calculated as above to each other. That is, the predicted equivalent ratio PRE_KACT is calculated by the following equation (7):

$$\text{PRE\_KACT}(k) = \sum_{i=1}^{4} Wdi(k) \cdot \text{PRE\_KACT\_4} - i(k) \quad (7)$$

As described above, the predicted equivalent ratio PRE_KACT is calculated as the total sum of products obtained by multiplying four predicted values PRE_KACT_4–i by the above-mentioned four weight function values Wdi, respectively, and hence even when the dead time d sequentially changes between 0 to 3, as shown in FIG. 2, according to changes in the exhaust gas volume Vex, it is possible to calculate the predicted equivalent ratio PRE_KACT as a value that changes smoothly and steplessly, while properly causing such changes in the dead time d to be reflected thereon.

The equations (4) to (6) for calculating the aforementioned first to third predicted values PRE_KACT_1 to 3 are derived as described hereinafter. First, in the aforementioned equation (2), assuming that d=1 holds, there is obtained the following equation (8):

$$KACT(k+1) = (1-\alpha) \cdot KACT(k) + \alpha \cdot KAF(k-1) \quad (8)$$

In the above equation (8), by replacing KACT(k+1) on the right side thereof with PRE_KACT_1($k$), and $\alpha$ on the left side thereof with
αid(k), respectively, the aforementioned equation (4) is obtained.

Further, in the aforementioned equation (2), if d=2 holds, there is obtained the following equation (9):

$$KACT(k+1) = (1-\alpha) \cdot KACT(k) + \alpha \cdot KAF(k-2) \quad (9)$$

In the above equation (9), if the variables are shifted by one control cycle toward the future, there is obtained the following equation (10):

$$KACT(k+2) = (1-\alpha) \cdot KACT(k+1) + \alpha \cdot KAF(k-1) \quad (10)$$

If the equation (9) is substituted into the equation (10), there is obtained the following equation (11):

$$KACT(k+2) = (1-\alpha) \cdot \{(1-\alpha) \cdot KACT(k) + \alpha \cdot KAF(k-2)\} + \quad (11)$$
$$\alpha \cdot KAF(k-1)$$
$$= (1-\alpha)^2 \cdot KACT(k) + (1-\alpha) \cdot \alpha \cdot KAF(k-2) +$$
$$\alpha \cdot KAF(k-1)$$

By replacing KACT(k+2) on the right side of the above equation (11) with PRE_KACT_2($k$), and $\alpha$ on the left side thereof with αid(k), the aforementioned equation (5) is obtained.

Further, in the aforementioned equation (2), assuming that d=3, there is obtained the following equation (12):

$$KACT(k+1) = (1-\alpha) \cdot KACT(k) + \alpha \cdot KAF(k-3) \quad (12)$$

In the above equation (12), if the variables are shifted by one control cycle toward the future, there is obtained the following equation (13):

$$KACT(k+2) = (1-\alpha) \cdot KACT(k+1) + \alpha \cdot KAF(k-2) \quad (13)$$

If the equation (12) is substituted into the equation (13), there is obtained the following equation (14):

$$KACT(k+2) = (1-\alpha) \cdot \{(1-\alpha) \cdot KACT(k) + \alpha \cdot KAF(k-2)\} + \quad (14)$$
$$\alpha \cdot KAF(k-1)$$
$$= (1-\alpha)^2 \cdot KACT(k) + (1-\alpha) \cdot \alpha \cdot KAF(k-3) +$$
$$\alpha \cdot KAF(k-2)$$

Furthermore, in the above equation (13), if the variables are shifted by one control cycle toward the future, there is obtained the following equation (15):

$$KACT(k+3) = (1-\alpha) \cdot KACT(k+2) + \alpha \cdot KAF(k-1) \quad (15)$$

If the equation (14) is substituted into the equation (15), there is obtained the following equation (16)

$$KACT(k+3) = (1-\alpha) \cdot \{(1-\alpha)^2 \cdot KACT(k) + (1-\alpha) \cdot \alpha \cdot \quad (16)$$
$$KAF(k-3) + \alpha \cdot KAF(k-2)\} + \alpha \cdot KAF(k-1)$$
$$= (1-\alpha)^3 \cdot KACT(k) + (1-\alpha)^2 \cdot \alpha \cdot KAF(k-3) +$$
$$(1-\alpha) \cdot \alpha \cdot KAF(k-2) + \alpha \cdot KAF(k-1)$$

When KACT(k+3) on the right side of the above equation (16) and $\alpha$ on the left side thereof are replaced by PRE_KACT_3($k$) and αid(k), respectively, the aforementioned equation (6) is obtained.

Next, the above-mentioned onboard identifier 60 will be described. When the dead time d and the first order-lag characteristic change with changes in the exhaust gas volume Vex, as in the controlled object of the present embodiment, the onboard identifier 60 calculates the identified value αid with a scheduled modification-type identification algorithm with a restraint condition, referred to hereinafter, while causing such changes in the dead time d and the first-order lag characteristic to be reflected on the identified value αid. The identification algorithm for the onboard identifier 60 is derived, as described hereinafter, based on a modified model (equation (30), referred to hereinafter) obtained by replacing a value KAF(k-d) on the right side of the aforementioned equation (2) with a modified control input KAF_mod(k), referred to hereinafter.

Figure 7:
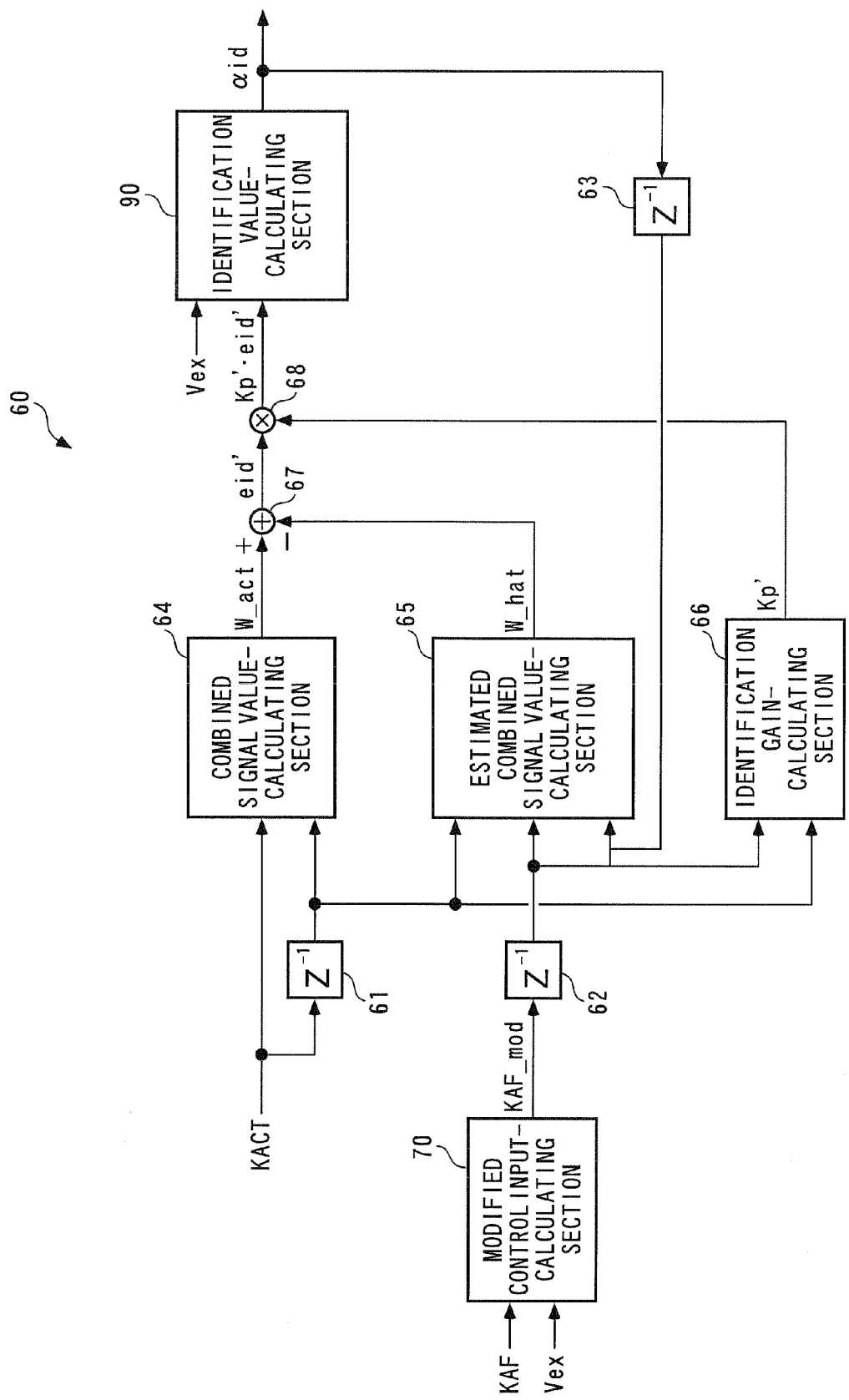
FIG. 7 is a block diagram of an onboard scheduled model parameter identifier.

As shown in FIG. 7, the onboard identifier 60 includes a modified control input-calculating section 70, three delay elements 61 to 63, a combined signal value-calculating section 64, an estimated combined signal value-calculating section 65, an identification gain-calculating section 66, a subtractor 67, a multiplier 68, and an identified value-calculating section 90.

Figure 8:
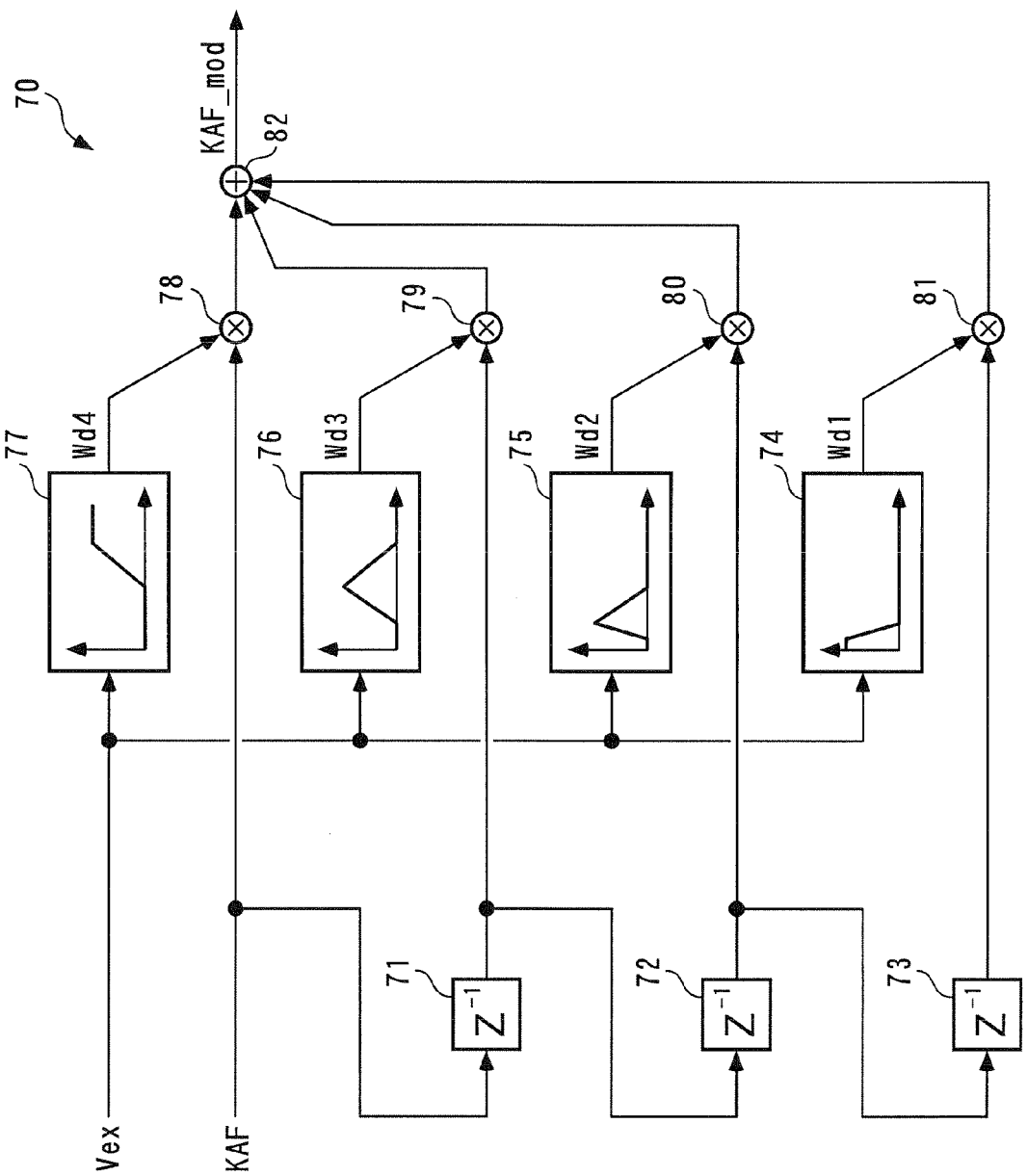
FIG. 8 is a block diagram of a modified control input-calculating section.

First, a description will be given of the modified control input-calculating section 70. The modified control input-calculating section 70 calculates the modified control input KAF_mod, and as shown in FIG. 8, includes three delay elements 71 to 73, four weight function value-calculating sections 74 to 77, four multipliers 78 to 81, and an adder 82.

First, similarly to the above-mentioned four weight function value-calculating sections 48 to 51, the four weight function value-calculating sections 74 to 77 calculate four weight function values Wd1 to Wd4 by searching the map shown in FIG. 6, respectively, according to the exhaust gas volume Vex.

The multiplier 78 calculates a product Wd4(k)·KAF(k) by multiplying a weight function value Wd4(k) by the current value KAF(k) of the air-fuel ratio correction coefficient. The multiplier 79 calculates a product Wd3(k)·KAF(k−1) by multiplying a weight function value Wd3(k) by the value KAF(k−1) of the air-fuel ratio correction coefficient, delayed by one control cycle by the delay element 71.

The multiplier 80 calculates a product Wd2(k)·KAF(k−2) by multiplying a weight function value Wd2(k) by the value KAF(k−2) of the air-fuel ratio correction coefficient, delayed by two control cycles by the two delay elements 71 and 72, and the multiplier 81 calculates a product Wd1(k)·KAF(k−3) by multiplying a weight function value Wd1(k) by the value KAF(k−3) of the air-fuel ratio correction coefficient, delayed by three control cycles by the three delay elements 71 to 73.

The adder 82 calculates the modified control input KAF_mod using the above-described four products by the following equation (17):

$$\text{KAF\_mod}(k) = \sum_{i=1}^{4} Wdi(k) \cdot KAF(k-4+i) \tag{17}$$

Referring again to FIG. 7, the combined signal value-calculating section 64 calculates a combined signal value W_act using the detected equivalent ratio KACT and a value KACT(k−1) of the detected equivalent ratio delayed by one control cycle by the delay element 61, by the following equation (18):

$$W\_act(k) = KACT(k) - KACT(k-1) \tag{18}$$

The estimated combined signal value-calculating section 65 calculates a difference ζ'(k−1) by the following equation (19) using the value KACT(k−1) of the detected equivalent ratio delayed by one control cycle by the delay element 61 and a value KAF_mod(k−1) of the modified control input delayed by one control cycle by the delay element 62, and then calculates an estimated combined signal value W_hat using the difference ζ'(k−1) and an identified value αid(k−1) delayed by one control cycle by the delay element 63, by the following equation (20):

$$\zeta'(k-1) = KAF\_mod(k-1) - KACT(k-1) \tag{19}$$

$$W\_hat(k) = \alpha id(k-1) \cdot \zeta'(k-1) \tag{20}$$

The subtractor 67 calculates an identification error eid' by the following equation (21):

$$eid'(k) = W\_act(k) - W\_hat(k) \tag{21}$$

On the other hand, the identification gain-calculating section 66 calculates an identification gain Kp' by the following equations (22) and (23). The identification gain Kp' defines a direction (positive or negative) and amount of modification of the identified value αid.

$$P'(k) = \frac{1}{\lambda 1} \cdot \left(1 - \frac{\lambda 2 \cdot P'(k-1) \cdot \zeta'(k-1)}{\lambda 1 + \lambda 2 \cdot P'(k-1) \cdot \zeta'(k-1)}\right) P'(k-1) \tag{22}$$

$$Kp'(k) = \frac{P'(k) \cdot \zeta'(k-1)}{1 + P'(k) \cdot \zeta'(k-1)} \tag{23}$$

In the above equation (22), an initial value P'(0) of a gain P'(k) is defined by the following equation (24):

$$P'(0) = P0 \tag{24}$$

wherein P0 is set to a predetermined value.

Further, in the above equation (22), λ1 and λ2 represent weight parameters. By setting the values of the weight parameters λ1 and λ2 as described below, it is possible to select one of the following three algorithms as an identification algorithm.

λ1=1, λ2=0: fixed gain algorithm;
λ1=1, λ2=1: least-squares method algorithm; and
λ1=1, λ2=1: weighted least-squares method algorithm, wherein λ represents a predetermined value set such that 0<λ<1 holds. In the present embodiment, the weighted least-squares method algorithm is employed so as to properly secure identification accuracy of and control accuracy.

The multiplier 68 calculates a product Kp'·eid' obtained by multiplying the identification gain Kp' by the identification error eid'.

Figure 9:
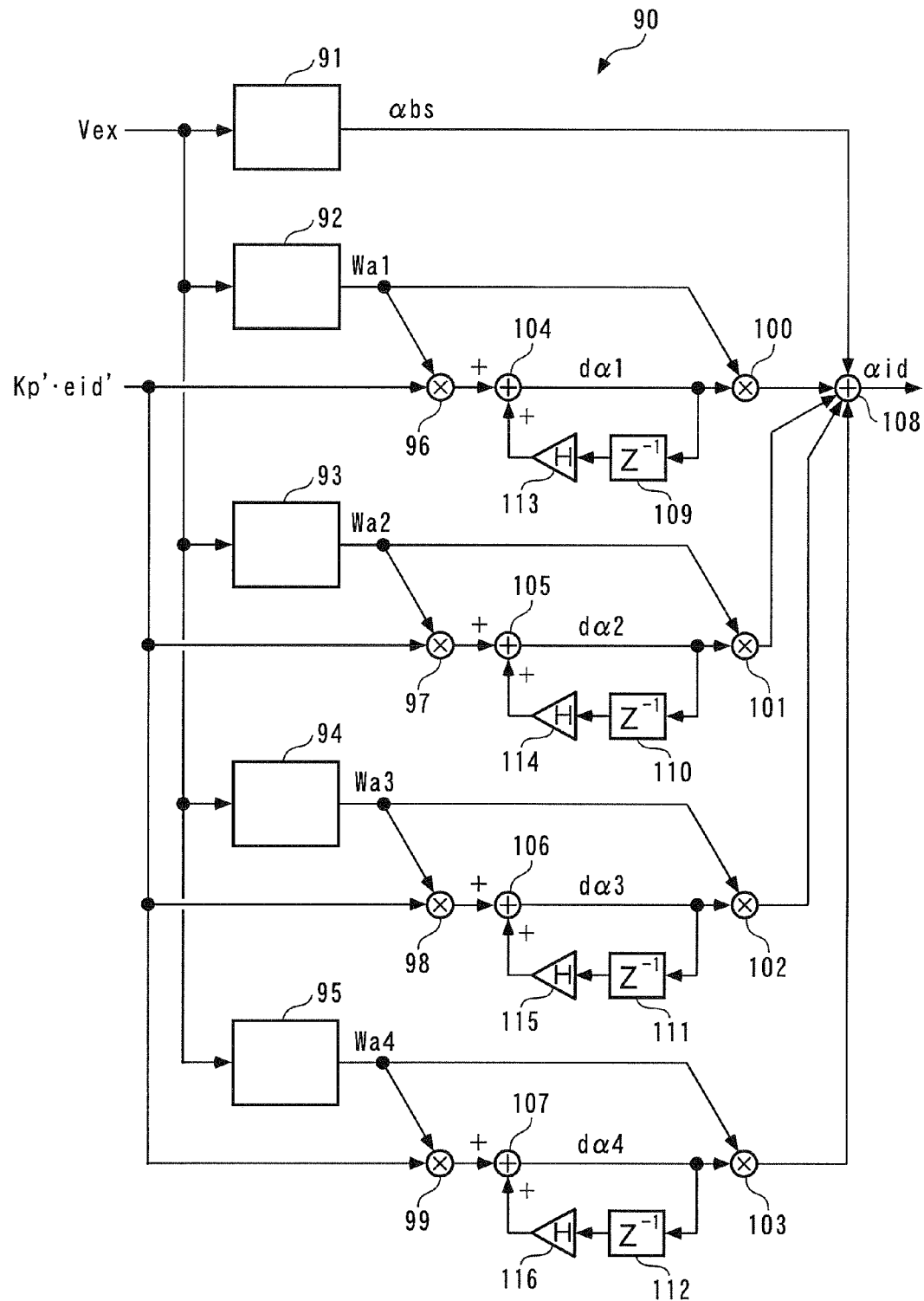
FIG. 9 is a block diagram of an identified value-calculating section.

Then, the identified value-calculating section 90 calculates the identified value αid using the above-mentioned product Kp'·eid' and the exhaust gas volume Vex, as described hereinafter. In the present embodiment, the exhaust gas volume Vex corresponds to the reference parameter, the first reference parameter, and the second reference parameter. As shown in FIG. 9, the identified value-calculating section 90 includes a reference model parameter-calculating section 91, four weight function value-calculating sections 92 to 95, eight multipliers 96 to 103, five adders 104 to 108, four delay elements 109 to 112, and four amplifiers 113 to 116.

Figure 10:
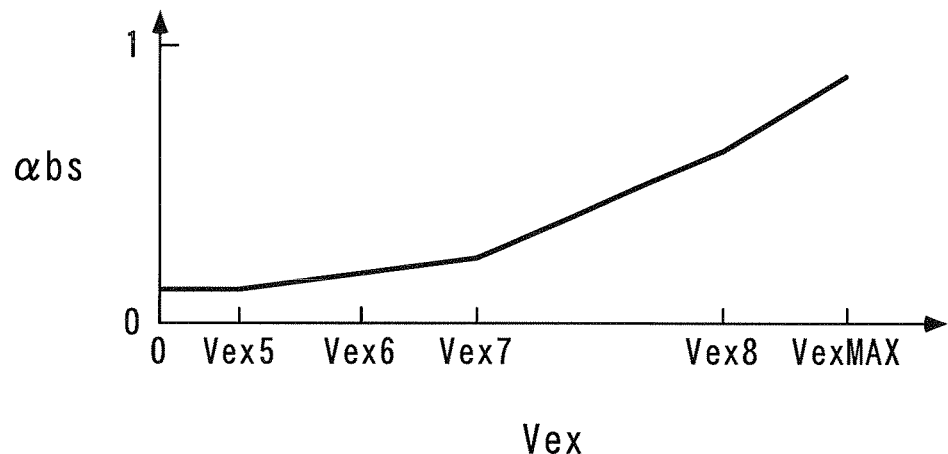
FIG. 10 is a diagram showing an example of a map for use in calculating a reference model parameter $\alpha bs$.

First, the reference model parameter-calculating section 91 calculates a reference model parameter αbs by searching a map shown in FIG. 10 according to the exhaust gas volume Vex. In FIG. 10, Vex5 to Vex8 are predetermined values of the exhaust gas volume Vex, and are set such that 0<Vex5<Vex6<Vex7<Vex8<VexMAX holds. In this map, the reference model parameter αbs is set to a larger value as the exhaust gas volume Vex is larger. This is because as the exhaust gas volume Vex is larger, time required for exhaust gases to reach the LAF sensor 23 (i.e. a dead time) is reduced, to thereby increase the degree of influence of the air-fuel ratio correction coefficient KAF on the detected equivalent ratio KACT.

Figure 11:
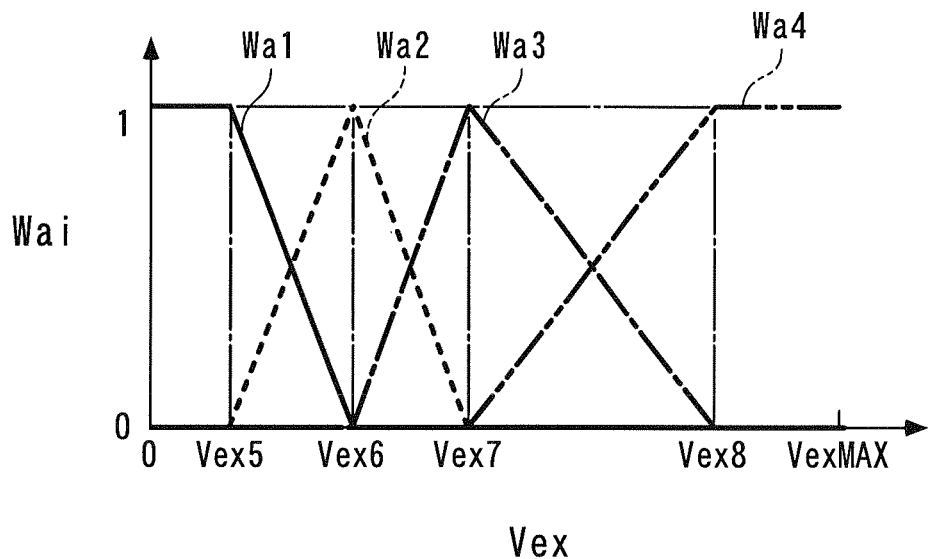
FIG. 11 is a diagram showing an example of a map for use in calculating a weight function value Wai.

Further, the four weight function value-calculating sections 92 to 95 calculate four weight function values Wa1 to Wa4, respectively, by searching a map shown in FIG. 11 according to the exhaust gas volume Vex. As shown in FIG. 11, when a range within which the exhaust gas volume Vex can change is divided into the four ranges of first to fourth ranges of 0≤Vex≤Vex6, Vex5≤Vex≤Vex7, Vex6≤Vex≤Vex8, and Vex7≤Vex≤VexMAX, the four weight function values Wa1 to Wa4 are set such that they are associated with the above four ranges, respectively, and are set to positive values not larger than 1 in the ranges associated therewith, whereas in ranges other than the associated ranges, they are set to 0.

More specifically, the weight function value Wa1 is set, in the first range (0≤Vex≤Vex6) associated therewith, to a maximum value of 1 when Vex≤Vex5 holds and to a smaller positive value as the exhaust gas volume Vex is larger, while in the other ranges, it is set to 0. The weight function value Wa2 is set, in the second range (Vex5≤Vex≤Vex7) associated therewith, to such a value as changes along the inclined sides of a triangle with a maximum value of 1 when Vex=Vex6 holds, while in the other ranges, it is set to 0.

The weight function value Wa3 is set, in the third range (Vex6≤Vex≤Vex8) associated therewith, to such a value as changes along the inclined sides of a triangle with a maximum value of 1 when Vex=Vex7 holds, while in the other ranges, it is set to 0. The weight function value Wa4 is set, in the fourth range (Vex7≤Vex≤VexMAX) associated therewith, to a larger positive value as the exhaust gas volume Vex is larger with a maximum value of 1 when Vex8≤Vex holds, while in the other ranges, it is set to 0.

Further to the above, the four ranges with which the respective four weight function values Wai (i=1 to 4) are associated are set such that adjacent ones thereof overlap each other, as described above, and the sum of the values of the weight function values Wai associated with each value of the exhaust gas volume Vex in the overlapping ranges becomes equal to the maximum value of 1 of each of the weight function values Wai. As is apparent from a comparison between FIG. 11 and FIG. 10, referred to hereinabove, the three ranges overlapping each other are set such that they correspond to three ranges, respectively, within which the slope of the reference model parameter αbs is held constant.

The multiplier 96 calculates a range identification error Wa1·Kp'·eid' by multiplying the weight function value Wa1 by the value Kp'·eid'. The range identification error Wa1·Kp'·eid' is a value indicative of an identification error in the above-mentioned first range, and is calculated as 0 according to the above-mentioned setting of the weight function value Wa1 when the current value of the exhaust gas volume Vex is not within the first range. Further, the amplifier 113 calculates a product H(k)·dα1(k−1) by multiplying a modification term dα1(k−1) delayed by one control cycle by the delay element 109 by a gain coefficient H(k). The gain coefficient H will be described hereinafter. Then, the adder 104 calculates a modification term dα1 by adding the value H(k)·dα1(k−1) to the value Wa1·Kp'·eid'.

The multiplier 97 multiplies the weight function value Wa2 by the value Kp'·eid', to thereby calculate a range identification error Wa2'·Kp'·eid'. The range identification error Wa2·Kp'·eid' is a value indicative of an identification error in the above-mentioned second range, and is calculated as 0 according to the above-mentioned setting of the weight function value Wa2 when the current value of the exhaust gas volume Vex is not within the second range. Further, the amplifier 114 multiplies a modification term dα2(k−1) delayed by one control cycle by the delay element 110 by the gain coefficient H(k), to thereby calculate a product H(k)·dα2(k−1). Then, the adder 105 adds the value H(k)·dα2(k−1) to the value Wa2·Kp'·eid', to thereby calculate a modification term dα2.

The multiplier 98 multiplies the weight function value Wa3 by the value Kp'·eid', to thereby calculate a range identification error Wa3·Kp'·eid'. The range identification error Wa3·Kp'·eid' is a value indicative of an identification error in the above-mentioned third range, and is calculated as 0 according to the above-mentioned setting of the weight function value Wa3 when the current value of the exhaust gas volume Vex is not within the third range. Further, the amplifier 115 multiplies a modification term dα3(k−1) delayed by one control cycle by the delay element 111 by the gain coefficient H(k), to thereby calculate a product H(k)·dα3(k−1). Then, the adder 106 adds the value H(k)·dα3(k−1) to the value Wa3'·Kp'·eid', to thereby calculate a modification term dα3.

The multiplier 99 multiplies the weight function value Wa4 by the value Kp'·eid', to thereby calculate a range identification error Wa4·Kp'·eid'. The range identification error Wa4·Kp'·eid' is a value indicative of an identification error in the above-mentioned fourth range, and is calculated as 0 according to the above-mentioned setting of the weight function value Wa4 when a current value of the exhaust gas volume Vex is not within the fourth range. Further, the amplifier 116 multiplies a modification term dα4(k−1) delayed by one control cycle by the delay element 112 by the gain coefficient H(k), to thereby calculate a product H(k)·dα4(k−1). Then, the adder 107 adds the value H(k)·dα4(k−1) to the value Wa4·Kp'·eid', to thereby calculate a modification term dα4.

The above-described amplifiers 113 to 116 calculate the gain coefficient H as shown in the following equations (25) to (27)

When α_H<αid(k−1) holds, $$H(k)=\eta' \quad (25)$$

When) α_L≤αid(k−1)≤α_H holds, $$H(k)=1 \quad (26)$$

When αid(k−1)≤α_L holds, $$H(k)=\eta' \quad (27)$$

In the above equations (25) to (27), α_L represents a predetermined lower limit value, and a H represents a predetermined upper limit value. Further, η' represents a forgetting coefficient set such that 0<η'≤1 holds. The forgetting coefficient η' is used for calculating the identified value αid because when the engine 3 continues to be in a steady operating condition for a long time period, there is a fear that the identified value αid increases to become inappropriate. To avoid this inconvenience, the forgetting coefficient η' is used. Further, as expressed by the above equation (26), when the identified value αid is between the lower limit value α_L and the upper limit value α_H, a forgetting effect provided by the forgetting coefficient η' is suspended, because in the case of the identification algorithm used by the onboard identifier 60, it is possible to always identify the identified value αid such that an identification condition 1 (restraint condition), described hereinafter, is satisfied, so that it is unnecessary to forcibly restrain the identified value αid in the vicinity of the reference model parameter αbs, described hereinafter, so as to satisfy the restraint condition.

Calculation performed by the above-described four adders 104 to 107 is expressed by the following equation (28):

$$dαi(k)=H(k)·dαi(k−1)+Wai(k)·Kp'(k)·eid'(k) \quad (28)$$

The multipliers 100 to 103 multiply the four modification terms dαi (modification values) by the four weight function values Wai, to thereby calculate the four products Wai·dαi, respectively.

Then, the adder 108 finally calculates the identified value αid by the following equation (29):

$$\alpha id(k) = \alpha bs(k) + \sum_{i=1}^{4} Wai(k) \cdot d\alpha i(k) \quad (29)$$

As described hereinabove, in the onboard identifier 60, the modified control input KAF_mod is calculated as the total sum of products obtained by multiplying the detected equivalent ratio KACT by the four weight function values Wdi at four control times, respectively, and the four modification terms dαi are calculated as the total sum of products obtained by multiplying the product Kp'·eid' of the identification error eid' calculated using the modified control input KAF_mod and the identification gain Kp', by the four weight function values Wai, respectively. Then, the identified value αid is calculated by adding the total sum to the reference model parameter αbs. Therefore, even when the first-order lag characteristic changes with changes in the exhaust gas volume Vex, it is possible to identify the identified value αid as a value that is very close to the actual model parameter while causing the changes in the first-order lag characteristic to be reflected on the identified value αid, by virtue of the effects of the weight function values Wai.

In calculating the identified value αid, the identification algorithm expressed by the above-described equations (17) to (29) is used for the following reason: First, the control system of the control apparatus 1 according to the present embodiment is a system in which the air-fuel ratio correction coefficient KAF is a control input and the detected equivalent ratio KACT is a controlled variable, and in which no steady-state error is generated in a state where there is no disturbance. Therefore, in the case of the control target model expressed by the aforementioned equation (2), in order to prevent generation of a steady-state error between the input and the output, the respective multiplication coefficients of an input term and an output term, i.e. the model parameters α and 1−α, are set such that the sum thereof becomes equal to 1.

In this case, the two model parameters α and 1−α have a mutually-restraining relationship in which they cannot take values independent of each other, but as one increases, the other decreases. Therefore, to identify the two model parameters α and 1−α, it is necessary to identify them such that a mutual restraint condition (hereinafter referred to the "restraint condition") in which as one increases, the other decreases is satisfied. Hereinafter, this condition will be referred to the "identification condition 1". Assuming, here, that a general identification algorithm, such as the least-squares method, is directly employed, it is difficult to satisfy the identification condition 1.

In addition to this, as described hereinabove, the first-order lag characteristic has a characteristic that it changes with changes in the exhaust gas volume Vex, and therefore if the general identification algorithm, such as the least-squares method, is directly employed, it is impossible to identify the two model parameters α and 1−α while causing the changes in the first-order lag characteristic to be reflected on the model parameters, which results in the degraded accuracy of identification of the model parameters α and 1−α. Therefore, to enhance the identification accuracy, even when the dead time d has changed, it is necessary to identify the model parameters α and 1−α under the condition of properly causing the change in the dead time d to be reflected on the model parameters. Hereinafter, this condition is referred to as the "identification condition 2".

First, to satisfy the above-described identification condition 2, in place of the aforementioned equation (2), the following equation (30) is used as a control target model.

$$KACT(k+1) = (1-\alpha) \cdot KACT(k) + \alpha \cdot KAF\_mod(k) \quad (30)$$

This equation (30) corresponds to one obtained by replacing the value KAF(k−d) on the right side of the aforementioned equation (2) with the value KAF_mod(k). As expressed by the equation (17), this modified control input KAF_mod(k) is calculated as the sum of products of the four weight function values Wdi and the four air-fuel ratio correction coefficients KAF, respectively, and the four weight function values Wdi are calculated by the aforementioned method, so that even when the dead time d has changed, it is possible to calculate the modified control input KAF_mod while properly causing the change in the dead time d to be reflected on the same.

When the above equation (30) is transformed, there is obtained the following equation (31):

$$KACT(k+1) - KACT(k) = \alpha \cdot (KAF\_mod(k) - KACT(k)) \quad (31)$$

The left side and the right side of the above equation (31) are defined as the combined signal value W_act and the estimated combined signal value W_hat, respectively, as expressed by the following equations (32) and (33)

$$W\_act(k+1) = KACT(k+1) - KACT(k) \quad (32)$$

$$W\_hat(k+1) = \alpha \cdot (KAF\_mod(k) - KACT(k)) \quad (33)$$

When the left side and the right side of the above equation (31) are defined as above, to satisfy the above-mentioned identification condition 1, it is only required to identify the model parameters of the control target model such that the combined signal value W_act and the estimated combined signal value W_hat become equal to each other. That is, it is only required to identify (calculate) the identified value αid such that the aforementioned identification error eid' becomes equal to 0. For this reason, the identified value αid is calculated with the identification algorithm expressed by the aforementioned equations (17) to (29).

Further, when the model parameter α of the control target model and the exhaust gas volume Vex have the relationship described with reference to FIG. 10, it is impossible to identify the model parameter α with reference to the FIG. 10 relationship, with the general identification algorithm, such as the least-squares method. In contrast, in the case of the onboard identifier 60 according to the present embodiment, the reference model parameter αbs is calculated by searching the map shown in FIG. 10 according to the exhaust gas volume Vex, and therefore, the reference model parameter αbs is calculated as a value on which the actual state of the first-order lag characteristic is reflected.

Further, since the identified value αid is calculated by modifying the reference model parameter αbs calculated as above by the total sum of the products of the weight function values Wai and the modification terms dαi, it is possible to use the reference model parameter αbs on which the actual first-order lag characteristic at the time is reflected, as an initial value of the modification terms dαi at the start of the identification calculation, and it is possible to calculate the identified value αid by modifying the reference model parameter αbs while causing the change in the first-order lag characteristic to be reflected on the reference model parameter αbs. In other words, it is possible to satisfy the above-mentioned identification condition 2. For the above reason, the identified value αid is calculated with the identification algorithm expressed by the aforementioned equations (17) to (29).

Next, a description will be given of the frequency shaping controller 130. This frequency shaping controller 130 calculates the air-fuel ratio correction coefficient KAF such that the predicted equivalent ratio PRE_KACT converges to the target equivalent ratio KCMD, in other words, the detected equivalent ratio KACT converges to the target equivalent ratio KCMD. In the frequency shaping controller 130, first, a predicted follow-up error PRE_e is calculated by subtracting the target equivalent ratio KCMD from the predicted equivalent ratio PRE_KACT, as expressed by the following equation (34):

$$PRE\_e(k) = PRE\_KACT(k) - KCMD(k) \quad (34)$$

Then, the air-fuel ratio correction coefficient KAF as a control input is calculated by the following equation (35):

$$KAF(k) = \frac{1}{\alpha id(k)} \{\beta \cdot PRE\_e(k) - (1 - \alpha id(k)) \cdot \beta \cdot PRE\_e(k-1) - \alpha id(k) \cdot KAF(k-1)\} \quad (35)$$

In this equation (35), B represents a sensitivity-setting parameter, and is set to a predetermined value (e.g. 0.6) by a method, described hereinafter.

Next, a description will be given of the deriving principles of the control algorithm of the above-described frequency shaping controller 130. In the present embodiment, the control apparatus 1 is configured such that in order to ensure excellent reduction of exhaust emissions and excellent fuel economy in a compatible manner, the air-fuel ratio of the gasoline engine 3 is controlled to the leaner side for lean burn operation, and NOx in exhaust gases is purified by the urea SCR system.

When the control apparatus 1 is configured as above, since the gasoline engine is low in combustion stability during the lean-burn operation, which limits the air-fuel ratio of a burnable air-fuel mixture within a predetermined range, it is necessary to suppress a phenomenon that the air-fuel ratio is temporarily excessively leaned. This phenomenon is liable to occur particularly when the engine is in a transient operating condition. In addition to this, during the lean-burn operation, a surging phenomenon is liable to occur due to combustion fluctuation, and hence, to prevent occurrence of the surging phenomenon, it is necessary to control the fuel amount such that it is not excessively fluctuated. To satisfy these requirements, it is necessary to control the air-fuel ratio such that the ability of suppressing a low-frequency disturbance becomes low and at the same time ability of suppressing a high-frequency disturbance becomes high. Hereinafter, this necessity is referred to as the "control condition φ".

Figure 12:
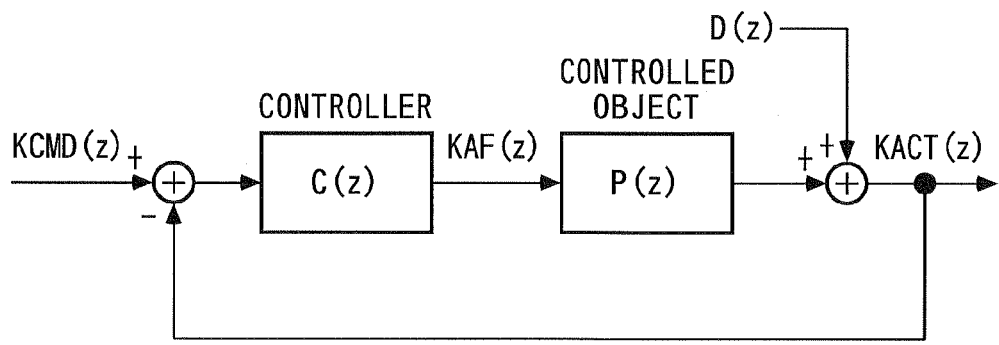
FIG. 12 is a Z-domain block diagram representing the configuration of a feedback control system of the control apparatus.

Now, FIG. 12 is a Z-domain block diagram representing the configuration of a feedback control system, such as the control apparatus 1 of the present invention, that is, the configuration of a system in which the air-fuel ratio correction coefficient KAF as a control input is input to the controlled object, whereby the detected equivalent ratio KACT is feedback-controlled such that it converges to the target equivalent ratio KCMD. In FIG. 12, C(z) represents a transfer function of the controller, P(z) represents a transfer function of the controlled object, and D(z) represents a disturbance. In the following description, the symbol (z) provided for each data item is omitted as deemed appropriate.

In the case of the above control system, the transfer function, i.e. a sensitivity function S between the disturbance D and the detected equivalent ratio KACT is expressed by the following equation (36):

$$S(z) = \frac{KACT(z)}{D(z)} = \frac{1}{1 + C(z) \cdot P(z)} \quad (36)$$

Figure 13:
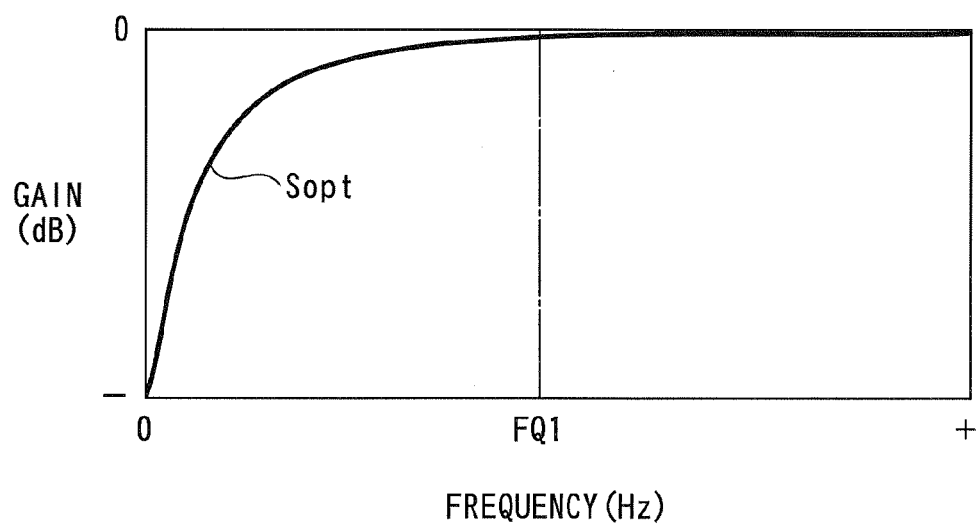
FIG. 13 is a diagram illustrating a gain curve of an optimum sensitivity function Sopt.

In this case, to satisfy the above-described control condition φ, a gain curve showing a gain characteristic (i.e. frequency response characteristic) of the sensitivity function S is required to be one as shown in FIG. 13. In FIG. 13, FQ1 represents a predetermined frequency, and the gain becomes high when the frequency is in a high-frequency range which is not lower than the predetermined frequency FQ1 in this gain curve, whereby the ability of suppressing a disturbance becomes high. On the other hand, the gain becomes low when the frequency is in a low-frequency range which is lower than the predetermined frequency FQ1, whereby the ability of suppressing a disturbance becomes low. Hereinafter, a sensitivity function that provides the FIG. 13 gain curve satisfying the control condition φ will be referred to as the "optimum sensitivity function Sopt".

Here, when the sliding mode control algorithm disclosed in Japanese Laid-Open Patent Publication (Kokai) No. 2000-234550 is applied to the FIG. 12 control system, the following is obtained. In the sliding mode control algorithm, a follow-up error "e" and a switching function σ are defined by the following equations (37) and (38):

$$e(k) = KACT(k) - KCMD(k) \quad (37)$$

$$\sigma(k) = e(k) + POLE\_E \cdot e(k-1) \quad (38)$$

wherein POLE_E represents a switching function-setting parameter set such that −1<POLE_E<0 holds.

The sliding mode control algorithm is a control method for restraining the dynamic characteristics of the controlled object such that σ=0 holds. When σ=0 is applied to the above equation (38), there is obtained the following equation (39), and by arranging the equation (39), there is obtained the following equation (40):

$$\sigma(k) = e(k) + POLE\_E \cdot e(k-1) = 0 \quad (39)$$

$$e(k) = -POLE\_E \cdot e(k-1) \quad (40)$$

Figure 14:
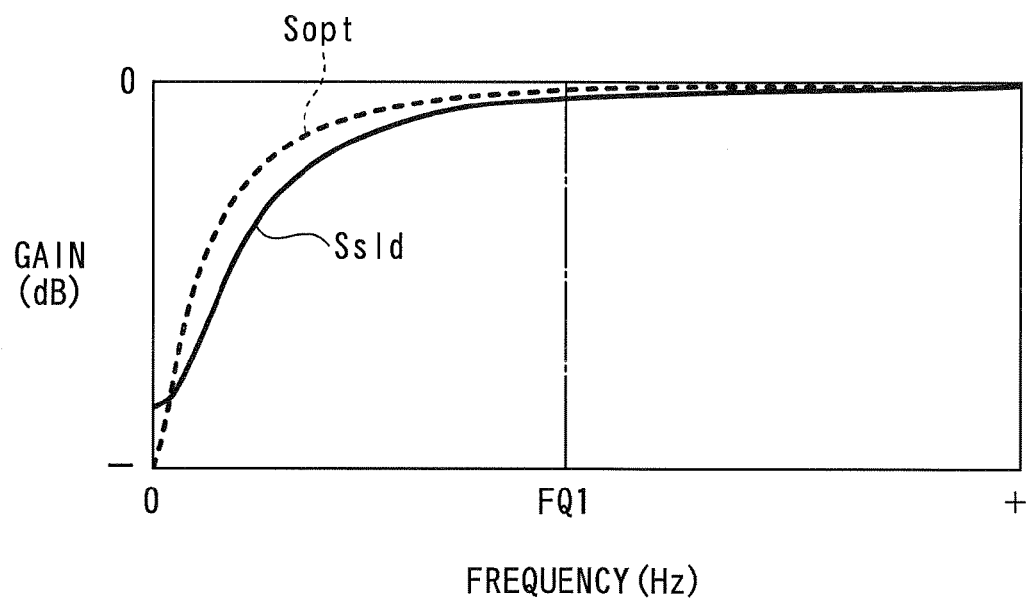
FIG. 14 is a diagram illustrating a gain curve of a sensitivity function Ssld of a sliding mode control algorithm.

The above equation (40) represents a first-order lag system with no input. More specifically, the sliding mode control algorithm is a control algorithm for restraining the dynamic characteristics of the controlled object in the first-order lag system with no input, and the gain curve of a sensitivity function Ssld of such a first-order lag system is indicated by a solid line in FIG. 14. As is apparent from FIG. 14, it is understood that the gain curve of the sensitivity function Ssld considerably approximates the gain curve of the optimum sensitivity function Sopt indicated by a broken line in FIG. 14, and satisfies the above-described control condition φ.

Now, in the case of the sliding mode control algorithm, there are a reaching mode before the follow-up error e reaches a value on a switching straight line (i.e. σ becomes equal to 0), and a sliding mode after the follow-up error e has reached the value on the switching straight line (i.e. after the dynamic characteristics of the controlled object have been restrained in the first-order lag system with no input). Therefore, although the control condition φ can be satisfied in the sliding mode, it cannot be satisfied in the reaching mode. That is, in the sliding mode control algorithm, it is impossible to always satisfy the control condition φ.

To avoid this inconvenience, in the present embodiment, as a control algorithm that always satisfies the control condition φ, a control algorithm is employed which sets a sensitivity function Sd in advance such that the sensitivity function Sd always satisfies the control condition φ, as described hereinafter. First, assuming that a system in which the air-fuel ratio correction coefficient KAF having a dimension of the equivalent ratio is a control input and the detected equivalent ratio KACT is a controlled variable is a first-order lag system, a control target model of the system is expressed by the aforementioned equation (1), and a transfer function P in the Z-domain of the control target model is expressed by the following equation (41):

$$P(z) = \frac{KACT(z)}{KAF(z)} = \frac{\alpha}{z-(1-\alpha)} = \frac{\alpha \cdot z^{-1}}{1-(1-\alpha) \cdot z^{-1}} \quad (41)$$

On the other hand, the sensitivity function Sd satisfying the control condition φ is defined as expressed by the following equation (42):

$$Sd(z) = 1 - \frac{\beta}{z-(1-\beta)} \quad (42)$$

In the above equation (42), β represents a sensitivity function-setting parameter, and is set to a predetermined value satisfying 0<β<1. In the above equation (42), the gain curve of the sensitivity function Sd, obtained when β=0.6, is indicated by a solid line in FIG. 15. As is apparent from FIG. 15, it is understood that the gain curve of the sensitivity function Sd considerably approximates the gain curve of the optimum sensitivity function Sopt indicated by a broken line in FIG. 15, and satisfies the aforementioned control condition φ.

The relationship between the sensitivity function Sd, a transfer function C of the controller, and the transfer function P of the controlled object is expressed by the following equation (43):

$$Sd(z) = \frac{1}{1+C(z) \cdot P(z)} \quad (43)$$

When the above equation (43) is transformed, there is obtained the following equation (44):

$$C(z) = \frac{1-Sd(z)}{Sd(z)} \cdot \frac{1}{P(z)} \quad (44)$$

If the equation (42) is substituted into the equation (44), there is obtained the following equation (45)

$$C(z) = \frac{\beta z - (1-\alpha) \cdot \beta}{\alpha(z-1)} \quad (45)$$

$$= \frac{\beta - (1-\alpha) \cdot Z^{-1}}{\alpha(1-z^{-1})}$$

When this equation (45) is expressed by a recurrence formula of a discrete-time system, there is obtained the following equation (46):

$$KAF(k) = \frac{1}{\alpha}\{\beta \cdot e(k) - (1-\alpha) \cdot \beta \cdot e(k-1) - \alpha \cdot KAF(k-1)\} \quad (46)$$

As is apparent from this equation (46), it is understood that the feedback gain of the controller can be specified (set) by the model parameter α of the control target model and the sensitivity function-setting parameter β that determines the frequency response characteristic (gain characteristic) of the sensitivity function Sd.

On the other hand, in the case of the above-described FIG. 12 control system, a complementary sensitivity function T is expressed by the following equation (47):

$$T(z) = \frac{C(z) \cdot P(z)}{1+C(z) \cdot P(z)} = \frac{KACT(z)}{KCMD(z)} \quad (47)$$

Here, it is known that the relationship between the complementary sensitivity function T and the sensitivity function S is expressed by the following equation (48):

$$T(z)+S(z)=1 \quad (48)$$

As is apparent from the above equations (47) and (48), the method of deriving the above-mentioned equation (46) determines a frequency response characteristic (gain characteristic) between the disturbance D and the detected equivalent ratio KACT, and at the same time a frequency response characteristic (gain characteristic) between the target equivalent ratio KCMD and the detected equivalent ratio KACT.

Figure 15:
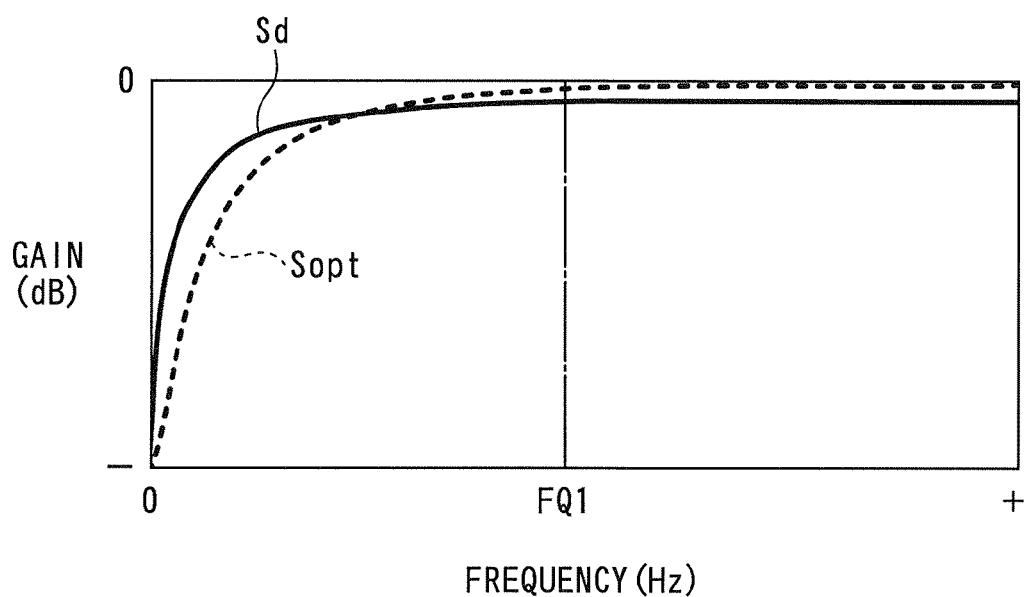
FIG. 15 is a diagram illustrating a gain curve of a sensitivity function Sd of an equation (42)
Figure 16:
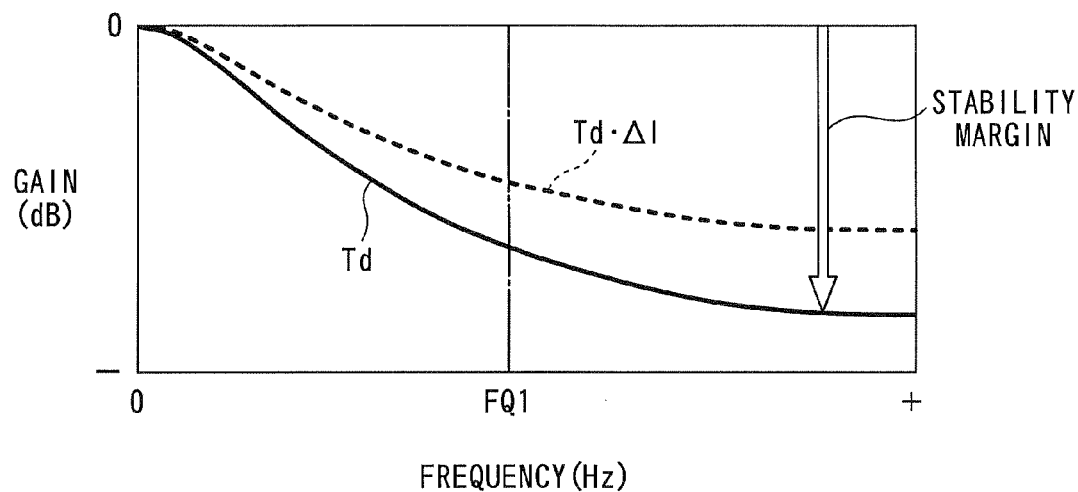
FIG. 16 is a diagram illustrating a gain curve of a complementary sensitivity function Td.

Now, assuming that a complementary sensitivity function corresponding to the FIG. 15 sensitivity function Sd is represented by Td, the gain curve of complementary sensitivity function Td becomes as illustrated in FIG. 16. In FIG. 16, a curve indicated by a broken line is a gain curve obtained when a modeling error Δl is caused to be reflected on the complementary sensitivity function Td.

As described above, the control algorithm expressed by the equation (46) is derived using the sensitivity function Sd satisfying the control condition φ. When the control is attempted to be executed by directly using the equation (46), there occur problems 1 and 2, described hereinafter.

<Problem 1>: It is impossible to cope with fluctuation and variation in the model parameter α of the control target model, which makes it impossible to ensure high robustness. For example, only the same robustness as provided by the conventional PID control algorithm and optimum control algorithm can be ensured.

<Problem 2>: In a case where the controlled object has dead-time characteristics, it is impossible to cope with the dead-time characteristics, which can result in degraded control accuracy.

First, a detailed description will be given of <Problem 1>. Assuming that a model equation error between the control target model expressed by the equation (1) and an actual controlled object is represented by Δl(z), it is known that as a condition for stabilizing the control system, the following inequality (49) needs to be satisfied.

$$|\Delta l(z) \cdot T(z)|<1 \quad (49)$$

Figure 17:
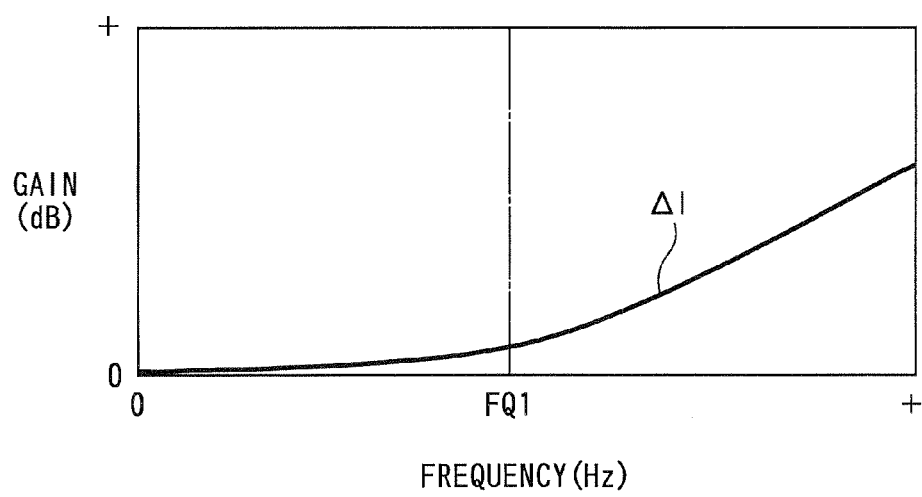
FIG. 17 is a diagram illustrating a gain curve of modeling error $\Delta l$ in a first-order lag system.

Here, a lag system model, such as the first-order lag system model expressed by the equation (1), has a characteristic that the modeling error Δl therein increases as the frequency range becomes higher, as shown in FIG. 17, and hence when the modeling error Δl is reflected on the above-mentioned complementary sensitivity function Td, a gain curve indicated by a broken line in FIG. 16 is obtained. As is apparent from the above-mentioned inequality (49), the condition for stabilizing the control system is that a value of Td·Δl is smaller than 0 dB, and hence the degree by which the gain of the complementary sensitivity function Td is smaller than 0 dB provides a margin of the stability of the control system, which represents robustness.

However, the relationship of Td(z)+Sd(z)=1 exists between the sensitivity function Sd and the complementary sensitivity function Td, as described above, whereby it is impossible to set the frequency response characteristic and robustness against disturbance suppression independently of each other. Therefore, to improve the robustness against the modeling error Δl(Z) in the lag system model in a state where the frequency response characteristic against disturbance suppression is specified, another control algorithm is required which is capable of compensating for the modeling error Δl(z).

Note that when the degree of the equation (42) is increased and the sensitivity function Sd is modified into a complicated shape so as to cope with the modeling error Δl(z), in the transfer function C(z) of the equation (45), the degree of z in a numerator thereof becomes larger than the degree of z in a denominator thereof, which makes the controller unrealizable. Further, when a method of tuning the sensitivity-setting parameter β by try and error is employed, it is not different from a method of tuning the gain of the PID control or the weight functions Q and R of the optimum control, and the merit of the control method which uses the aforementioned equation (46) which directly specifies the frequency response characteristic of disturbance suppression is lost.

Next, a description will be given of the above-described <Problem 2>. In the control system of the present embodiment, the dead time d exists between the air-fuel ratio correction coefficient KAF and the detected equivalent ratio KACT, and the aforementioned equation (2) is used as the control target model of the control system. In this case, the transfer function P(z) in the Z-domain of the control target of the equation (2) is expressed by the following equation (50):

$$P(z) = \frac{KACT(z)}{KAF(z)} = \frac{\alpha}{z^d \cdot (z - (1 - \alpha))} = \frac{\alpha \cdot z^{-(d+1)}}{1 - (1 - \alpha) \cdot z^{-1}} \quad (50)$$

Figure 18:
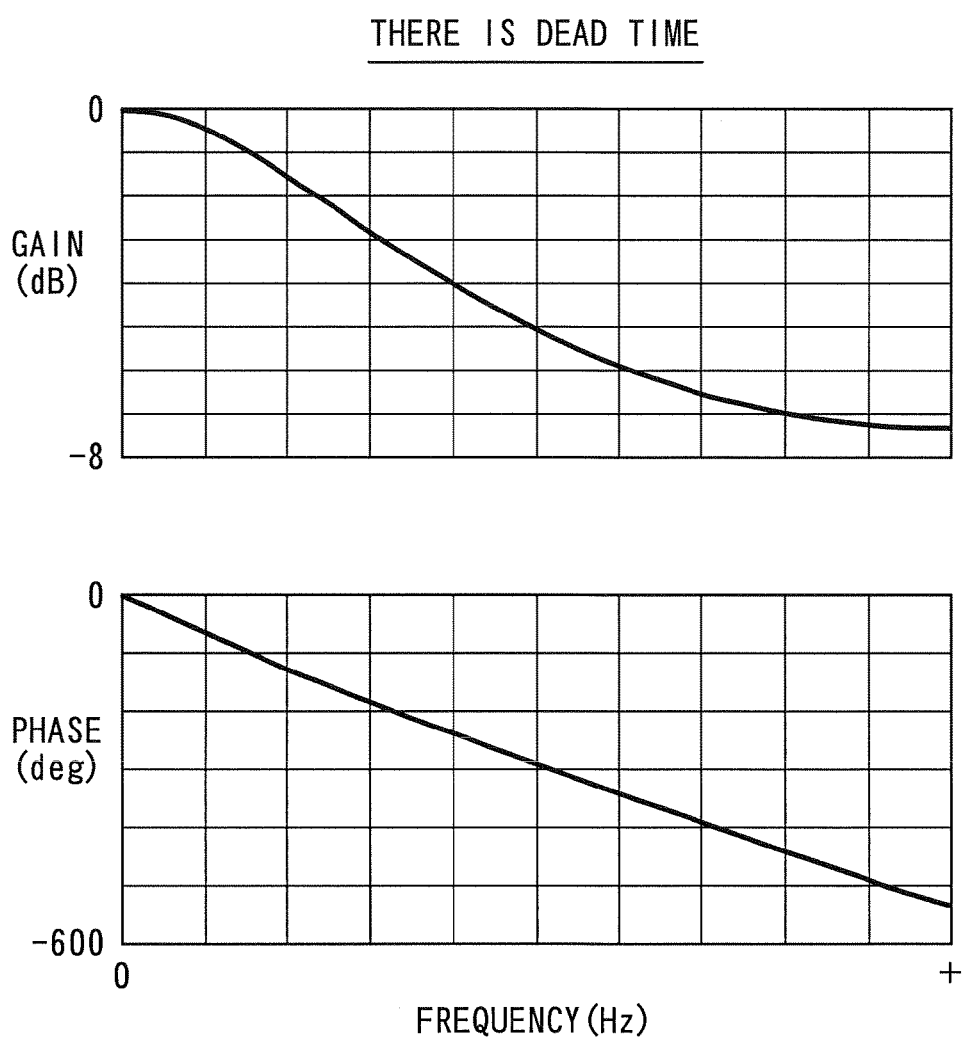
FIG. 18 is a Bode diagram of a transfer function P of an equation (50)

A Bode diagram of the transfer function P(z) of the equation (50) obtained by setting d=2 is shown in FIG. 18, and a Bode diagram of the transfer function P(z) of the control system with no dead time d expressed by the aforementioned equation (41) is shown in FIG. 19. As is apparent from a comparison between FIGS. 18 and 19, existence or non-existence of the dead time d does not appear as a difference between gain characteristics, which makes it impossible to represent the dead time as the above-described modeling error Δl. Therefore, the control method of using the above-mentioned equation (46), i.e. the control method of specifying the gain of the controller by the gain characteristics of the sensitivity function Sd and the complementary sensitivity function Td makes it impossible to take robustness against the dead time into account and compensate therefor.

On the other hand, it is well known that when dead time exists in the control system, the stability of the control system is markedly reduced, and to avoid this inconvenience, if the above-described control method is applied to the control system with the dead time, there is a fear that the control system diverges.

Further, if the aforementioned equations (42) and (50) are substituted into the aforementioned equation (44) to thereby derive the transfer function C(z) for the controller, there is obtained the following equation (51):

$$C(z) = \frac{1 - Sd(z)}{Sd(z)} \cdot \frac{1}{P(z)} \quad (51)$$
$$= \frac{(\beta \cdot z - (1 - \alpha) \cdot \beta) \cdot z^d}{\alpha(z - 1)}$$
$$= \frac{\beta \cdot z^d - (1 - \alpha) \cdot \beta \cdot z^{d-1}}{\alpha(1 - z^{-1})}$$

When this equation (51) is expressed by a recurrence formula of a discrete-time system, there is obtained the following equation (52):

$$KAF(k) = \frac{1}{\alpha} \{\beta \cdot e(k + d) - (1 - \alpha) \cdot \beta \cdot e(k + d - 1) - \alpha \cdot KAF(k - 1)\} \quad (52)$$

In this equation (52), future values e(k+d) and e(k+d−1) of the follow-up error e are included in the right side of the equation (52), so that it is impossible to realize the control algorithm for the controller.

Further, in the case of the controlled object of the present embodiment, the dead time d between the air-fuel ratio correction coefficient KAF as a control input and the detected equivalent ratio KACT as a controlled variable has a characteristic that it sequentially changes according to the exhaust gas volume Vex, as shown in FIG. 2, referred to hereinabove, and hence the above-described control method in which the frequency response characteristic of disturbance suppression is directly specified is naturally not applicable to a control system in which the dead time d changes, since the control method is not applicable to the controlled object with the dead time.

As described above, to solve the above-mentioned problems 1 and 2, it is required to construct a control algorithm which is capable of coping with fluctuation and variation in the model parameter α (i.e. changes in the first-order lag characteristic) of the control target model caused by changes in the exhaust gas volume Vex, and at the same time is capable of coping with changes in the dead time d thereof, while using the controller which uses the above-described sensitivity function Sd or complementary sensitivity function Td, i.e. the control algorithm which directly specifies the frequency response characteristic of disturbance suppression.

To meet the requirements, according to the control apparatus 1 of the present embodiment, first, the onboard identifier 60 calculates the identified value αid of the model parameter α with the above-described identification algorithm, and then the state predictor 40 calculates, with the above-described prediction algorithm, values of the predicted equivalent ratio PRE_KACT corresponding to respective values of the detected equivalent ratio KACT associated with respective times when the dead time d elapses.

Then, the predicted equivalent ratio PRE_KACT is used in place of the detected equivalent ratio KACT, as the control algorithm for the frequency shaping controller 130, and further the following equation (53) obtained by replacing the model parameter α of the aforementioned equation (2) with the identified value αid is used as a control target model, whereby the aforementioned equations (34) and (35) are derived by the same method of deriving the aforementioned equation (46)

$$KACT(k+1)=(1-\alpha id(k))\cdot KACT(k)+\alpha id(k)\cdot KAF(k) \quad (53)$$

This equation (53) is obtained by replacing a of the aforementioned equation (1) with αid. In other words, it corresponds to an equation obtained by removing the dead time characteristic from the aforementioned equation (2) of the control target model (equation in which the dead time characteristic is not taken into account).

Figure 20:
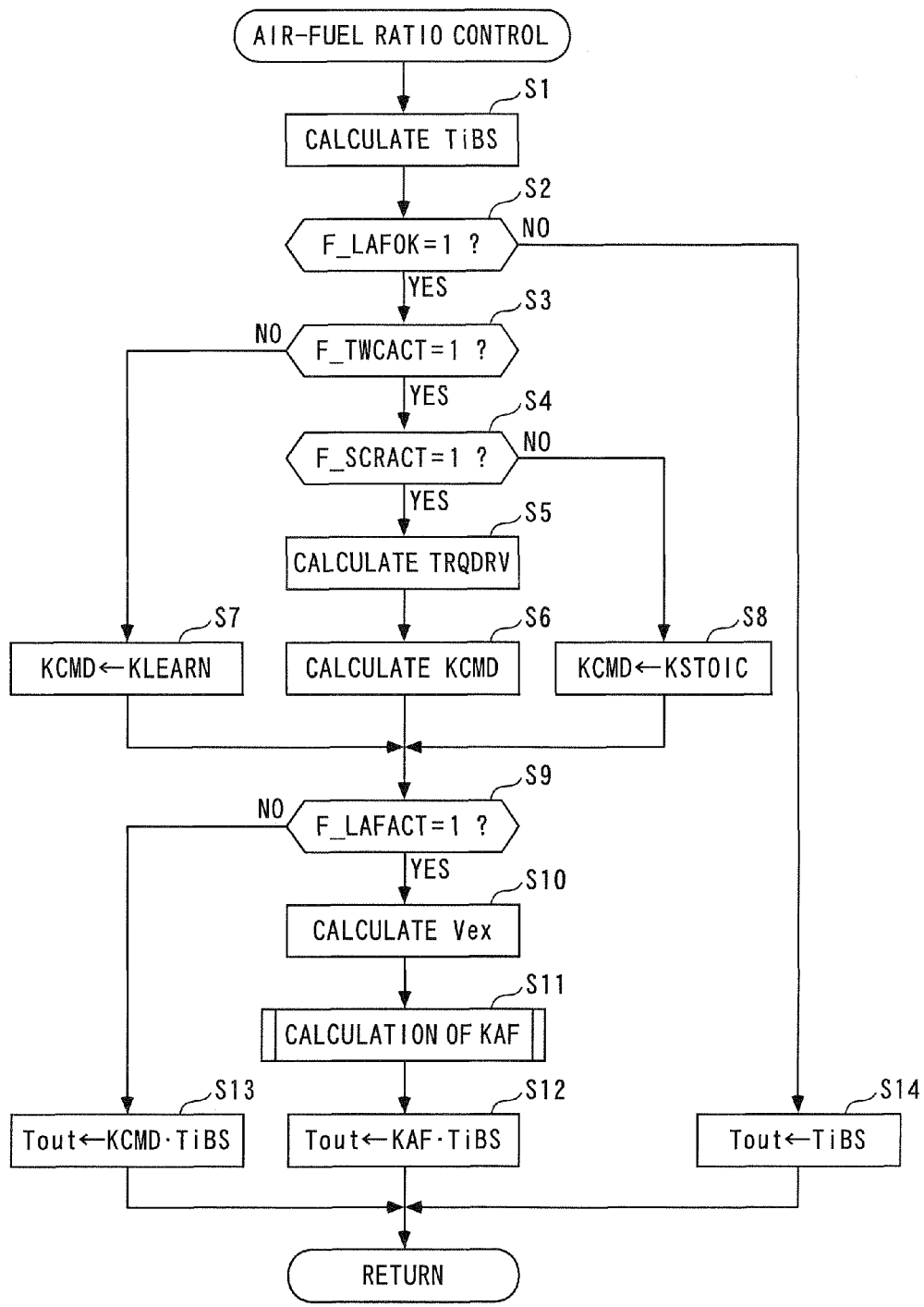
FIG. 20 is a flowchart of an air-fuel ratio control process.

Next, the air-fuel ratio control process executed by the ECU 2 will be described with reference to FIG. 20. As described hereinafter, the air-fuel ratio control process calculates a fuel injection amount Tout of fuel to be injected from the fuel injection valves 4, and is executed at the aforementioned predetermined control period ΔT.

In the air-fuel ratio control process, first, in a step 1 (shown as S1 in abbreviated form in FIG. 20; the following steps are also shown in abbreviated form), a basic injection amount TiBS is calculated by searching a map, not shown, according to the engine speed NE and the intake pressure PB.

Then, the process proceeds to a step 2, wherein it is determined whether or not a LAF sensor normality flag F_LAFOK is equal to 1. When it is determined in a determination process, not shown, that the LAF sensor 23 is normal, the LAF sensor normality flag F_LAFOK is set to 1, and otherwise set to 0.

If the answer to the question of the step 2 is negative (NO), i.e. if the LAF sensor 23 is faulty, the process proceeds to a step 14, wherein the fuel injection amount Tout is set to the basic injection amount TiBS, followed by terminating the present process.

On the other hand, if the answer to the question of the step 2 is affirmative (YES), i.e. if the LAF sensor 23 is normal, the process proceeds to a step 3, wherein it is determined whether or not a three-way catalyst activation flag F_TWCACT is equal to 1. When it is determined in a determination process, not shown, that the two three-way catalysts 11 and 12 have both been activated, the three-way catalyst activation flag F_TWCACT is set to 1, and otherwise set to 0.

If the answer to the question of the step 3 is negative (NO), i.e. if at least one of the two three-way catalysts 11 and 12 has not been activated, the process proceeds to a step 7, wherein the target equivalent ratio KCMD is set to a predetermined leaning control value KLEARN. The predetermined leaning control value KLEARN is set to such a value (e.g. 0.9) as will make it possible to suppress generation of HC immediately after the start of the engine 3.

On the other hand, if the answer to the question of the step 3 is affirmative (YES), i.e. if the two three-way catalysts 11 and 12 have both been activated, the process proceeds to a step 4, wherein it is determined whether or not an SCR activation flag F_SCRACT is equal to 1. When it is determined in a determination process, not shown, that the two selective reduction catalysts 14 and 15 have both been activated, the SCR activation flag F_SCRACT is set to 1, and otherwise set to 0.

If the answer to the question of the step 4 is negative (NO), i.e. if at least one of the two selective reduction catalysts 14 and 15 has not been activated, the process proceeds to a step 8, wherein the target equivalent ratio KCMD is set to a predetermined stoichiometric air-fuel ratio control value KSTOIC. The stoichiometric air-fuel ratio control value KSTOIC is set to a value (=1) of the equivalent ratio corresponding to the stoichiometric air-fuel ratio.

On the other hand, if the answer to the question of the step 4 is affirmative (YES), i.e. if the two selective reduction catalysts 14 and 15 have both been activated, the process proceeds to a step 5, wherein the demanded torque TRQDRV is calculated by searching a map, not shown, according to the engine speed NE and the accelerator pedal opening AP.

Then, the process proceeds to a step 6, wherein the target equivalent ratio KCMD is calculated by searching the above-described FIG. 4 map according to the engine speed NE and the demanded torque TRQDRV.

In a step 9 following one of the above-described steps 6 to 8, it is determined whether or not, a LAF sensor activation flag F_LAFACT is equal to 1. When it is determined in a determination process, not shown, that the LAF sensor 23 has been activated, the LAF sensor activation flag F_LAFACT is set to 1, and otherwise set to 0.

If the answer to the question of the step 9 is negative (NO), i.e. if the LAF sensor 23 has not been activated, the process proceeds to a step 13, wherein the fuel injection amount Tout is set to the product KCMD·TiBS of the target equivalent ratio and the basic injection amount TiBS, followed by terminating the present process.

On the other hand, if the answer to the question of the step 9 is affirmative (YES), i.e. if the LAF sensor 23 has been activated, the process proceeds to a step 10, wherein the exhaust gas volume Vex is calculated by searching a map, not shown, according to the engine speed NE and the intake pressure PB.

Next, the process proceeds to a step 11, wherein the air-fuel ratio correction coefficient KAF is calculated with the aforementioned control algorithm. Specifically, first, the predicted equivalent ratio PRE_KACT is calculated using the prediction algorithm expressed by the aforementioned equations (3) to (7) and the weight function values Wdi calculated by searching the FIG. 6 map. Further, the identified value αid is calculated using the identification algorithm expressed by the aforementioned equations (17) to (29), the reference model parameter αbs calculated by searching the FIG. 10 map and the weight function values Wai calculated by searching the FIG. 11 map. Then, the air-fuel ratio correction coefficient KAF is finally calculated using the calculated predicted equivalent ratio PRE_KACT and the identified value αid, by the aforementioned equations (34) and (35).

In a step 12 following the step 11, the fuel injection amount Tout is set to the product KAF·TiBS of the air-fuel ratio correction coefficient and the basic injection amount, followed by terminating the present process.

The control apparatus 1 according to the present embodiment calculates the fuel injection amount Tout by the above-described air-fuel ratio control process, and although not shown, calculates fuel injection timing according to the fuel injection amount Tout and the engine speed NE. Further, the control apparatus 1 drives the fuel injection valves 4 by a control input signal generated based on the fuel injection amount Tout and the fuel injection timing, to thereby control the air-fuel ratio of the mixture.

Figure 21:
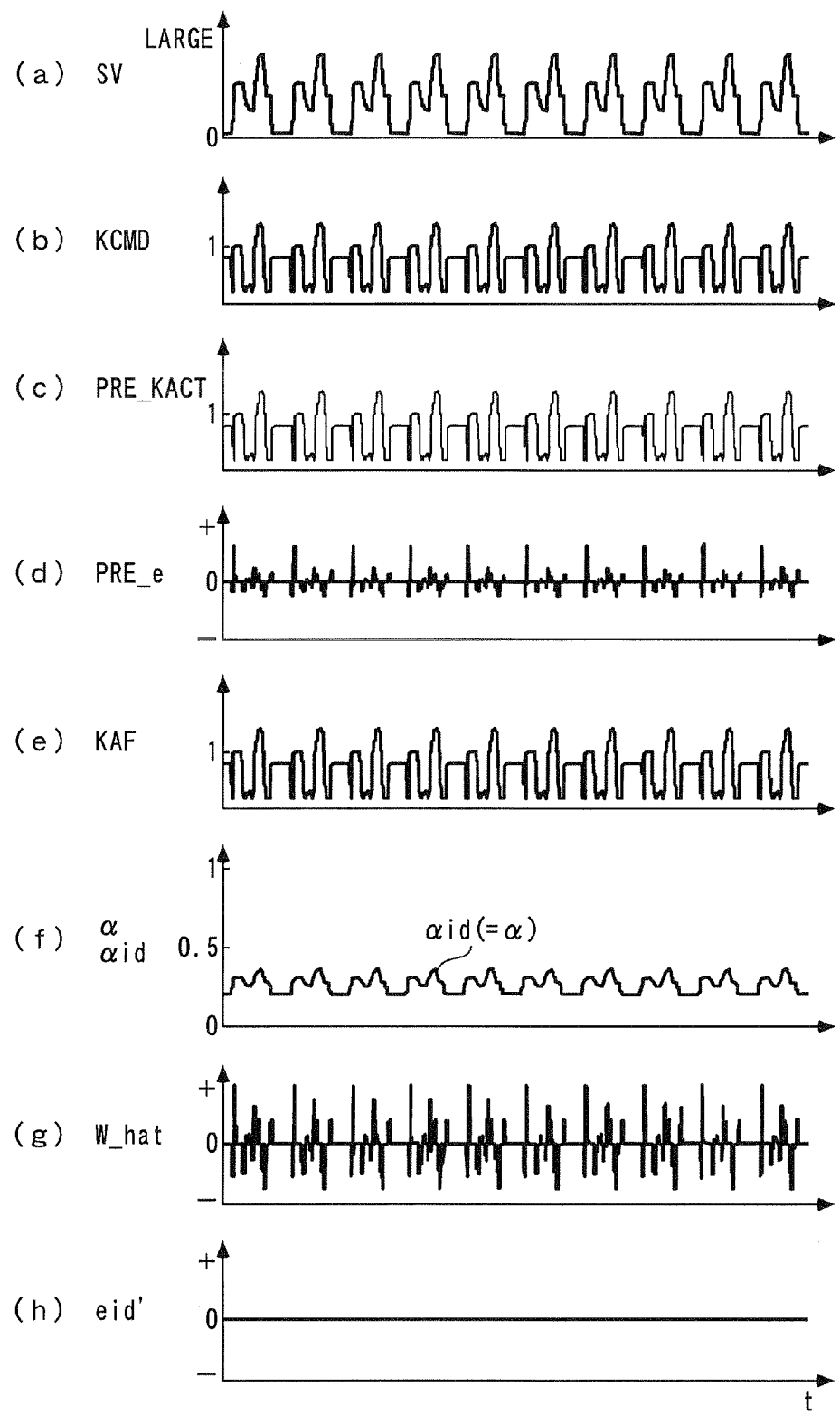
FIG. 21 is a timing diagram of an example of results of a simulation of air-fuel ratio control performed by the control apparatus according to the first embodiment, under simulation conditions that there is no modeling error.
Figure 22:
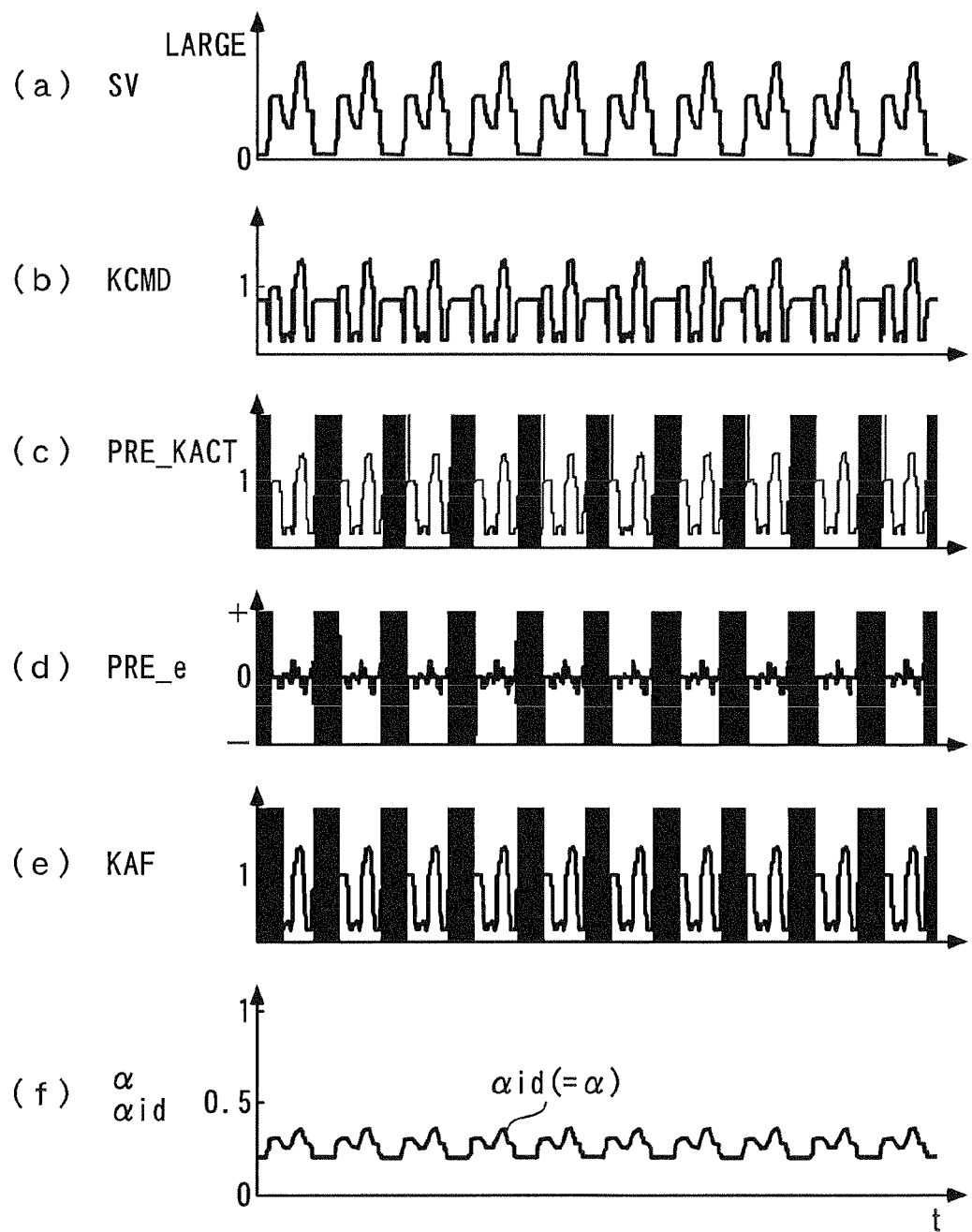
FIG. 22 is a timing diagram, for comparison, of results of a control simulation in a case where calculations of an identified value $\alpha id$ and a predicted equivalent ratio PRE_KACT by the control apparatus are stopped under the simulation conditions that there is no modeling error.
Figure 23:
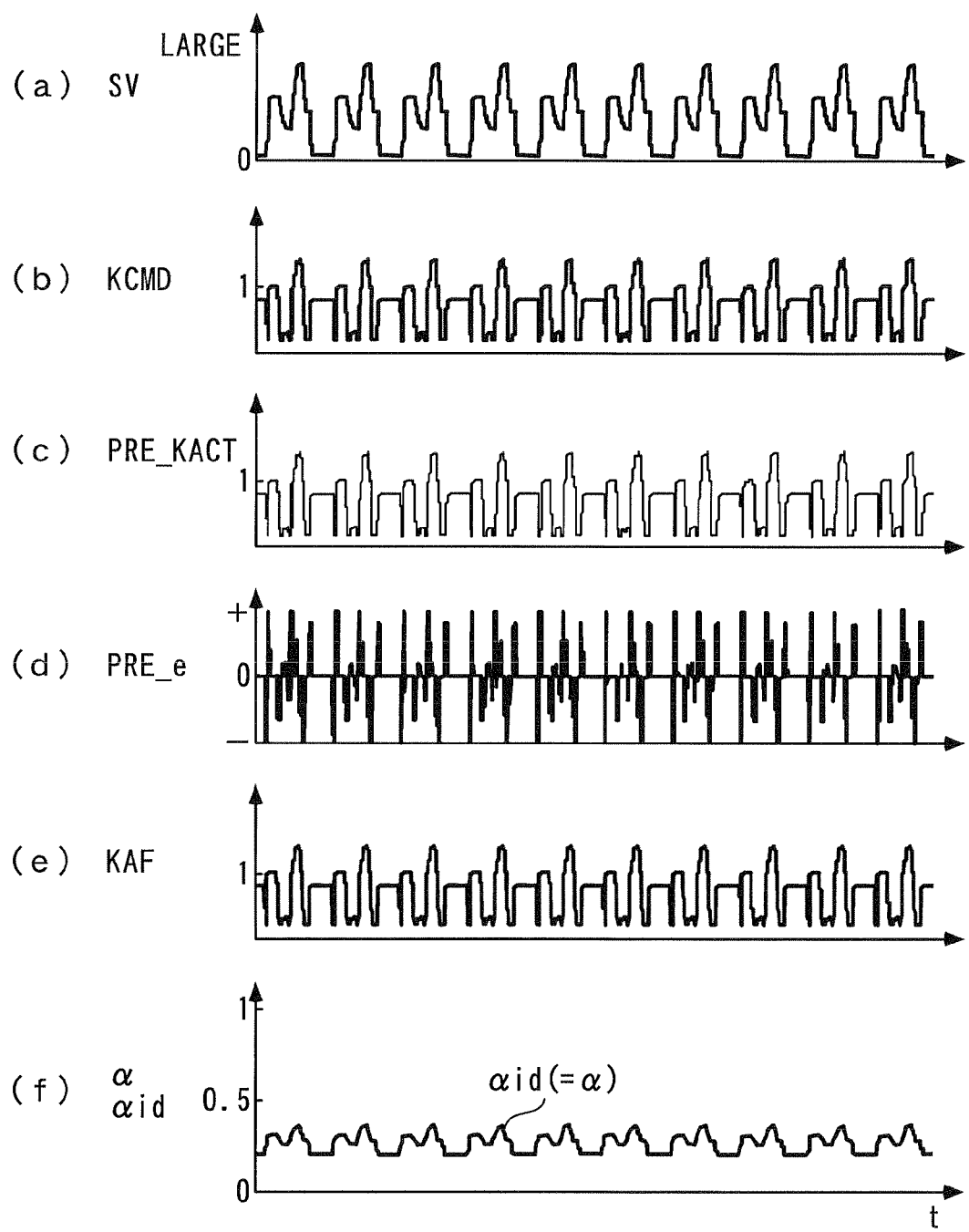
FIG. 23 is a timing diagram, for comparison, of results of a control simulation in a case where the calculations of the identified value $\alpha id$ and the predicted equivalent ratio PRE_KACT by the control apparatus are stopped and a value of a sensitivity-setting parameter $\beta$ is changed, under the simulation conditions that there is no modeling error.

Next, results of simulations of the air-fuel ratio control which is carried out by the control apparatus 1 according to the present embodiment (hereinafter referred to as "control results") will be described with reference to FIGS. 21 to 27. First, a description is given of FIGS. 21 to 23. Each of FIGS. 21 to 23 shows control results in a case where a simulation condition that there is no modeling error in the control target model expressed by the equation (2) (specifically, that α=αbs holds) is set. FIG. 21 shows an example of the results of the control performed by the control apparatus 1 according to the present embodiment.

Further, FIG. 22 shows, for comparison with the FIG. 21 example, an example of the control results in a case where in the control apparatus 1, calculations by the state predictor 40 and the onboard identifier 60 are omitted, specifically, PRE_KACT(k)=KACT(k) and a id(k)=αbs(k) are set, respectively, as simulation conditions (hereinafter referred to as "Comparative Example 1"). Furthermore, FIG. 23 shows, for comparison with the FIG. 21 example, an example of the control results in a case where in the control apparatus 1, calculations by the state predictor 40 and the onboard identifier 60 are omitted, and a value ⅙ times as large as a set value of the present embodiment is used as the sensitivity-setting parameter β (hereinafter referred to as "Comparative Example 2").

First, referring to Comparative Example 1 shown in FIG. 22, it is understood that when the exhaust gas volume Vex is small, the predicted equivalent ratio PRE_KACT, i.e. the detected equivalent ratio KACT diverges, and accordingly the predicted follow-up error PRE_e and the air-fuel ratio correction coefficient KAF also diverge. That is, it is understood that when the controlled object having the dead time and the first-order lag characteristic is controlled by using only the frequency shaping controller 130, robustness specified by the complementary sensitivity function Td cannot be properly maintained, and especially, under a condition that the exhaust gas volume Vex is small, which will increase the dead time d, the air-fuel ratio correction coefficient KAF as a control input diverges.

Next, referring to Comparative Example 2 shown in FIG. 23, it is understood that in the case of Comparative Example 2, compared with Comparative Example 1 described above, the stability and control accuracy of the control system are improved. This is because the sensitivity-setting parameter β of the sensitivity function Sd is set to a value ⅙ times as large as the set value of the sensitivity-setting parameter β in Comparative Example 1, thereby lowering the feedback gain, in other words, thereby reducing the ability of suppressing a disturbance. In this case, the sensitivity-setting parameter β is set to a limit value within which it is possible to maintain the stability of the control system, by try and error. Therefore, it is impossible to realize the object of the present invention that the ability of suppressing a disturbance is directly specified by setting the sensitivity function Sd such that the aforementioned control condition φ is satisfied.

On the other hand, in the control results of the present embodiment shown FIG. 21, it is understood that under the condition that there is no modeling error, the stability and control accuracy of the control are improved compared with Comparative Examples 1 and 2, by the algorithms for the state predictor 40, the onboard identifier 60, and the frequency shaping controller 130.

Figure 24:
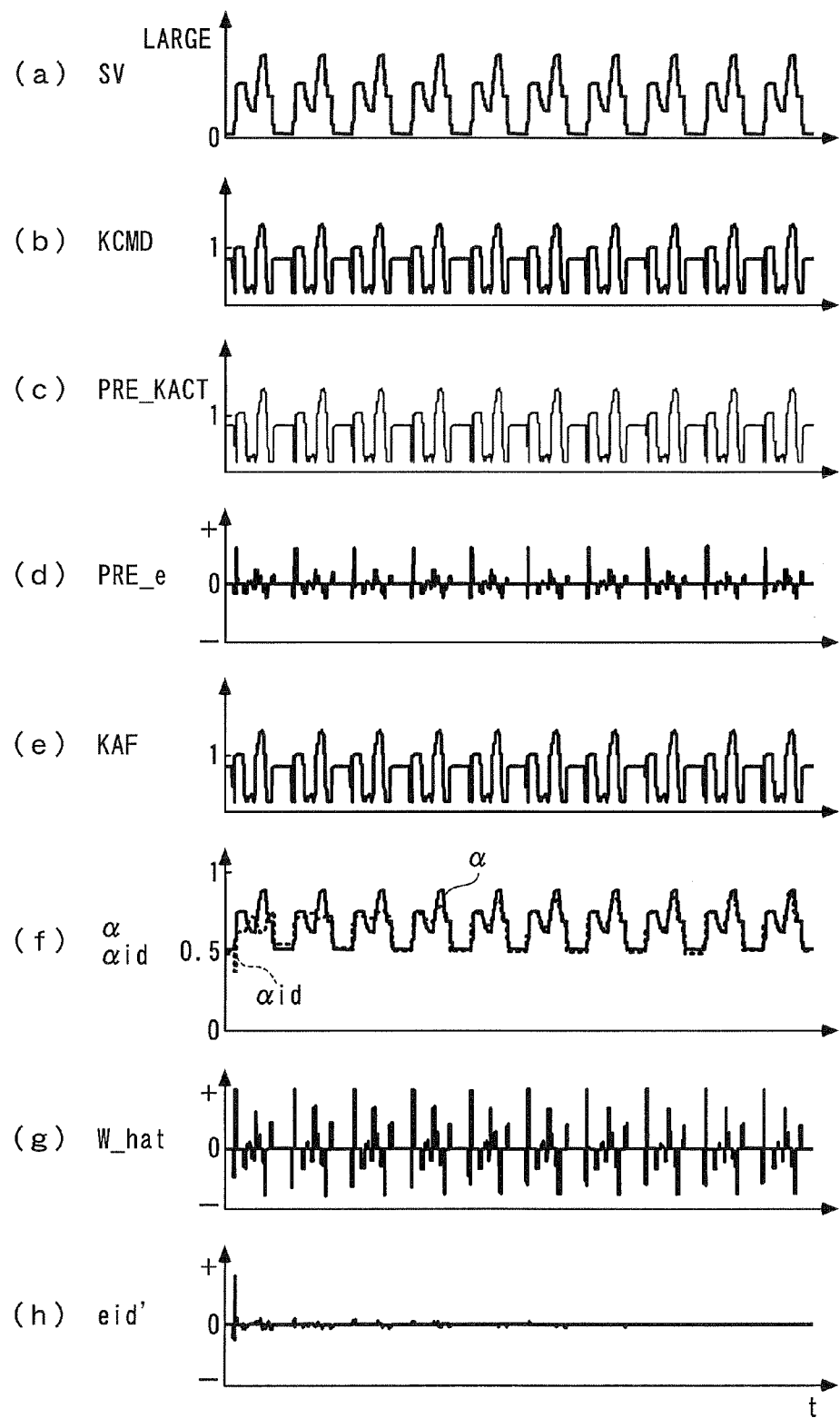
FIG. 24 is a timing diagram of an example of results of a simulation of the air-fuel ratio control performed by the control apparatus according to the first embodiment, under simulation conditions that there is a modeling error.

Next, a description will be given of FIGS. 24 to 27. Each of FIGS. 24 to 27 shows control results in a case where a simulation condition that there is a modeling error in the control target model expressed by the equation (2) (specifically, α=2·αbs is set). FIG. 24 shows an example of the results of the control performed by the control apparatus 1 according to the present embodiment.

Figure 25:
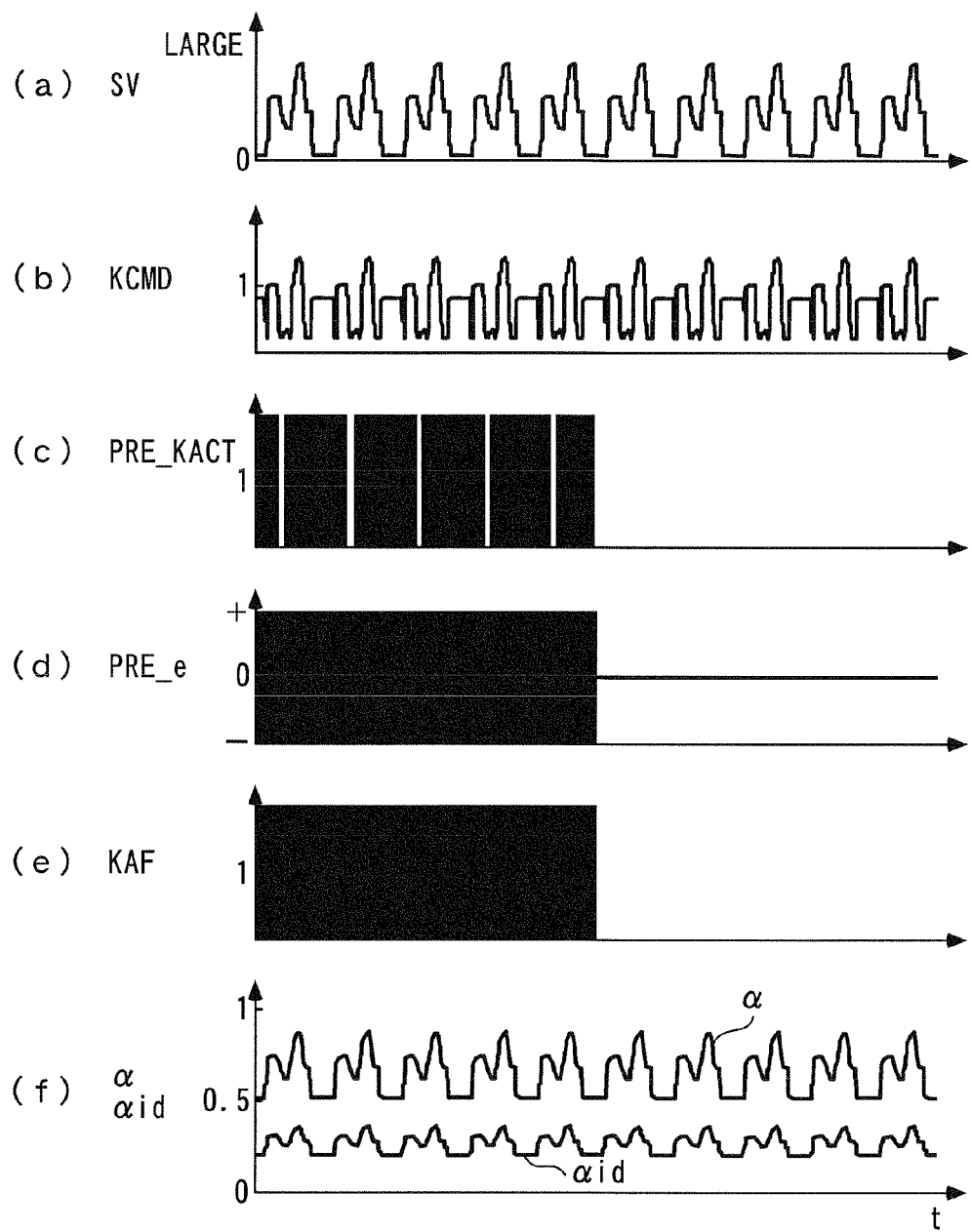
FIG. 25 is a timing diagram, for comparison, of results of a control simulation in a case where calculations of the identified value $\alpha id$ and the predicted equivalent ratio PRE_KACT by the control apparatus are stopped under the simulation conditions that there is a modeling error.
Figure 26:
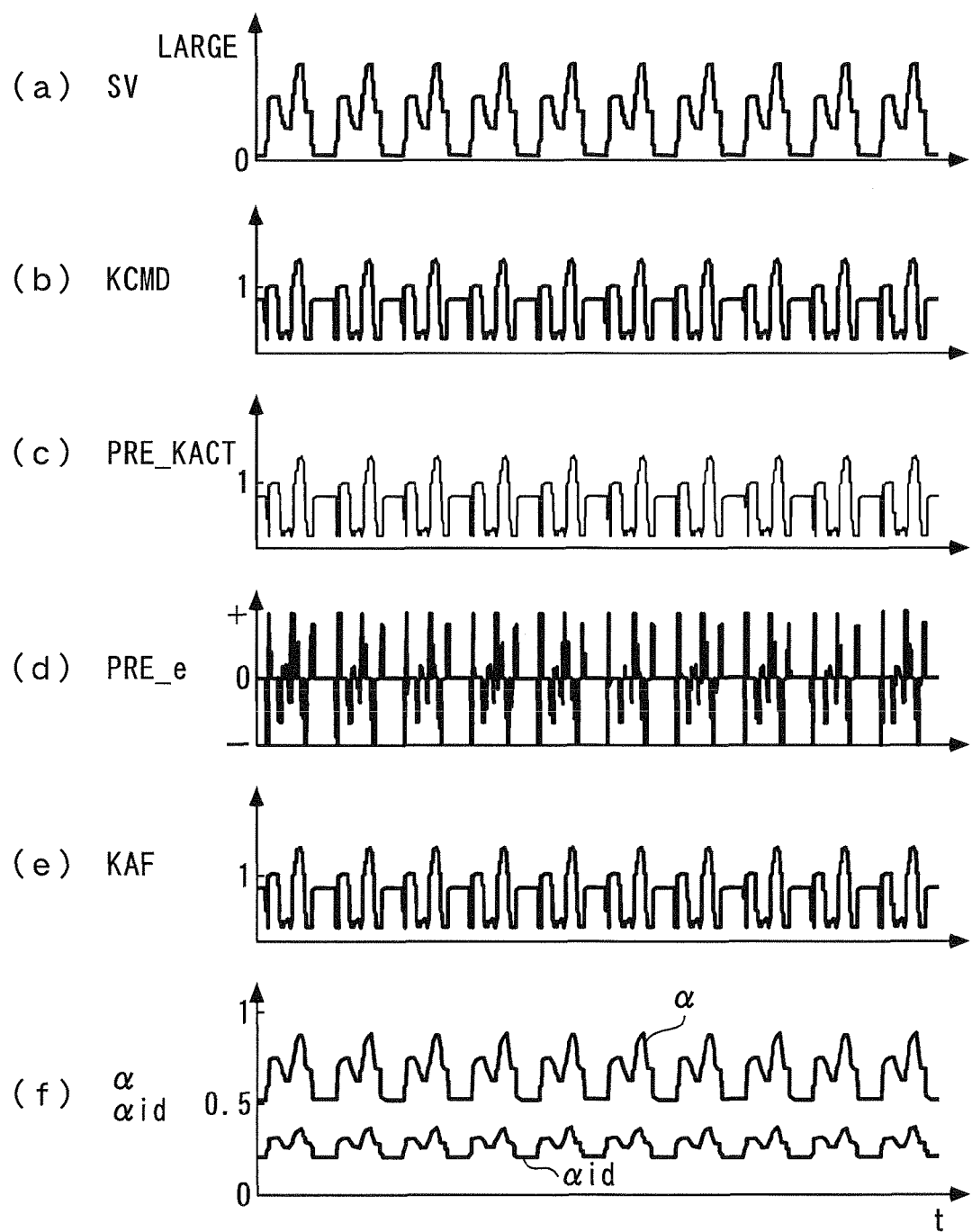
FIG. 26 is a timing diagram, for comparison, of results of a control simulation in a case where the calculations of the identified value $\alpha id$ and the predicted equivalent ratio PRE_KACT by the control apparatus are stopped and the value of the sensitivity-setting parameter $\beta$ is changed, under the simulation conditions that there is a modeling error.

Further, FIG. 25 shows, for comparison with the FIG. 24 example, an example of the control results in a case where in the control apparatus 1, calculations by the state predictor 40 and the onboard identifier 60 are omitted as a simulation condition (hereinafter referred to as "Comparative Example 3"). Furthermore, FIG. 26 shows, for comparison with the FIG. 24 example, an example of the control results in a case where in the control apparatus 1, calculations by the state predictor 40 and the onboard identifier 60 are omitted, and a value ⅙ times as large as the set value of the present embodiment is used as the sensitivity-setting parameter (hereinafter referred to as "Comparative Example 4"). In addition, FIG. 27 shows, for comparison with the FIG. 24 example, an example of the control results in a case where in the control apparatus 1, only the calculation by the onboard identifier 60 is omitted, i.e. αid(k)=αbs(k) is set (hereinafter referred to as "Comparative Example 5").

First, referring to Comparative Example 3 shown in FIG. 25, it is understood that in the case of Comparative Example 3, under the simulation condition that there is a modeling error in the control target model, the stability of the control system is impaired not only by reduction of the margin of the stability of the control system due to the dead time but also by the adverse influence of the modeling error, and all the parameters, including the air-fuel ratio correction coefficient KAF, diverge in a whole range of the exhaust gas volume Vex. That is, it is understood that when the controlled object with the dead time is controlled by using only the frequency shaping controller 130, the control stability and the control accuracy are markedly reduced under the simulation condition that there is a modeling error.

Next, referring to Comparative Example 4 shown in FIG. 26, it is understood that in the case of Comparative Example 4, the diverged states of the parameters as occurring in Comparative Example 3, described above, does not occur, and the stability of the control system is improved compared with Comparative Example 3. This improvement is caused by the set value of the sensitivity-setting parameter β. In the case of Comparative Example 4, however, it is understood that although the stability of the control system is improved compared with Comparative Example 3, there occurs a state where the value of the predicted follow-up error PRE_e temporarily becomes too large, which results in the degraded control accuracy of the control system. Moreover, as described above, since the sensitivity-setting parameter β is set to the value ⅙ times as large as the set value of the present embodiment, it is impossible to realize the object of the present invention that the ability of suppressing a disturbance is directly specified by setting the sensitivity function Sd such that the control condition φ is satisfied.

Figure 27:
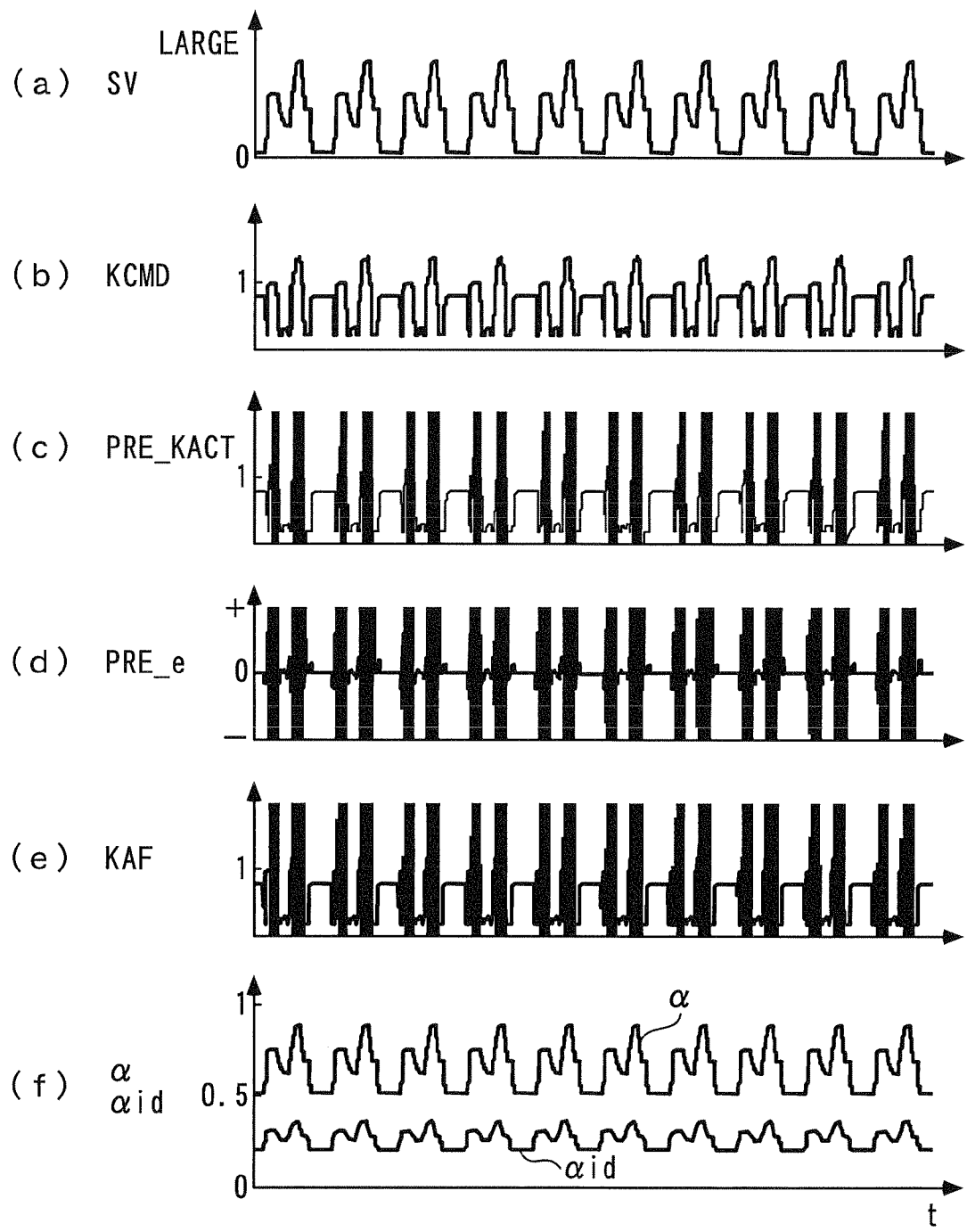
FIG. 27 is a timing diagram, for comparison, of results of a control simulation in a case where only the calculation of the identified value $\alpha id$ by the control apparatus is stopped under the simulation conditions that there is a modeling error.

Further, referring to Comparative Example 5 shown in FIG. 27, it is understood that in the case of Comparative Example 5, the stability of the control system is improved compared with Comparative Example 3, described above. This is because even when the dead time d sequentially changes with changes in the exhaust gas volume Vex, the state predictor 40 calculates the predicted equivalent ratio PRE_KACT while causing such a change in the dead time d to be reflected on the predicted equivalent ratio, so that it is possible to properly compensate for the adverse influence of the change in the dead time d, thereby making it possible to improve the stability of the control system. However, it is understood that also in the case of Comparative Example 5, the parameters, such as the air-fuel ratio correction coefficient KAF, diverge due to an increase in the modeling error in a range where the exhaust gas volume Vex is large.

On the other hand, in the case of control results of the present embodiment shown in FIG. 24, it is understood that even under the simulation condition that there is a modeling error, the stability and control accuracy of the control system are improved compared with Comparative Examples 3 to 5, by the algorithms for the state predictor 40, the onboard identifier 60, and the frequency shaping controller 130. For example, it is understood that the predicted follow-up error PRE_e is held small by the prediction algorithm for the state predictor 40, and the identified value αid is caused to converge to the model parameter α with the lapse of time, by the identification algorithm for the onboard identifier 60.

As described above, according to the control apparatus 1 according to the first embodiment, the onboard identifier 60 calculates the identified value αid of the model parameter α with the identification algorithm expressed by the above-mentioned equations (17) to (29) using the equation (30) as the control target model. In the case of this equation (30), since the control target model is a model of a first-order lag system, the two model parameters α and 1−α are defined using one model parameter α, and the restraint condition that the sum of the two model parameters becomes equal to 1 is set. Therefore, when a general identification algorithm, such as the sequential least-squares method, is directly employed, it is impossible to identify the two model parameters α and 1−α such that the restraint condition is satisfied. In contrast, in the case of the identification algorithm for the onboard identifier 60, the identified value αid is calculated with the identification algorithm to which the sequential least-squares method is applied, such that the identification error eid' as the difference between the combined signal value W_act expressed by the equation (32) derived from the equation (30) and the estimated combined signal value W_hat expressed by the equation (33) derived from the equation (30) is minimized, and hence it is possible to properly calculate the identified value αid while satisfying the above-mentioned restraint condition. That is, it is possible to accurately identify onboard the model parameters while satisfying the above-mentioned restraint condition. Then, since the air-fuel ratio correction coefficient KAF is calculated using the identified value αid identified as above, it is possible to prevent the modeling error due to changes in the first-order lag characteristic caused by changes in the exhaust gas volume Vex, variation between the individual products and aging of the component parts from increasing, whereby it is possible to improve the control accuracy and stability in the air-fuel ratio control.

Further, the onboard identifier 60 calculates the identified value αid of the model parameter by adding the total sum of the products Wai·dαi of the four weight function values wai (i=1 to 4) and the four modification values dαi to the reference model parameter αbs, so that the reference model parameter αbs is used as an initial value of the identified value αid at a time when the identification computation is started. In addition to this, the exhaust gas volume Vex has a high correlation with the first-order lag characteristic between the air-fuel ratio correction coefficient KAF and the detected equivalent ratio KACT. The reference model parameter αbs is calculated by searching the FIG. 10 map according to the exhaust gas volume Vex. Therefore, even immediately after the calculation of the identified value αid of the model parameter is started, it is possible to calculate the identified value αid while causing the actual state of the first-order lag characteristic to be reflected on the identified value αid.

Further, the four range identification errors Wai·Kp'·eid' are calculated by multiplying each of the four weight function values Wai by the identification error eid' and the identification gain Kp', and the four modification values dαi are calculated such that the four range identification errors Wai·Kp'·eid' are each minimized. In the case of this calculation, the four weight function values Wai are calculated by searching the FIG. 11 map according to the exhaust gas volume Vex as described above, so that the four modification values dαi are calculated such that the identification errors in the first to fourth ranges are each minimized, while causing the changes in the first-order lag characteristic caused by changes in the exhaust gas volume Vex to be reflected on the four modification values dαi. Further, the identified value αid is calculated by adding the total sum of the respective products Wai·dαi of the four modification values dαi and the four weight function values wai to the reference model parameter αbs, and hence it is possible to calculate the identified value αid such that it approaches the actual value of the model parameter while causing the changes in the first-order lag characteristic caused by changes in the exhaust gas volume Vex to be reflected on the identified value αid.

Further, the four weight function values Wai, as described above, are set such that they are associated with the first to fourth ranges of the exhaust gas volume Vex, respectively, and are set to a value other than 0 in the ranges associated therewith, whereas in ranges other than the associated ranges, they are set to 0, and further, since the four ranges are set such that adjacent ones thereof overlap each other, even when the first-order lag characteristic suddenly changes with a sudden change in the exhaust gas volume Vex, it is possible to calculate the identified value αid of the model parameter such that it changes steplessly and smoothly, while properly compensating for the sudden change in the first-order lag characteristic. For the above reason, even when the engine 3 is in the transient operating condition, it is possible to accurately calculate the identified value αid, whereby it is possible to ensure the high-level control accuracy and the stability of control.

Furthermore, the identification gain Kp' is calculated by the above-mentioned equations (19), (22) to (24) such that the identification gain Kp' defines a direction (positive or negative) and amount of modification of the identified value αid, and the identified value αid of the model parameter is calculated such that the four range identification errors Wai·Kp'·eid' which are the products of the identification gain Kp', the four weight function values Wai, and the identification error eid' are each minimized. Therefore, even when it is necessary to modify the direction of modification of the reference model parameter αbs due to changes in the operating conditions of the engine 3, it is possible to modify the reference model parameter αbs in an appropriate direction. From the above, it is possible to further improve the control accuracy and stability in the air-fuel ratio control.

In addition to this, the equations (34) and (35) used by the frequency shaping controller 130 for calculating the air-fuel ratio correction coefficient KAF are derived based on the control target model expressed by the equation (53) defined using the sensitivity function Sd set such that the above-mentioned control condition φ is satisfied (i.e. such that the predetermined frequency characteristic is obtained) and the above-described identified value αid. Therefore, it is possible to directly specify (set) the disturbance suppression characteristic and the robustness of the control apparatus 1 while properly compensating for changes in the first-order lag characteristic caused by changes in the exhaust gas volume Vex. This makes it possible to make a dramatic improvement in the ability of suppressing a disturbance and the robustness, in a frequency range within which a change in the controlled variable due to the disturbance is desired to be suppressed.

Although in the first embodiment, the exhaust gas volume Vex is used as the reference parameter, the first reference parameter, and the second reference parameter, by way of example, the reference parameter, the first reference parameter, and the second reference parameter of the present invention are not limited to these, but they are only required to have influence on the lag characteristic of the controlled object having the first or higher order lag characteristic as a dynamic characteristic thereof. For example, in the first embodiment, the engine speed NE may be used as the reference parameter, the first reference parameter, and the second reference parameter.

Further, although in the first embodiment, one value (the exhaust gas volume Vex) is used as the first reference parameter and the second reference parameter, by way of example, not the same value, but different values from each other may be used as the first reference parameter and the second reference parameter of the present invention. For example, the exhaust gas volume Vex may be as one of the first reference parameter and the second reference parameter, and the engine speed NE may be used as the other of the same.

Furthermore, although in the first embodiment, as a number M of weight function values, there are used the four weight function values Wa1 to Wa4, the number of weight function values of the present invention is not limited to this, but it is only required to be not less than two.

In addition to this, in the control apparatus 1 of the first embodiment, the state predictor 40 may be omitted, and the detected equivalent ratio KACT may be used in place of the predicted equivalent ratio PRE_KACT, in the control algorithm for the frequency shaping controller 130, expressed by the equations (34) and (35).

On the other hand, the onboard identifier 60 according to the first embodiment may be configured such that the identified value αid is calculated with an identification algorithm expressed by the following equations (54) to (67) in place of the identification algorithm expressed by the equations (17) to (29).

$$KAF\_mod(k) = \sum_{i=1}^{4} Wdi(k) \cdot KAF(k-4+i) \tag{54}$$

$$W\_act(k)=KACT(k)-KACT(k-1) \tag{55}$$

$$\zeta'(k-1)=KAF\_mod(k-1)-KACT(k-1) \tag{56}$$

$$W\_hat(k)=\alpha id(k-1)\cdot\zeta'(k-1) \tag{57}$$

$$eid'(k)=W\_act(k)-W\_hat(k) \tag{58}$$

$$P'(k) = \frac{1}{\lambda 1} \cdot \left(1 - \frac{\lambda 2 \cdot P'(k-1) \cdot \zeta'(k-1)}{\lambda 1 + \lambda 2 \cdot P'(k-1) \cdot \zeta'(k-1)}\right) P'(k-1) \tag{59}$$

$$Kp'(k) = \frac{P'(k) \cdot \zeta'(k-1)}{1 + P'(k) \cdot \zeta'(k-1)} \tag{60}$$

$$P'(0)=P0 \tag{61}$$

When $\alpha\_H < \alpha id(k-1)$ holds, $$H(k)=\eta' \tag{62}$$

When $\alpha\_L \le \alpha id(k-1) \le \alpha\_H$ holds, $$H(k)=1 \tag{63}$$

When $\alpha id(k-1) < \alpha\_L$ holds, $$H(k)=\eta' \tag{64}$$

$$\alpha bs'(k)=\alpha bs(k)\cdot K\alpha bs(k) \tag{65}$$

$$d\alpha ijh'(k)=H(k)\cdot d\alpha ijh'(k-1)+Wai(k)\cdot Wanj(k)\cdot Waah(k)\cdot Kp'(k)\cdot eid'(k)(i=1\sim4,j=1\sim4,h=1\sim4) \tag{66}$$

$$\alpha id(k) = \alpha bs'(k) + \sum_{i=1}^{4}\sum_{j=1}^{4}\sum_{h=1}^{4} Wai(k) \cdot Wanj(k) \cdot Waah(k) \cdot d\alpha ijh'(k) \tag{67}$$

As is apparent from the comparison between the above equations (54) to (67) and the aforementioned equations (17) to (29), the equations (54) to (64) are the same as the equations (17) to (27), and only the equations (65) to (67) are different. Therefore, the following description will be given only of the equations (65) to (67). First, the above-mentioned equation (65) is used for calculating a reference model parameter αbs'. That is, the reference model parameter αbs' is calculated by correcting the above-mentioned reference model parameter αbs with a correction coefficient Kαbs.

Figure 28:
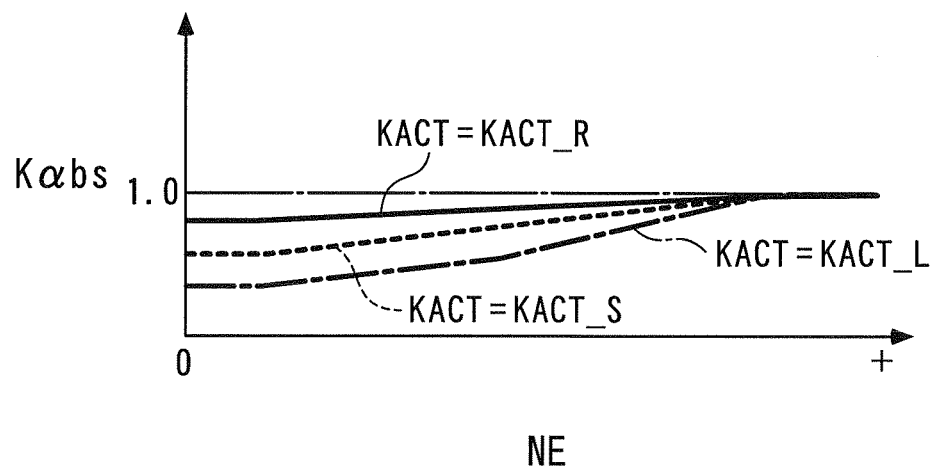
FIG. 28 is a diagram showing an example of a map for use in calculating a correction coefficient $K\alpha bs$.

The correction coefficient Kαbs is calculated by searching a map shown in FIG. 28 according to the engine speed NE and the detected equivalent ratio KACT. In FIG. 28, three values KACT_R, KACT_S, and KACT_L are all predetermined values of the detected equivalent ratio KACT, and are set such that KACT_S=1 and KACT_L<KACT_S<KACT_R hold.

In this map, the correction coefficient Kαbs is set to a value not larger than 1, and is set to a smaller value as the engine speed NE is lower. This is because in a low-rotational speed region, even when the exhaust gas volume Vex is the same, a periodic fluctuation in exhaust gas components becomes larger as an execution time period for one combustion cycle becomes longer, causing an increase in response delay (i.e. dead time) between the air-fuel ratio correction coefficient KAF and the detected equivalent ratio KACT, and a change in the first-order lag characteristic. To cope with these, the correction coefficient Kαbs is configured as mentioned above.

Further, the correction coefficient Kαbs is set to a larger value as the detected equivalent ratio KACT becomes richer. This is because when the detected equivalent ratio KACT is larger and the concentration of exhaust gases is higher, the amount of unburned components of exhaust gases becomes larger and the response of a detection element of the LAF sensor 23 becomes higher, causing reduction of the response delay (i.e. dead time) between the air-fuel ratio correction coefficient KAF and the detected equivalent ratio KACT, and a change in the first-order lag characteristic. To cope with these, the correction coefficient Kαbs is configured as mentioned above.

Figure 29:
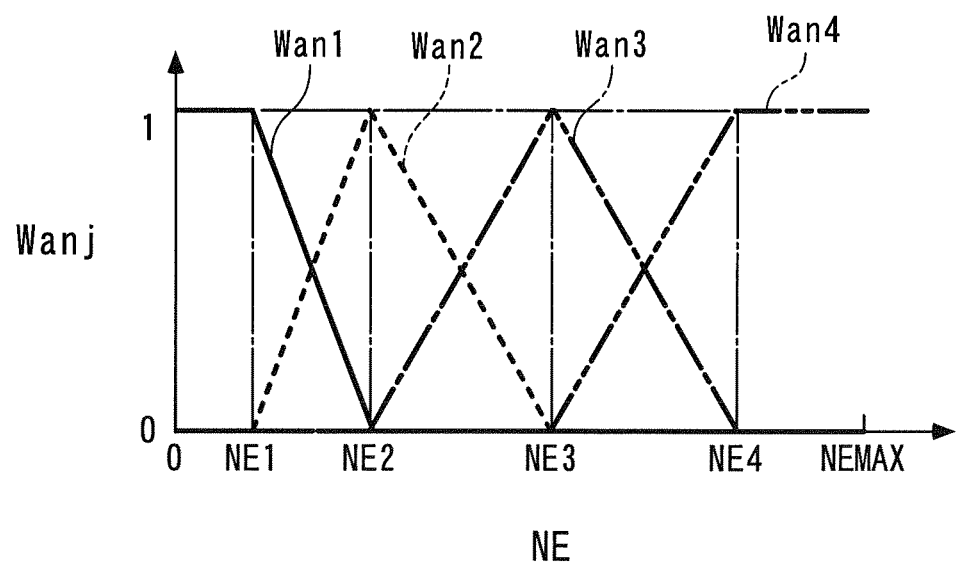
FIG. 29 is a diagram showing an example of a map for use in calculating a weight function value Wanj.

Next, a modification terms dαijh' is calculated by the aforementioned equation (66), and then the identified value αid is finally calculated by the aforementioned equation (67). In the equation (66), Wanj and Waah represent weight function values. The weight function values Wanj (j=1 to 4) are calculated by searching a map shown in FIG. 29 according to the engine speed NE. In FIG. 29, NE1 to NE4 and NEMAX represent predetermined values of the engine speed NE, and are set such that 0<NE1<NE2<NE3<NE4<NEMAX holds. The predetermined value NEMAX is set to a maximum allowable engine speed.

As shown in FIG. 29, when a range within which the engine speed NE can change is divided into four ranges of 0≤NE≤NE2, NE1≤NE≤NE3, NE2≤NE≤NE4, and NE3≤NE≤NEMAX, the four weight function values Wan1 to Wan4 are set such that they are associated with the above four ranges, respectively, and are set to positive values not larger than 1 in the ranges associated therewith, whereas in ranges other than the associated ranges, they are set to 0.

Specifically, the weight function value Wan1 is set, in the range associated therewith (0≤NE≤NE2), to a smaller positive value as the engine speed NE is larger with a maximum value of 1 when NE≤NE1 holds, while in the other ranges, it is set to 0. The weight function value Wan2 is set, in the range associated therewith (NE1≤NE≤NE3), to such a value as changes along the inclined sides of a triangle with a maximum value of 1 when NE=NE2 holds, while in the other ranges, it is set to 0.

The weight function value Wan3 is set, in the range associated therewith (NE2≤NE≤NE4), to such a value as changes along the inclined sides of a triangle with a maximum value of 1 when NE=NE3 holds, while in the other ranges, it is set to 0. The weight function value Wan4 is set, in the range associated therewith (NE3≤NE≤NEMAX), to a larger positive value as the engine speed NE is larger with a maximum value of 1 when NE4≤NE holds, while in the other ranges, it is set to 0.

Further to the above, the four ranges with which the respective four weight function values Wanj (j=1 to 4) are associated are set such that adjacent ones thereof overlap each other, as described above, and the sum of values of the weight function values Wanj associated with each value of the engine speed NE in the overlapping ranges becomes equal to the maximum value of 1 of each of the weight function values Wani. As described above, the weight function values Wanj calculated according to the engine speed NE are used for the same reason given in the description of the calculation of the correction coefficient Kαbs.

Figure 30:
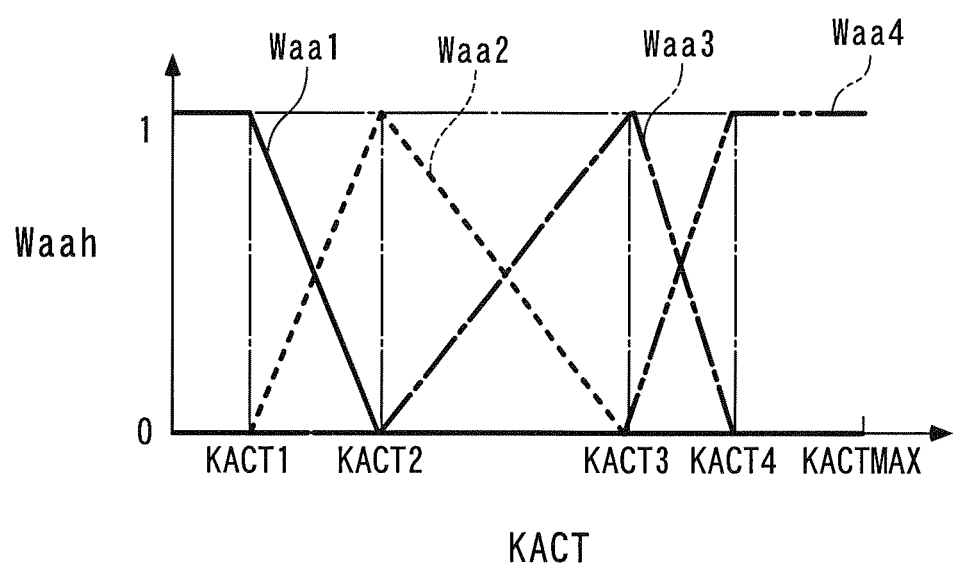
FIG. 30 is a diagram showing an example of a map for use in calculating a weight function value Waah.

Further, the weight function values Waah (h=1 to 4) expressed by the aforementioned equation (66) are each calculated by searching a map shown in FIG. 30 according to the detected equivalent ratio KACT. In FIG. 30, KACT1 to KACT4 and KACTMAX represent predetermined values of the detected equivalent ratio KACT, and are set such that 0<KACT1<KACT2<KACT3<KACT4<KACTMAX holds. Furthermore, the predetermined value KACTMAX is set to the maximum value of the detected equivalent ratio KACT in a range within which the detected equivalent ratio KACT can change during operation of the engine 3. In other words, the detected equivalent ratio KACT has a characteristic that it changes in the area of 0 to KACTMAX during operation of the engine 3.

As shown in FIG. 30, when the range within which the detected equivalent ratio KACT can change is divided into four ranges of KACT≤KACT2, KACT1≤KACT≤KACT3, KACT2≤KACT≤KACT4, and KACT3≤KACT≤KACTMAX, the four weight function values Waa1 to Waa4 are set such that they are associated with the above four ranges, respectively, and are set to positive values not larger than 1 in the ranges associated therewith, whereas in ranges other than the associated ranges, they are set to 0.

Specifically, the weight function value Waa1 is set, in the range associated therewith (KACT≤KACT2), to a smaller positive value as the detected equivalent ratio KACT is larger with a maximum value of 1 when KACT≤KACT1 holds, while in the other ranges, it is set to 0. The weight function value Waa2 is set, in the range associated therewith (KACT1≤KACT≤KACT3), to such a value as changes along the inclined sides of a triangle with a maximum value of 1 when KACT=KACT2 holds, while in the other ranges, it is set to 0.

The weight function value Waa3 is set, in the range associated therewith (KACT2≤KACT≤KACT4), to such a value as changes along the inclined sides of a triangle with a maximum value of 1 when KACT=KACT3 holds, while in the other ranges, it is set to 0. The weight function value Waa4 is set, in the range associated therewith (KACT3≤KACT≤KACTMAX), to a larger positive value as the detected equivalent ratio KACT is larger with a maximum value of 1 when KACT4≤KACT holds, while in the other ranges, it is set to 0.

Further to the above, the four ranges with which the respective four weight function values Waah (h=1 to 4) are associated are set such that adjacent ones thereof overlap each other, as described above, and the sum of the values of the weight function values Waah associated with each value of the detected equivalent ratio KACT in the overlapping ranges becomes equal to the maximum value of 1 of each of the weight function values Waah. As described above, the weight function values Waah calculated according to the detected equivalent ratio KACT are used for the same reason given in the description of the calculation of the correction coefficient Kαbs.

When the identified value αid is calculated with the above-described identification algorithm, it is possible to calculate the identified value αid while causing the changes in the dead time d and the first-order lag characteristic occurring not only with the change in the exhaust gas volume Vex but also with the changes in the engine speed NE and the detected equivalent ratio KACT to be reflected thereon. More specifically, it is possible to calculate the identified value αid while compensating for the changes in the dead time d and the first-order lag characteristic caused by the changes in the three parameters Vex, NE and KACT, thereby making it possible to further improve the accuracy of identification (i.e. calculation) of the identified value αid. This makes it possible to further improve the controllability and the robustness of the air-fuel ratio control than when the onboard identifier 60 according to the first embodiment is used. In the case of this example, the engine speed NE corresponds to the second reference parameter.

Next, a control apparatus 1A according to a second embodiment of the present invention will be described with reference to FIG. 31. Similarly to the above-described control apparatus 1, the control apparatus 1A controls the air-fuel ratio by calculating the air-fuel ratio correction coefficient KAF, etc. In the second embodiment, in place of the equation (2) used in the first embodiment, the following equation (68) is used as a control target model.

$$KACT(k+1)=\delta \cdot KACT(k)+\alpha \cdot KAF(k-d) \tag{68}$$

In the above equation (68), δ represents a model parameter. This equation (68) is obtained by replacing "1−a" of the equation (2) with "δ", and corresponds to an equation obtained by removing the restraint condition between the two model parameters 1−α and α.

Figure 31:
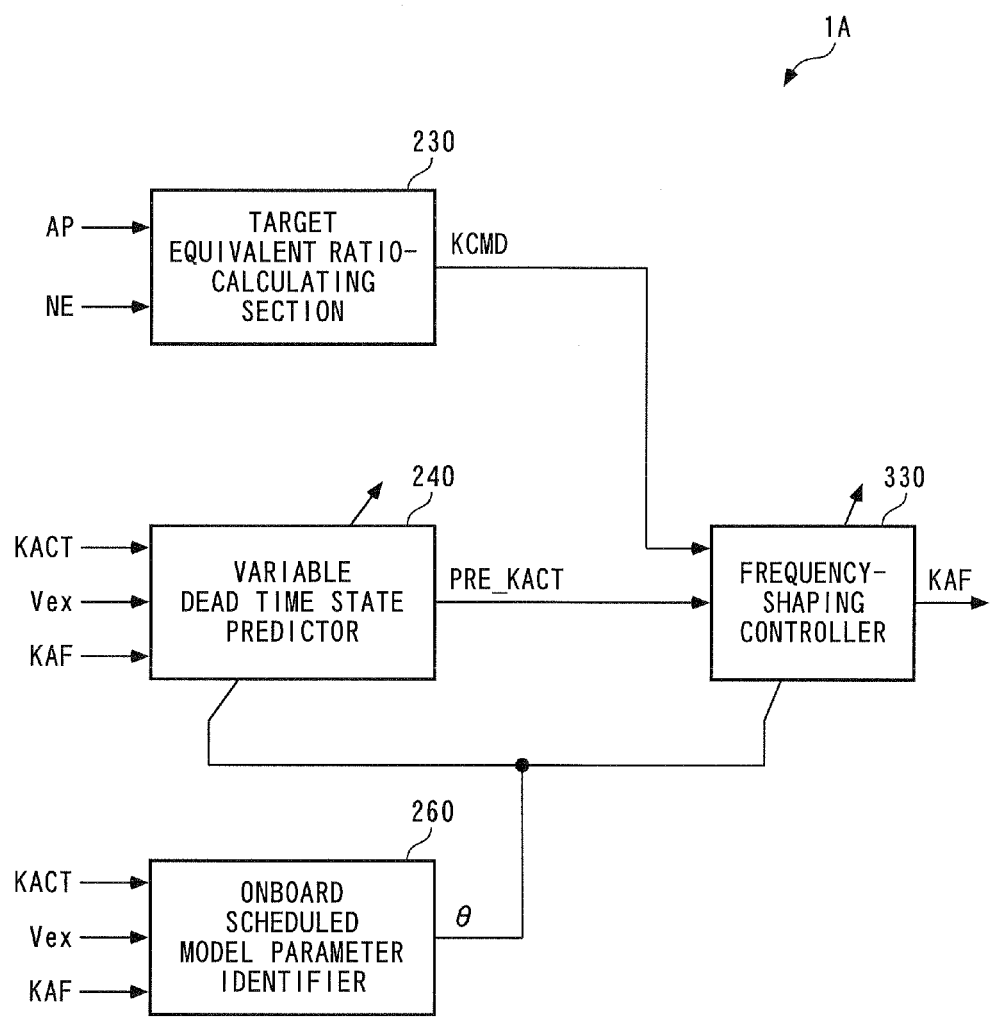
FIG. 31 is a block diagram of a control apparatus according to a second embodiment of the invention.

As shown in FIG. 31, the control apparatus 1A includes a target equivalent ratio-calculating section 230, a variable dead time state predictor (hereinafter referred to as the "state predictor") 240, an onboard scheduled model parameter identifier (hereinafter referred to as the "onboard identifier") 260, and a frequency shaping controller 330, all of which are implemented by the ECU 2.

The target equivalent ratio-calculating section 230 calculates a target equivalent ratio KCMD by the same method as used by the target equivalent ratio-calculating section 30. Further, the state predictor 240 calculates a predicted equivalent ratio PRE_KACT with a prediction algorithm, described hereinafter, and the onboard identifier 260 calculates a model parameter vector θ composed of the elements of the two model parameters δ and α with an identification algorithm, described hereinafter. Furthermore, the frequency shaping controller 330 calculates an air-fuel ratio correction coefficient KAF as a control input with a control algorithm, described hereinafter.

In the present embodiment, the ECU 2 corresponds to the identification means, the control input-calculating means, the reference parameter-detecting means, the weight function value-calculating means, the range identification error-calculating means, the modification value-calculating means, the first reference parameter-detecting means, the second reference parameter-detecting means, the reference model parameter-calculating means, the identification gain-calculating means, estimated controlled variable-calculating means, error calculating means, and identification gain vector-calculating means. Further, the onboard identifier 260 corresponds to the identification means, the weight function value-calculating means, the range identification error-calculating means, the modification value-calculating means, the reference model parameter-calculating means, the identification gain-calculating means, the estimated controlled variable-calculating means, the error calculating means, and the identification gain vector-calculating means, and the frequency shaping controller 330 corresponds to the control input-calculating means.

Figure 32:
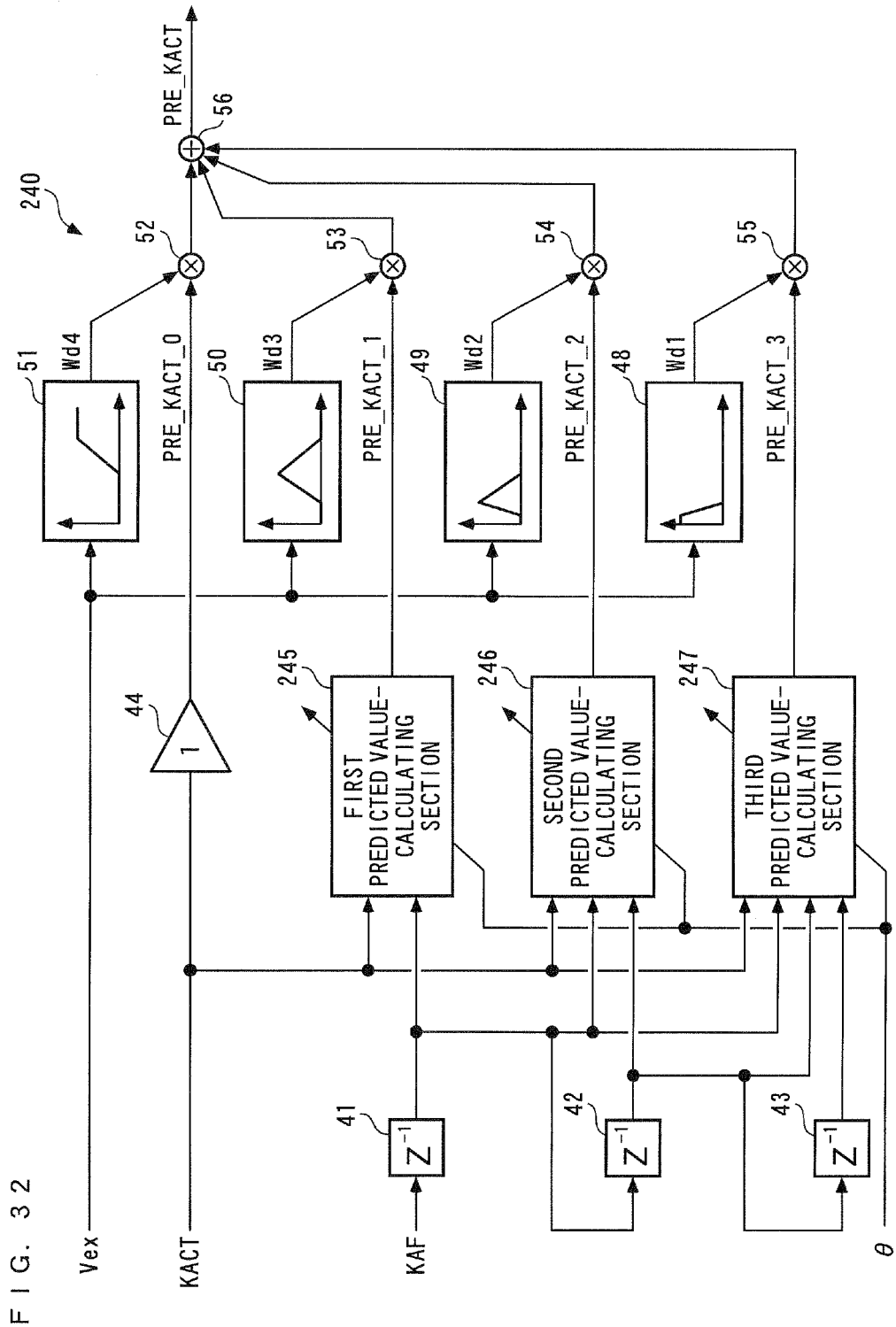
FIG. 32 is a block diagram of a variable dead time state predictor according to the second embodiment.

Next, the above-described state predictor 240 will be described with reference to FIG. 32. As shown in FIG. 32, the state predictor 240 is distinguished from the FIG. 5 state predictor 40 only in that it is provided with first to third predicted value-calculating sections 245 to 247 in place of the first to third predicted value-calculating sections 45 to 47, and in the other respects, the state predictor 240 has the same construction as that of the state predictor 40. Therefore, the following description will be given mainly of the different points, while the same component elements of the state predictor 240 as those of the state predictor 40 are denoted by the same reference numerals, and detailed description thereof is omitted as deemed appropriate.

First, the amplifier 44 calculates a predicted equivalent ratio PRE_KACT0 by the aforementioned equation (3) and the following equation (69):

$$PRE\_KACT\_0(k) = KACT(k) \tag{69}$$

Further, the first predicted value-calculating section 245 calculates a first predicted value PRE_KACT_1 using the value KAF(k−1) of the air-fuel ratio correction coefficient, delayed by one control cycle by the delay element 41, by the following equation (70). In this equation (70), the model parameters δ and α are identified by the onboard identifier 260.

$$PRE\_KACT\_1(k) = \delta(k) \cdot KACT(k) + \alpha(k) \cdot KAF(k-1) \tag{70}$$

The second predicted value-calculating section 246 calculates a second predicted value PRE_KACT_2 using the values KAF(k−1) and KAF(k−2) of the air-fuel ratio correction coefficient, delayed by one and two control cycles by the respective two delay elements 41 and 42, by the following equation (71):

$$PRE\_KACT\_2(k) = \delta(k)^2 \cdot KACT(k) + \delta(k) \cdot \alpha(k) \cdot KAF(k-2) + \alpha(k) \cdot KAF(k-1) \tag{71}$$

The third predicted value-calculating section 247 calculates a third predicted value PRE_KACT_3 using the values KAF(k−1), KAF(k−2) and KAF(k−3) of the air-fuel ratio correction coefficient, delayed by one to three control cycles by the respective three delay elements 41 to 43, by the following equation (72):

$$PRE\_KACT\_3(k) = \delta(k)^3 \cdot KACT(k) + \delta(k)^2 \cdot \alpha(k) \cdot KAF(k-3) + \delta(k) \cdot \alpha(k) \cdot KAF(k-2) + \alpha(k) \cdot KAF(k-1) \tag{72}$$

Note that the above equations (70) to (72) are derived based on the above-mentioned equation (68) of the control target model by the same method as used for deriving the aforementioned equations (4) to (6).

Further, the four weight function value-calculating sections 48 to 51 calculate the four weight function values Wd1 to Wd4, respectively, and the four multipliers 52 to 55 calculate the four products Wd4·PRE_KACT_0, Wd3·PRE_KACT_1, Wd2·PRE_KACT_2 and Wd1·PRE_KACT_3, respectively.

Then, the adder 56 calculates a predicted equivalent ratio PRE_KACT by the following equation (73) which is the same as the aforementioned equation (7).

$$PRE\_KACT(k) = \sum_{i=1}^{4} Wdi(k) \cdot PRE\_KACT\_4 - i(k) \tag{73}$$

Also when the predicted equivalent ratio PRE_KACT is calculated by the above-described method, it is possible to obtain the same advantageous effects as provided by the state predictor 40. More specifically, even when the dead time d sequentially changes between 0 and 3 according to changes in the exhaust gas volume Vex, it is possible to calculate the predicted equivalent ratio PRE_KACT while properly causing such a change in the dead time d to be reflected on the predicted equivalent ratio PRE_KACT.

Next, a description will be given of the above-mentioned onboard identifier 260. The onboard identifier 260 calculates a model parameter vector θ with a scheduled modification-type identification algorithm, described hereinafter. This identification algorithm is derived based on a modified model obtained by replacing the value KAF(k−d) on the right side of the aforementioned equation (68) with the modified control input KAF_mod(k).

Figure 33:
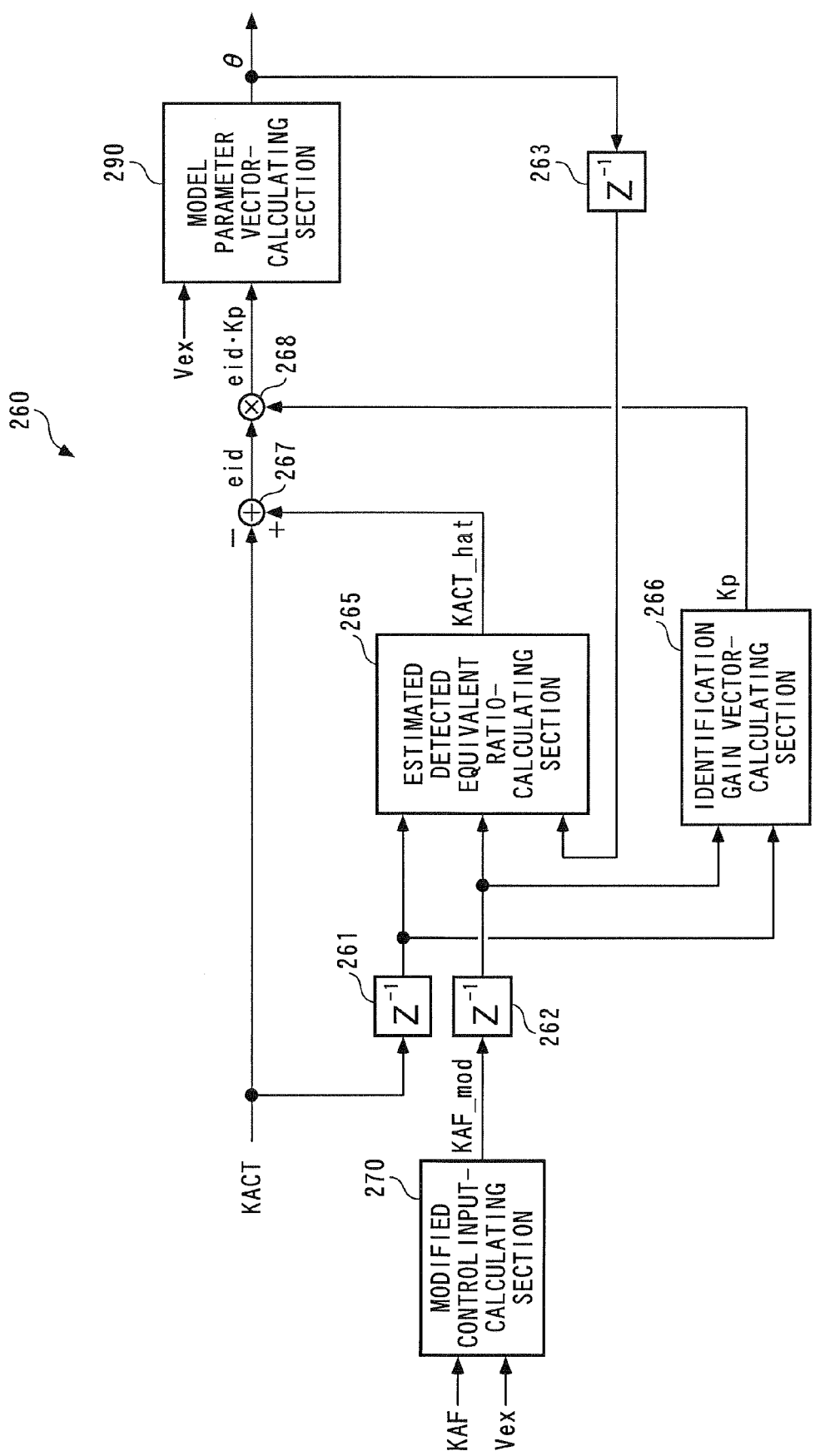
FIG. 33 is a block diagram of an onboard scheduled model parameter identifier according to the second embodiment.

As shown in FIG. 33, the onboard identifier 260 includes a modified control input-calculating section 270, three delay elements 261 to 263, an estimated detected equivalent ratio-calculating section 265, an identification gain vector-calculating section 266, a subtractor 267, a multiplier 268, and a model parameter vector-calculating section 290.

First, the modified control input-calculating section 270 calculates the modified control input KAF_mod by the same method as used by the above-mentioned modified control input-calculating section 70.

Further, the estimated detected equivalent ratio-calculating section 265 calculates an estimated detected equivalent ratio KACT_hat (estimated controlled variable) using three values KACT(k−1), KAF_mod(k−1) and θ (k−1) delayed by one control cycle by the three delay elements 261 to 263, respectively, by the following equations (74) to (76):

$$\theta(k-1) = [\delta(k-1)\alpha(k-1)]^T \tag{74}$$

$$\zeta(k-1) = [KACT(k-1)KAF\_mod(k-1)]^T \tag{75}$$

$$KACT\_hat(k) = \theta(k-1)^T \cdot \zeta(k-1) \tag{76}$$

This equation (76) is derived by replacing KACT on the left side and KAF on the right side of an equation obtained by shifting the parameters of the aforementioned equation (68) toward the past by one control cycle, with KACT_hat and KAF_mod, respectively.

The subtractor 267 calculates an identification error eid by the following equation (77):

$$eid(k) = KACT(k) - KACT\_hat(k) \tag{77}$$

The identification gain vector-calculating section 266 calculates an identification gain vector Kp by the following equations (78) and (79). The identification gain vector Kp defines a direction (positive or negative) and amount of modification of the elements δ and α in a model parameter vector θ.

$$P(k) = \frac{1}{\lambda 1} \cdot \left( I - \frac{\lambda 2 \cdot P(k-1) \cdot \zeta(k-1) \cdot \zeta(k-1)^T}{\lambda 1 + \lambda 2 \cdot \zeta(k-1)^T \cdot P(k-1) \cdot \zeta(k-1)} \right) P(k-1) \quad (78)$$

$$Kp(k) = \frac{P(k) \cdot \zeta(k-1)}{1 + \zeta(k-1)^T \cdot P(k) \cdot \zeta(k-1)} \quad (79)$$

In the above equation (78), I represents a unit matrix of order 2, and P represents a square matrix of order 2 an initial value of which is defined by the following equation (80).

$$P(0) = \begin{bmatrix} P0 & 0 \\ 0 & P0 \end{bmatrix} \quad (80)$$

Further, in the above equation (78), as described hereinabove, by setting weight parameters represented by λ1 and λ2 as described below, it is possible to select one of the following three algorithms as an identification algorithm.

λ1=1, λ2=0: fixed gain algorithm;
λ1=1, λ2=1: least-squares method algorithm; and
λ1=1, λ=1: weighted least-squares method algorithm, wherein λ represents a predetermined value set such that 0<λ<1 holds. In the present embodiment, the weighted least-squares method algorithm is employed so as to properly secure identification accuracy and control accuracy.

Furthermore, the multiplier 268 calculates a product eid·Kp of the identification error eid and the identification gain vector Kp.

Figure 34:
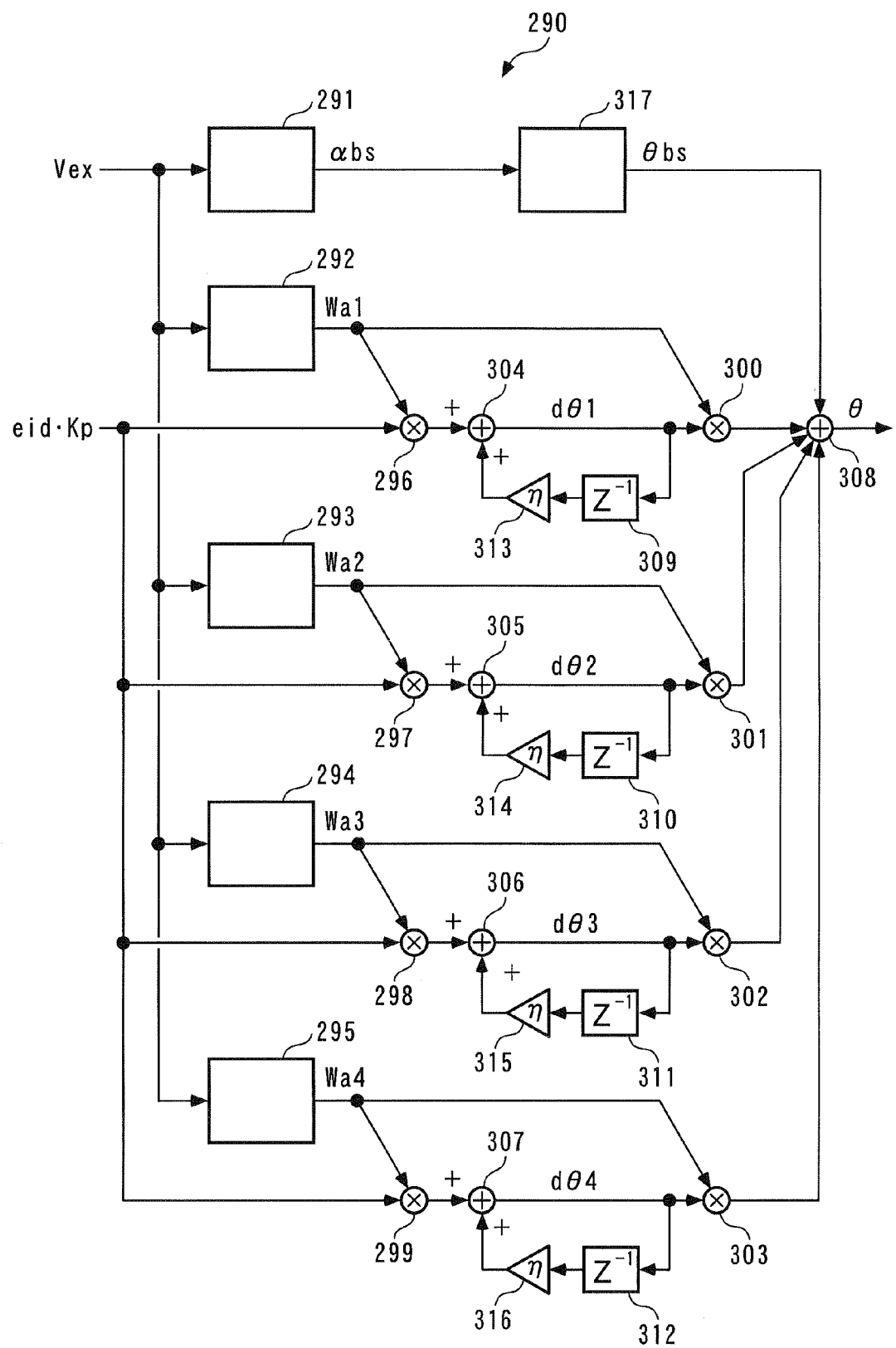
FIG. 34 is a block diagram of a model parameter vector-calculating section.

Then, the model parameter vector-calculating section 290 calculates the model parameter vector θ using the above-mentioned product eid·Kp and the exhaust gas volume Vex, as described hereinafter. As shown in FIG. 34, the model parameter vector-calculating section 290 includes a reference model parameter-calculating section 291, a reference model parameter vector-calculating section 317, four weight function value-calculating sections 292 to 295, eight multipliers 296 to 303, five adders 304 to 308, four delay elements 309 to 312, and four amplifiers 313 to 316.

First, the reference model parameter-calculating section 291 calculates a reference model parameter αbs by the same method as employed by aforementioned reference model parameter-calculating section 91 shown in FIG. 9. Next, the reference model parameter vector-calculating section 317 calculates a reference model parameter δbs by the following equation (81), and then calculates a reference model parameter vector θbs by the following equation (82):

$$\delta bs(k) = 1 - \alpha bs(k) \quad (81)$$

$$\theta bs(k) = [\delta bs(k)\, \alpha bs(k)]^T \quad (82)$$

The four weight function value-calculating sections 292 to 295 calculate four weight function values Wa1 to Wa4 by the same method as employed by the above-mentioned weight function value-calculating sections 92 to 95 shown in FIG. 9, respectively. The multiplier 296 calculates a range identification error Wa1·Kp·eid by multiplying the weight function value Wa1 by a value Kp·eid. The range identification error Wa1·Kp·eid is an identification error in the above-mentioned first range, and is calculated as 0 according to the above-mentioned setting of the weight function value Wa1 when the current value of the exhaust gas volume Vex is not within the first range. Further, the amplifier 313 calculates a value of η·dθ1(k−1) by multiplying a modification term vector dθ1(k−1) delayed by the delay element 309, by a forgetting matrix η. The forgetting matrix η will be described hereinafter. Then, the adder 304 adds the value of η·dθ1(k−1) to the product Wa1·Kp·eid to thereby calculate a modification term vector dθ1. The modification term vector dθ1 is composed of the elements of two modification terms dθ1 and dθ1, as shown in an equation (84), referred to hereinafter.

Furthermore, the multiplier 297 calculates a range identification error Wa2·Kp·eid by multiplying the weight function value Wa2 by the value Kp·eid. The range identification error Wa2·Kp·eid is an identification error in the above-mentioned second range, and is calculated as 0 according to the above-mentioned setting of the weight function value Wa2 when the current value of the exhaust gas volume Vex is not within the second range. Further, the amplifier 314 calculates a value of η·dθ2(k−1) by multiplying a modification term vector dθ2(k−1) delayed by the delay element 310, by the forgetting matrix η. Then, the adder 305 adds the value of η·dθ2(k−1) to the product Wa2·Kp·eid to thereby calculate a modification term vector dθ2. This modification term vector dθ2 is composed of the elements of two modification terms dδ2 and dα2, as shown in the equation (84), referred to hereinafter.

The multiplier 298 calculates a range identification error Wa3·Kp·eid by multiplying the weight function value Wa3 by the value Kp·eid. The range identification error Wa3·Kp·eid is an identification error in the above-mentioned third range, and is calculated as 0 according to the above-mentioned setting of the weight function value Wa3 when the current value of the exhaust gas volume Vex is not within the third range. Further, the amplifier 315 calculates a value of η·dθ3(k−1) by multiplying a modification term vector dθ3(k−1) delayed by the delay element 311, by the forgetting matrix η. Then, the adder 306 adds the value of ηdθ3(k−1) to the product Wa3·Kp·eid to thereby calculate a modification term vector dθ3. This modification term vector dθ3 is composed of the elements of two modification terms dδ3 and dα3, as shown in the equation (84), referred to hereinafter.

The multiplier 299 calculates a range identification error Wa4·Kp·eid by multiplying the weight function value Wa4 by the value Kp·eid. The range identification error Wa4·Kp·eid is an identification error in the above-mentioned fourth range, and is calculated as 0 according to the above-mentioned setting of the weight function value Wa4 when the current value of the exhaust gas volume Vex is not within the fourth range. Further, the amplifier 316 calculates a value of Θ·dθ4(k−1) by multiplying a modification term vector dθ4(k−1) delayed by the delay element 312, by the forgetting matrix η. Then, the adder 307 adds the value of η·dθ4(k−1) to the product Wa4·Kp·eid to thereby calculate a modification term vector dθ4. This modification term vector dθ4 is composed of the elements of two modification terms dδ4 and dα4, as shown in the equation (84), referred to hereinafter.

The forgetting matrix η used by the amplifiers 313 to 316 is defined by the following equation (83):

$$\eta = \begin{bmatrix} \eta 1 & 0 \\ 0 & \eta 2 \end{bmatrix} \quad (83)$$

In the above equation (83), η1 and η2 represent forgetting coefficients, and are set such that 0<η1≤1 and 0<η2≤1 hold.

The forgetting matrix η is used for calculating the modification term vectors dθi (i=1 to 4) because when the steady operating condition of the engine 3 continues for a long time period, there is a fear that the modification term vectors dθi increase and become improper. To avoid this inconvenience, the forgetting matrix η is used. Further, when one of the two forgetting coefficients η1 and η2 of the forgetting matrix η is set to 1, it is possible to suppress the identification error eid from constantly occurring and ensure the stability of the control system in a compatible manner. In the present embodiment, the modification term vector dθi corresponds to the modification value and the modification value vector.

Further, computing equations used by the four adders 304 to 307 are expressed by the following equations (84) and (85):

$$d\theta i(k) = [d\delta i(k) \, d\alpha i(K)]^T \quad (84)$$

$$d\theta i(k) = \eta \cdot d\theta i(k-1) + Wai(k) \cdot Kp(k) \cdot eid(k) \quad (85)$$

Furthermore, the multipliers 300 to 303 calculate four vectors Wai·dθi (second product vectors) by multiplying the four modification term vectors dθi by associated ones of the four weight function values Wai, respectively.

Then, the adder 308 finally calculates the model parameter vector θ by the following equation (86):

$$\theta(k) = \theta bs(k) + \sum_{i=1}^{4} Wai(k) \cdot d\theta i(k) \quad (86)$$

The onboard identifier 260 uses the above identification algorithm in order to satisfy the above-described identification conditions 1 and 2. More specifically, as described hereinabove, when a general identification algorithm, such as the least-squares method, is directly employed, it is difficult to satisfy the identification condition 1, i.e. the restraint condition. Therefore, to identify the model parameters while satisfying the identification condition 1, the onboard identifier 260 employs, for computation for identifying the model parameters δ and a of the equation (68) of the control target model, a method of calculating the reference values δbs and αbs of the two model parameters while setting a restraint condition (δbs=1−αbs) therebetween and calculating the modification term vectors dθi with a general sequential least-squares method algorithm. Further, to satisfy the identification condition 2, similarly to the above-mentioned onboard identifier 60, the onboard identifier 260 employs a method of calculating the modification term vectors dθi and the model parameter vector θ using the weight function values Wai.

Next, a description will be given of the frequency shaping controller 330. The frequency shaping controller 330 calculates the air-fuel ratio correction coefficient KAF such that the predicted equivalent ratio PRE_KACT converges to the target equivalent ratio KCMD, in other words, the detected equivalent ratio KACT converges to the target equivalent ratio KCMD. First, the frequency shaping controller 330 calculates a predicted follow-up error PRE_e by the following equation (87), which is the same as the aforementioned equation (34).

$$PRE\_e(k) = PRE\_KACT(k) - KCMD(k) \quad (87)$$

Then, the frequency shaping controller 330 calculates the air-fuel ratio correction coefficient KAF as a control input by the following equation (88):

$$KAF(k) = \quad (88)$$
$$\frac{1}{\alpha(k)} \cdot \{\beta \cdot PRE\_e(k) - \delta(k) \cdot \beta \cdot PRE\_e(k-1) - \alpha(k) \cdot KAF(k-1)\}$$

The above control algorithm for the frequency shaping controller 330 is derived by the same method as the method of deriving the control algorithm for the above-mentioned frequency shaping controller 130.

According to the control apparatus 1A of the second embodiment, configured as described above, the onboard identifier 260 identifies the model parameter vector θ, i.e. the two model parameters δ and α with the identification algorithm expressed by the equations (74) to (86), as described above. In this case, the model parameter vector θ is calculated by adding the total sum of the products Wai·dθi of the four weight function values Wai (i=1 to 4) and the four modification term vectors dθi to the reference model parameter vector θbs, so that the reference model parameter vector θbs is used as an initial value of the model parameter vector θ at a time when the identification computation is started. In addition to this, the reference model parameter αbs is calculated by searching the FIG. 10 map according to the exhaust gas volume Vex having a high correlation with the first-order lag characteristic between the air-fuel ratio correction coefficient KAF and the detected equivalent ratio KACT, and the reference model parameter δbs is calculated such that the restraint condition (δbs=1−αbs) is satisfied. Therefore, even immediately after the computation of the model parameter vector θ, i.e. the two model parameters δ and α is started, it is possible to calculate the two model parameters δ and α while causing the actual state of the first-order lag characteristic to be reflected on the two model parameters.

Further, the model parameters δ and α can be identified as values in the vicinity of a value satisfying the restraint condition, since the reference model parameters δbs and αbs are set such that they satisfy the restraint condition, and the model parameter vector θ composed of the model parameters δ and α as elements thereof is calculated by modifying the reference model parameter vector θbs composed of the reference model parameters θbs and αbs as elements thereof by the total sum of the products of the weight function values Wai and the modification term vectors dθi.

Further, the four range identification errors Wai·Kp·eid are calculated by multiplying the four weight function values Wai by the identification error eid and the identification gain Kp, and the four modification term vectors dθi are calculated such that the four range identification errors Wai·Kp·eid are minimized, respectively. In this case, the four weight function values Wai are calculated by searching the FIG. 11 map according to the exhaust gas volume Vex as described above, so that the four modification term vectors dθi are calculated such that the identification errors in the above-mentioned first to fourth ranges are each minimized, while causing changes in the first-order lag characteristic caused by changes in the exhaust gas volume Vex to be reflected on the four modification term vectors dθi. Further, the model parameter vector θ is calculated by adding the total sum of the products Wai·de i of the four modification term vectors dθi and the four weight function values Wai to the reference model parameter vector θbs. Therefore, it is possible to calculate the two model parameters δ and α such that they approach the actual values of the model parameters while causing the actual state of the first-order lag characteristic to be reflected on the two model parameters δ and α.

Further, as described above, the four weight function values Wai are set such that they are associated with the first to fourth ranges of the exhaust gas volume Vex, respectively, and are set to a value other than 0 in the associated ranges, whereas in the ranges other than the associated ranges, they are set to 0. Further, the four ranges are set such that adjacent ones thereof overlap each other. Therefore, even when the first-order lag characteristic suddenly changes with a sudden change in the exhaust gas volume Vex, it is possible to calculate the two model parameters δ and α such that the they change steplessly and smoothly, while properly compensating for the sudden change in the first-order lag characteristic. For the above reason, even when the engine 3 is in the transient operating condition, it is possible to accurately calculate the two model parameters δ and α.

In addition to this, the identification gain Kp is calculated by the above-mentioned equations (75) and (78) to (80) such that the identification gain Kp defines the direction (positive or negative) and amount of modification of the model parameter vector θ, and the model parameter vector θ is calculated such that the four range identification errors Wai·Kp·eid which are the products of the identification gain Kp, the four weight function values Wai, and the identification error eid are each minimized. Therefore, even when it is necessary to change the direction of modification of the reference model parameter vector θbs due to changes in the operation conditions of the engine 3, it is possible to modify the reference model parameter vector θbs in an appropriate direction. From the above, it is possible to further improve the control accuracy and stability in the air-fuel ratio control.

When a comparison is made between the above-described identification algorithm for the onboard identifier 260 and the identification algorithm for the onboard identifier 60, the identification algorithm for the onboard identifier 60 enables the identified value αid to be calculated such that the restraint condition is completely satisfied, and hence the identification algorithm for the onboard identifier 60 is more excellent from the viewpoint of identifying the model parameters such that the restraint condition is satisfied.

Further, the equations (87) and (88) used by the frequency shaping controller 330, for calculating the air-fuel ratio correction coefficient KAF are derived using the sensitivity function Sd which is set such that it satisfies the above-mentioned control condition (i.e. such that a predetermined frequency characteristic is obtained) and the control target model obtained by omitting the dead time d from the above-mentioned equation (68), and hence it is possible to directly specify (set) the disturbance suppression characteristic and the robustness of the control apparatus 1A on the frequency axis while properly compensating for changes in the first-order lag characteristic caused by changes in the exhaust gas volume Vex. This makes it possible to make a dramatic improvement in the ability of suppressing a disturbance and the robustness in a frequency range within which a change in the controlled variable due to the disturbance is desired to be suppressed.

Note that in the control apparatus 1A according to the second embodiment, the state predictor 240 may be omitted, and in the control algorithm for the frequency shaping controller 330, expressed by the equations (87) and (88), the predicted equivalent ratio PRE_KACT may be replaced by the detected equivalent ratio KACT.

Further, in the control apparatus 1A according to the second embodiment, in the equation (86) used by the onboard identifier 260, for calculating the model parameter vector θ, the weight function values Wai=1 may be set.

Further, although in the second embodiment, the model parameter vector θ which is composed of the two model parameters δ and α as elements thereof is identified by the onboard identifier 260, by way of example, the identification algorithm for the onboard identifier 260 may be applied to model parameter identification of the control target model including only one model parameter or the control target model including three or more model parameters. For example, when the one model parameter is β, it is only required to set δ=0, set θ as a vector which is composed of the elements of δ and θ, and set δbs=0 and dδi=0.

Figure 35:
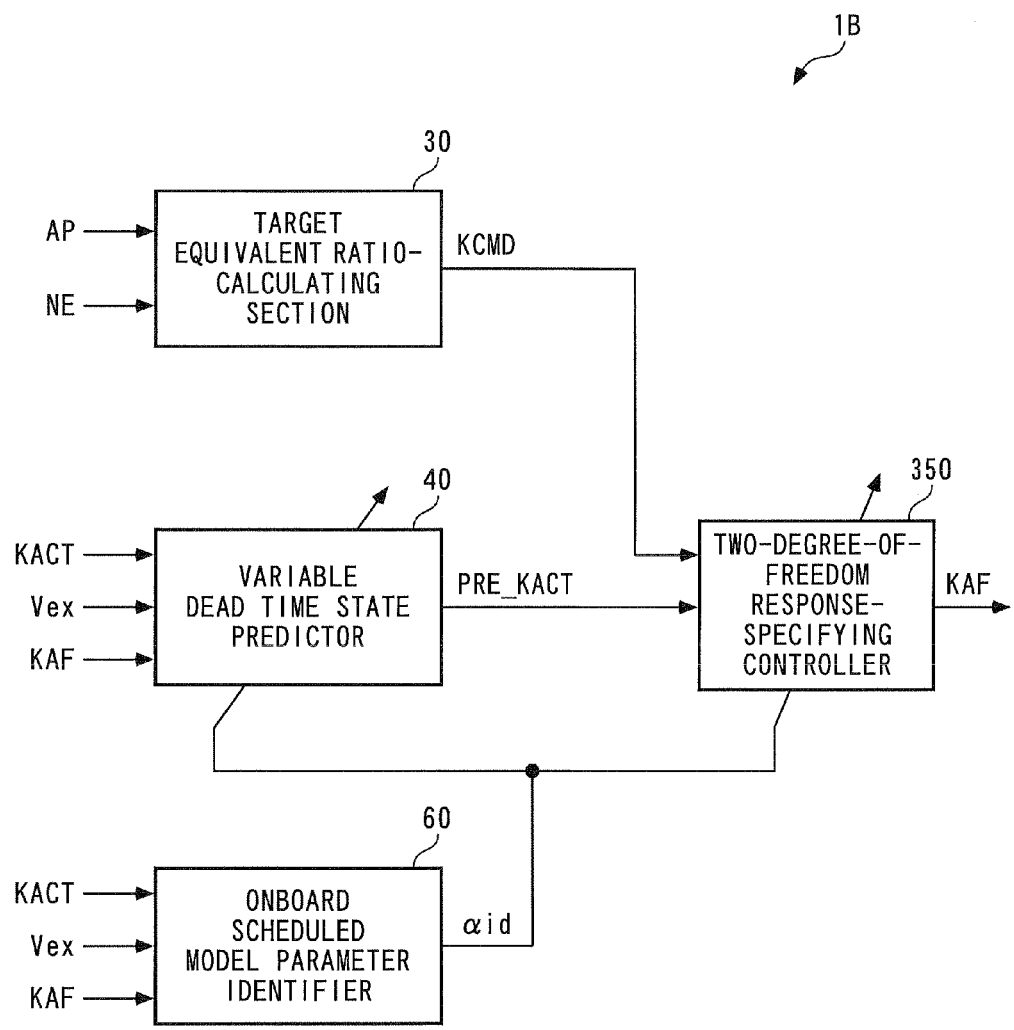
FIG. 35 is a block diagram of a control apparatus according to a third embodiment of the present invention.

Next, a control apparatus 1B according to a third embodiment of the present invention will be described with reference to FIG. 35. As shown in FIG. 35, the control apparatus 1B is distinguished from the FIG. 3 control apparatus 1 according to the first embodiment only in that it is provided with a two-degree-of-freedom response-specifying controller 350 in place of the above-mentioned frequency shaping controller 130, and in the other respects, the control apparatus 1B has the same construction as that of the control apparatus 1. Therefore, the following description will be given only of the two-degree-of-freedom response-specifying controller 350.

The two-degree-of-freedom response-specifying controller 350 calculates an air-fuel ratio correction coefficient KAF with the following two-degree-of-freedom response-specifying control algorithm. Specifically, first, a filtering value KCMD_f of the target equivalent ratio is calculated by the following equation (89):

$$KCMD\_f(k) = -POLE\_f \cdot KCMD\_f(k-1) + (1+POLE\_f) \cdot KCMD(k) \quad (89)$$

wherein POLE_f represents a target value filter-setting parameter, and is set such that the relationship of $-1 < POLE\_f < 0$ holds.

Then, a predicted follow-up error PRE_e_f is calculated by the following equation (90):

$$PRE\_e\_f(k) = PRE\_KACT(k) - KCMD\_f(k-1) \quad (90)$$

Subsequently, a switching function σ_f is calculated by the following equation (91):

$$\sigma\_f(k) = PRE\_e\_f(k) + POLE \cdot PRE\_e\_f(k-1) \quad (91)$$

Wherein POLE represents a switching function-setting parameter, and is set such that the relationship of $-1 < POLE < 0$ holds.

Then, an equivalent control input Ueq_f is calculated by the following equation (92):

$$Ueq\_f(k) = \frac{1}{\alpha id(k)} \cdot \{(\alpha id(k) - POLE) \cdot PRE\_KACT(k) + POLE \cdot PRE\_KACT(k-1) + KCMD\_f(k) + (POLE-1) \cdot KCMD\_f(k-1) - POLE \cdot KCMD\_f(k-2)\} \quad (92)$$

Further, a reaching law input Urch_f is calculated by the following equation (93):

$$Urch\_f(k) = \frac{Krch}{\alpha id(k)} \cdot \sigma\_f(k) \quad (93)$$

wherein, Krch represents a predetermined feedback gain.

Furthermore, an adaptive law input Uadp_f is calculated by the following equation (94):

$$\text{Uadp\_f}(k) = \frac{Kadp}{\alpha id(k)} \cdot \sum_{i=0}^{k} \sigma\_f(i) \qquad (94)$$

wherein, Kadp represents a predetermined feedback gain.

Then, finally, the air-fuel ratio correction coefficient KAF is calculated by the following equation (95)

$$KAF(k)=U\text{eq}\_f(k)+U\text{rch}\_f(k)+U\text{adp}\_f(k) \qquad (95)$$

A two-degree-of-freedom response-specifying algorithm expressed by the above equations (89) to (95) is derived based on a model obtained by replacing KACT of the aforementioned equation (53) with PRE_KACT.

The above-described control apparatus 1B according to the third embodiment is provided with the same state predictor 40 and onboard identifier 60 as provided in the control apparatus 1 according to the first embodiment, and hence it is possible to obtain the same advantageous effects as provided by the control apparatus 1 of the first embodiment. Further, the two-degree-of-freedom response-specifying controller 350 calculates the air-fuel ratio correction coefficient KAF with the above-described control algorithm, so that it is possible to separately and directly specify a behavior of convergence of the disturbance-caused difference between the target equivalent ratio KCMD and the detected equivalent ratio KACT to 0, and a follow-up characteristic of the detected equivalent ratio KACT with respect to a change in the target equivalent ratio KCMD.

Figure 36:
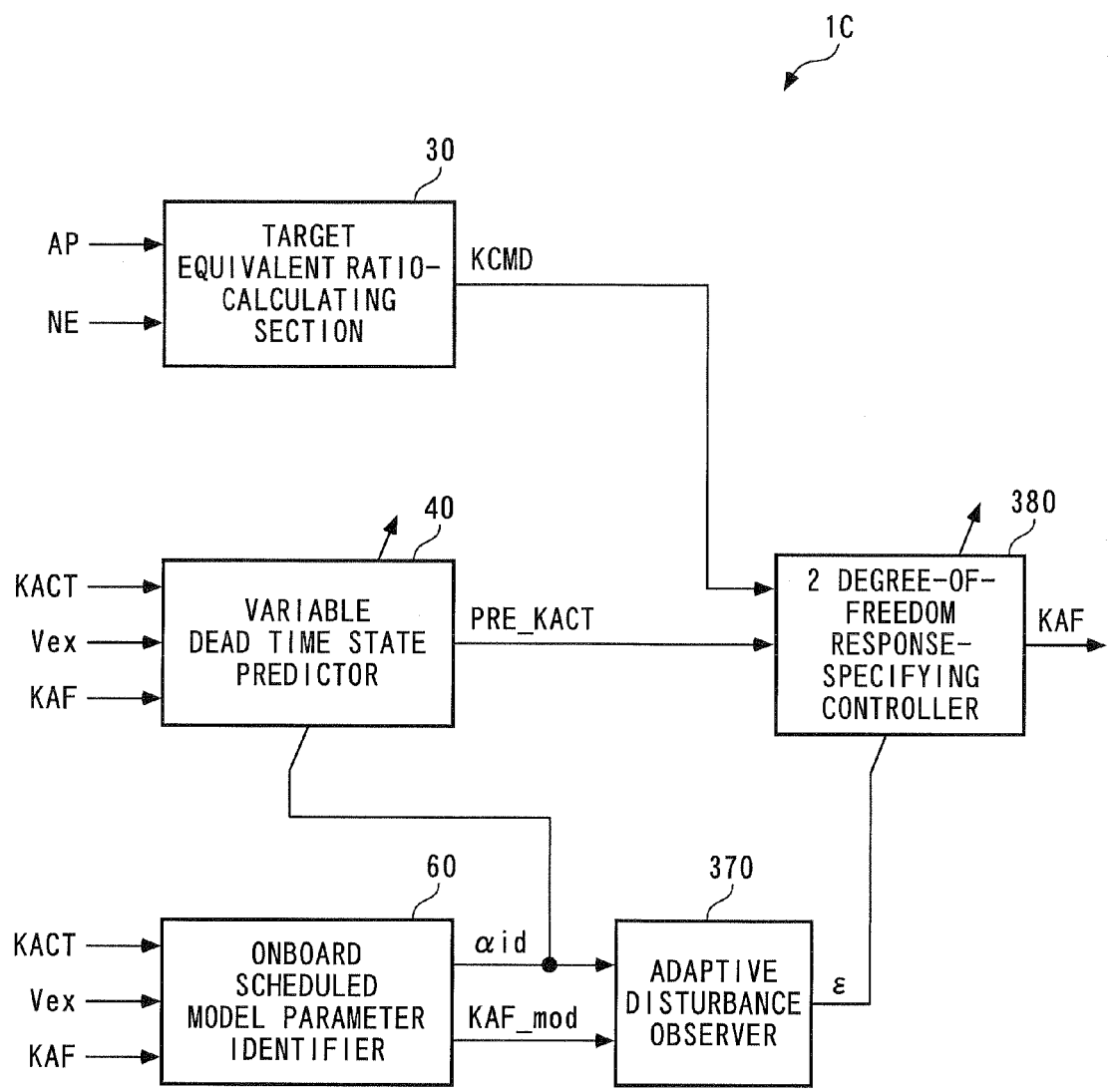
FIG. 36 is a block diagram of a control apparatus according to a fourth embodiment of the present invention.

Next, a control apparatus 1C according to a fourth embodiment of the present invention will be described with reference to FIG. 36. As shown in FIG. 36, the control apparatus 10 is distinguished from the FIG. 3 control apparatus 1 according to the first embodiment only in that it is provided with an adaptive disturbance observer 370, and a two-degree-of-freedom response-specifying controller 380 in place of the above-described frequency shaping controller 130. Therefore, the following description will be given only of these different points.

The adaptive disturbance observer 370 calculates a disturbance estimated value ε with a control algorithm, described hereinafter. First, an estimated detected equivalent ratio KACT_adv for estimating a disturbance is calculated by the following equation (96):

$$KACT\_adv(k)=(1-\alpha id(k))\cdot KACT(k)+\alpha id(k)\cdot KAF\_mod(k)+\epsilon(k-1) \qquad (96)$$

This equation (96) corresponds to an equation obtained by replacing KAF(k+1), α, and KAF(k−d) of the aforementioned equation (2) with KACT_adv(k), αid(k), and KAF_mod, respectively, and adding the disturbance estimated value ε to the right side of the equation (2), that is, a disturbance estimation model.

Then, a follow-up error e_adv for estimating a disturbance is calculated by the following equation (97)

$$e\_adv(k)=KACT\_adv(k)-KACT(k) \qquad (97)$$

Then, finally, the disturbance estimated value ε is calculated by the following equation (98):

$$\varepsilon(k) = \varepsilon(k-1) + \frac{\pi}{1+\pi} \cdot \text{e\_adv}(k) \qquad (98)$$

In this equation (98), π represents a disturbance estimation gain, and is set such that π>0 holds.

Next, a description will be given of the two-degree-of-freedom response-specifying controller 380. This two-degree-of-freedom response-specifying controller 380 calculates the air-fuel ratio correction coefficient KAF with a target value filter-type two-degree-of-freedom response-specifying control algorithm expressed by the following equations (99) to (104):

$$KCMD\_f(k)=-POLE\_f\cdot KCMD\_f(k-1)+(1+POLE\_f)\cdot KCMD(k) \qquad (99)$$

$$PRE\_e\_f(k)=PRE\_KACT(k)-KCMD\_f(k-1) \qquad (100)$$

$$\sigma\_f(k)=PRE\_e\_f(k)+POLE\cdot PRE\_e\_f(k-1) \qquad (101)$$

$$\text{Ueq\_f}(k) = \frac{1}{\alpha id(k)} \cdot \{(\alpha id(k) - POLE)\cdot \text{PRE\_KACT}(k) + POLE\cdot \text{PRE\_KACT}(k-1) - \varepsilon(k) + \text{KCMD\_f}(k) + (POLE-1)\cdot \text{KCMD\_f}(k-1) - POLE\cdot \text{KCMD\_f}(k-2)\} \qquad (102)$$

$$\text{Urch\_f}(k) = \frac{Krch}{\alpha id(k)} \cdot \sigma\_f(k) \qquad (103)$$

$$KAF(k)=U\text{eq}\_f(k)+U\text{rch}\_f(k) \qquad (104)$$

The above equations (99) to (104) correspond to equations obtained by modifying the above-described equations (89) to (95) such that the disturbance estimated value ε is added to the equation for calculating the equivalent control input Ueq, and the adaptive law input Uadp is omitted.

The above-described control apparatus 1C according to the fourth embodiment is provided with the same state predictor 40 and onboard identifier 60 as provided in the control apparatus 1 according to the first embodiment, and hence it is possible to obtain the same advantageous effects as provided by the control apparatus 1 of the first embodiment. Further, the adaptive disturbance observer 370 calculates the disturbance estimated value ε with the above-mentioned control algorithm, and the two-degree-of-freedom response-specifying controller 380 calculates the air-fuel ratio correction coefficient KAF using the disturbance estimated value ε, so that it is possible to improve the ability of suppressing a disturbance, i.e. the robustness, of the air-fuel ratio control.

Further, since the control apparatus 1C is provided with the adaptive disturbance observer 370, it is possible to improve the stability of control by setting the disturbance estimation gain such that π>P0 holds and reducing the identification speed of the onboard identifier 60. Furthermore, for the same reason, to prevent the resonance of the control system or to prevent the gain characteristic of the control target model to which the computation result of the identified value αid is applied, from becoming too small, it is possible to filter input and output data used for the identified value αid and the identification algorithm, thereby making it possible to ensure higher controllability.

Next, a control apparatus 1D according to a fifth embodiment of the present invention will be described with reference to FIG. 37. In the following description, the same component elements of the control apparatus 1D as those of the control apparatus 1 according to the first embodiment are denoted by the same reference numerals, and detailed description thereof is omitted. This control apparatus 1D controls e.g. the engagement and disengagement operations of a clutch 410 of an automatic transmission 400 in a vehicle drive system, with a control algorithm, described hereinafter.

The engine 3 is mechanically connected to drive wheels WH and WH via the automatic transmission 400 and a differential gear mechanism 460, whereby torque of the engine 3 is transmitted to the drive wheels WH and WH while having the speed thereof changed by the automatic transmission 400 and the differential gear mechanism 460.

Figure 37:
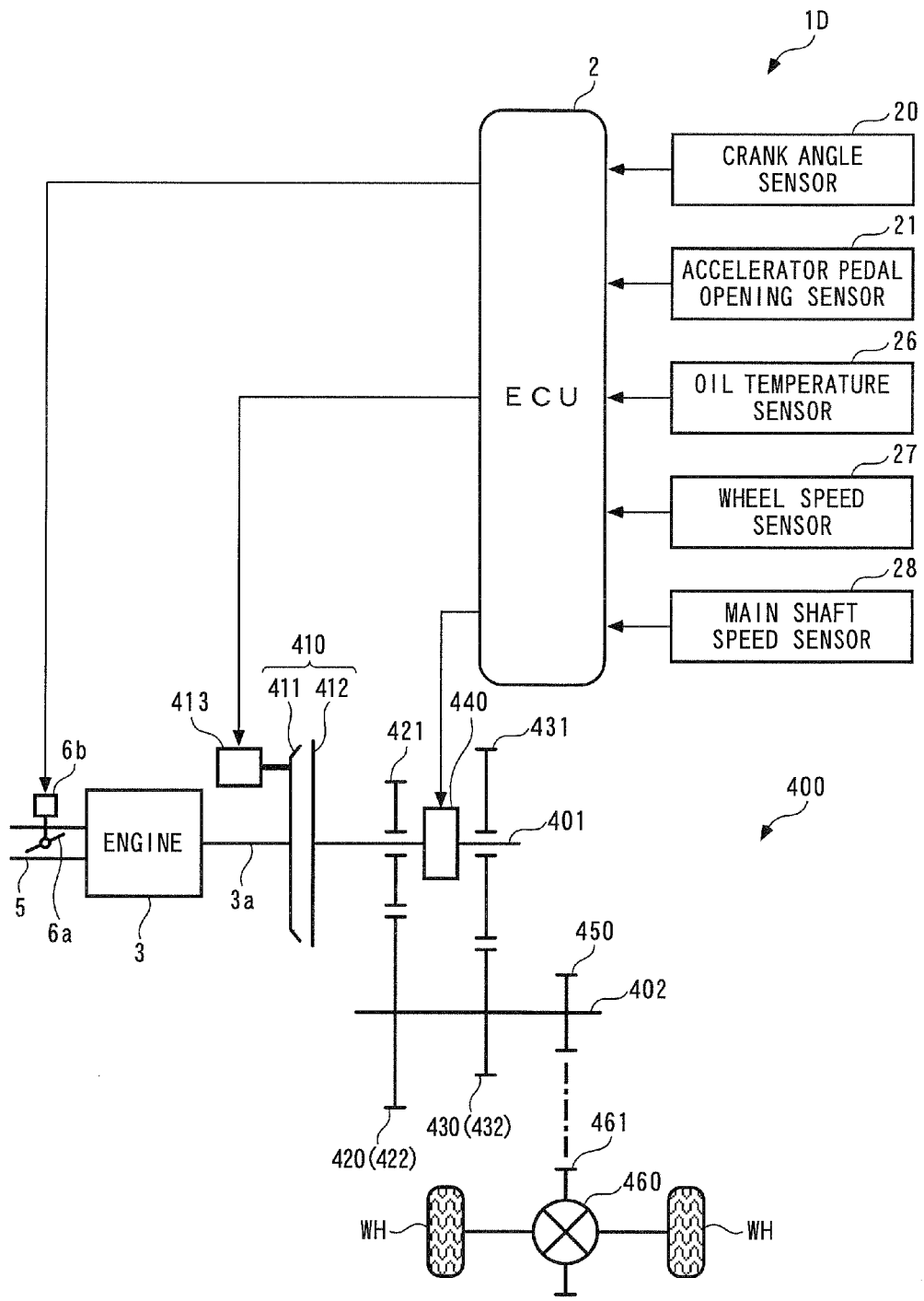
FIG. 37 is a schematic diagram of a control apparatus according to a fifth embodiment of the present invention, and a drive system for an internal combustion engine to which is applied the control apparatus.

As shown in FIG. 37, the automatic transmission 400 includes the clutch 410, a main shaft 401, an auxiliary shaft 402, first-speed and second-speed forward gear trains 420 and 430, a first speed-second speed synchronous meshing mechanism 440, a drive gear 450, and so forth. In FIG. 37, gear trains and synchronous meshing mechanisms other than the first-speed and second-speed forward gear trains 420 and 430 and the first speed-second speed synchronous meshing mechanism 440 are omitted.

The clutch 410 (transmission torque-regulating mechanism) is a dry clutch type, and comprises a clutch plate 411 connected to a crankshaft 3a of the engine 3, a clutch plate 412 which is a counterpart plate of the clutch plate 411 and is connected to the main shaft 401, a diaphragm spring (not shown) for urging the clutch plate 411 toward the engine 3, and a clutch actuator 413 for driving the clutch plate 411 toward the clutch plate 412.

The clutch actuator 413 is a hydraulic drive type, and is formed by combining a clutch solenoid valve, a hydraulic actuator, and so forth. The clutch solenoid valve is electrically connected to the ECU 2, and changes an oil pressure supplied to the hydraulic actuator in response to a control input signal supplied from the ECU 2. This changes a state of actuating the clutch plate 411 toward the clutch plate 412 by the clutch actuator 413, to thereby change the engaged and disengaged state of the clutch 410.

The first-speed and second-speed forward gear trains 420 and 430 respectively comprise first and second-speed main shaft gears 421 and 431 pivotally arranged on the main shaft 401, and first and second speed auxiliary shaft gears 422 and 432 which are fixed to the auxiliary shaft 402 and are always in mesh with the first and second-speed main shaft gears 421 and 431, respectively.

Further, the first speed-second speed synchronous meshing mechanism 440 is disposed between the first and second-speed main shaft gears 421 and 431. The first speed-second speed synchronous meshing mechanism 440 is a hydraulic drive type, and is formed by combining a synchronous solenoid valve, a hydraulic actuator, and so forth. The synchronous solenoid valve is electrically connected to the ECU 2, and changes an oil pressure supplied to the hydraulic actuator in response to a control input signal supplied from the ECU 2. In accordance therewith, the first speed-second speed synchronous meshing mechanism 440 causes the first-speed main shaft gear 421 or the second-speed main shaft gear 431 to be connected with the main shaft 401 by the meshing of gears while synchronizing the first-speed main shaft gear 421 or the second-speed main shaft gear 431 with the main shaft 401, whereby a speed change operation for changing the speed position to a first-speed forward gear position or a second-speed forward gear position is executed.

On the other hand, the drive gear 450 is always in mesh with a driven gear 461 of the differential gear mechanism 460, whereby the drive wheels WH and WH are driven via the differential gear mechanism 460 along with rotation of the auxiliary shaft 402.

Further, the control apparatus 1D includes the ECU 2 to which are electrically connected not only the aforementioned crank angle sensor 20 and accelerator pedal opening sensor 21 but also an oil temperature sensor 26, four wheel speed sensors 27 (only one of which is shown), and a main shaft speed sensor 28.

The oil temperature sensor 26 is implemented e.g. by a thermistor, and detects an oil temperature Toil, which is the temperature of working fluid supplied e.g. to the above-described oil pressure actuator, to deliver a signal indicative of the detected oil temperature Toil to the ECU 2. The ECU 2 calculates the oil temperature Toil based on the detection signal from the oil temperature sensor 26. In the present embodiment, the oil temperature sensor 26 corresponds to the reference parameter-detecting means, the first reference parameter-detecting means, and the second reference parameter-detecting means, and the oil temperature Toil corresponds to the reference parameter, the first reference parameter, and the second reference parameter.

Further, each of the four wheel speed sensors 27 detects the rotational speed of associated one of the wheels, and delivers a signal indicative of the detected rotational speed to the ECU 2. The ECU 2 calculates a vehicle speed VP and the like based on the detection signals from the wheel speed sensors 27.

Similarly to the crank angle sensor 20, the main shaft speed sensor 28 is formed by a magnet rotor and an MRE pickup, and delivers a pulse signal indicative of the rotational speed of the main shaft 401 to the ECU 2 along with rotation of the main shaft 401. The ECU 2 calculates a rotational speed NM of the main shaft 401 (hereinafter referred to as the "main shaft speed NM") based on the detection signal from the main shaft speed sensor 28.

Next, a description will be given of the principle of clutch control performed by the control apparatus 1D according to the present embodiment. In the case of the clutch 410 according to the present embodiment, the relationship between control input Uact to the clutch actuator 413 and the main shaft speed NM can be modeled as a control target model of a first-order lag system, as expressed by the following equation (105):

$$NM(k+1)=(1-\alpha'')\cdot NM(k)+\alpha''\cdot Uact(k-d'') \qquad (105)$$

In this equation (105), $\alpha''$ represents a model parameter, and $d''$ represents dead time.

Further, the clutch 410 has characteristics that torque transmitted to the drive wheels WH and WH is determined by a slip ratio of the clutch 410 (rotational difference between the crankshaft 3a and the main shaft 401), and that the slip ratio is adjusted by the state of the clutch plate 411 being driven by the clutch actuator 413.

The clutch actuator 413 is a hydraulic drive type, as mentioned above, and it has a characteristic that the first-order lag characteristic and the dead time $d''$ vary with a change in oil temperature Toil. Therefore, the slip ratio of the clutch 410 has a characteristic that the slip ratio, i.e. a torque transmission characteristic of the clutch 410, is susceptible to a change in the temperature of the working fluid. Further, the slip ratio of the clutch 410 also has a characteristic that it is susceptible to changes in the surface temperatures of the clutch plates 411 and 412 and aging of component parts.

Figure 38:
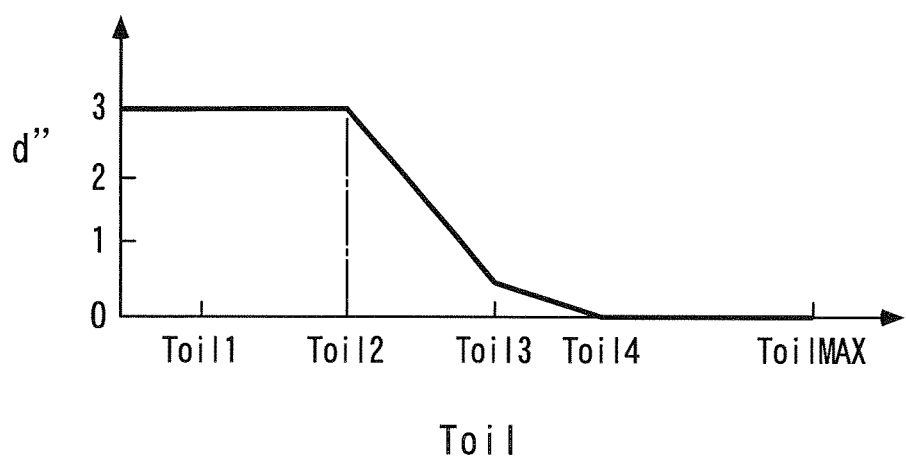
FIG. 38 is a diagram obtained by modeling the relationship between dead time d" and an oil temperature Toil.

For the above reason, the dead time $d''$ expressed by the above-mentioned equation (105) is susceptible to changes in the oil temperature Toil and the surface temperatures of the clutch plates 411 and 412, and aging of the component parts. Therefore, it is necessary to ensure robustness against these. By modeling the relationship between the dead time $d''$ and the oil temperature Toil, a model (map) shown in FIG. 38 is obtained. In FIG. 38, Toil1 to Toil4 and ToilMAX represent predetermined values of the oil temperature Toil, and are set such that 0<Toil1<Toil2<Toil3<Toil4<ToilMAX holds. Further, the predetermined value ToilMAX is set to the maximum value of the oil temperature Toil in a range within which the oil temperature Toil can change during operation of the engine 3. In other words, the oil temperature Toil has a characteristic that it varies within the range of 0 to ToilMAX during operation of the engine 3, and hence to ensure the above-mentioned robustness, it is necessary to calculate the control input Uact while causing a change in the dead time d" caused by a change in the oil temperature Toil to be reflected on the control input Uact.

In general, a high-frequency vibration behavior called "judder" is liable to occur during operation of the clutch, and if the judder occurs, a driving force oscillatingly changes, which degrades the operability. Such a problem is more markedly liable to occur in a dry clutch, such as the clutch 410 according to the present embodiment, and to solve this problem, it is necessary to use a control algorithm that satisfies the aforementioned control condition $\phi$.

For the above reason, in the present embodiment, the control input Uact is calculated using the control target model expressed by the aforementioned equation (105) including the dead time d", with the same control algorithm as the above-described control algorithm used by the frequency shaping controller 130.

Hereinafter, a description will be given of the configuration of the control apparatus 1D according to the present embodiment and the control algorithm. The control algorithm, described hereafter, is used when the gear position is set to the first-speed forward gear position and at the same time during low-speed traveling of the vehicle, or when the gear position is set to the first-speed forward gear position and at the same time during standing start of the vehicle. In the following description, such conditions of setting of the gear positions and traveling conditions of the vehicle are collectively referred to as the "clutch control conditions".

Figure 39:
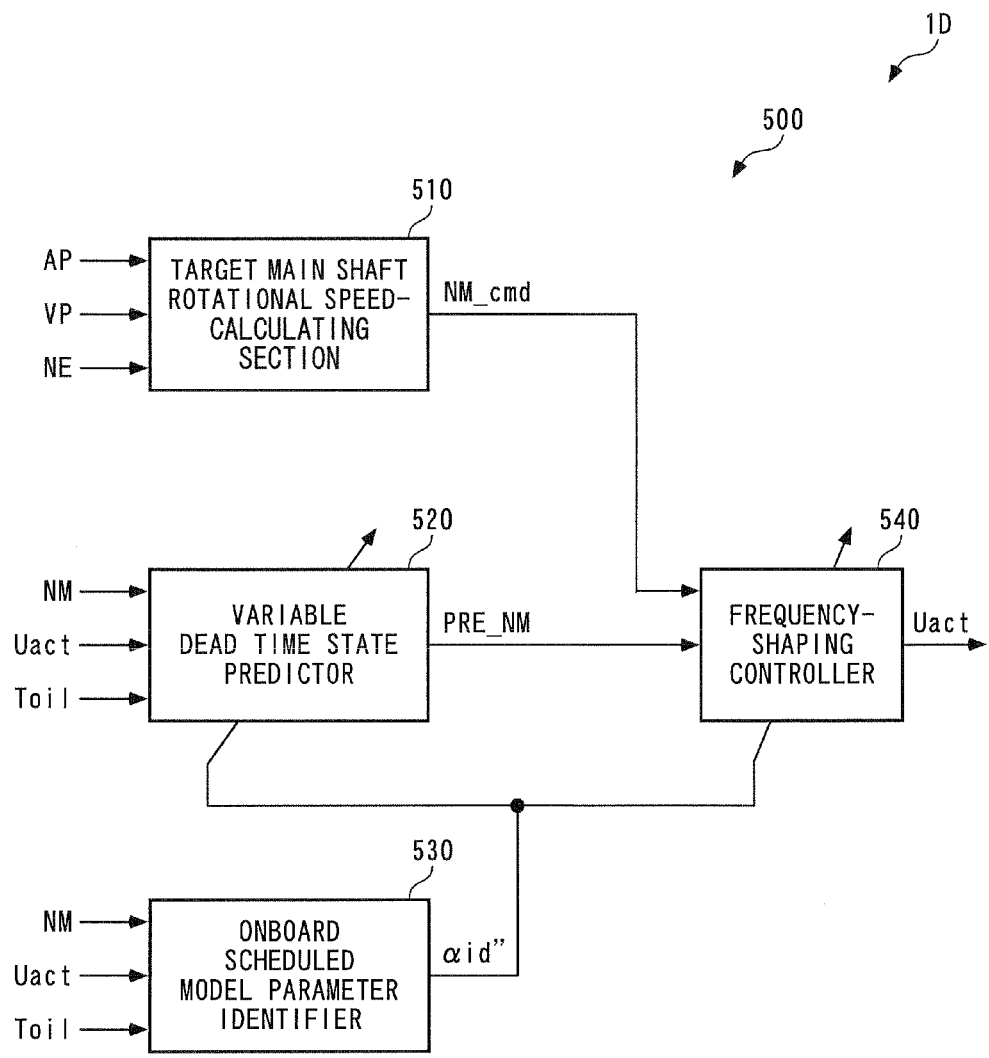
FIG. 39 is a block diagram of a clutch controller.
Figure 44:
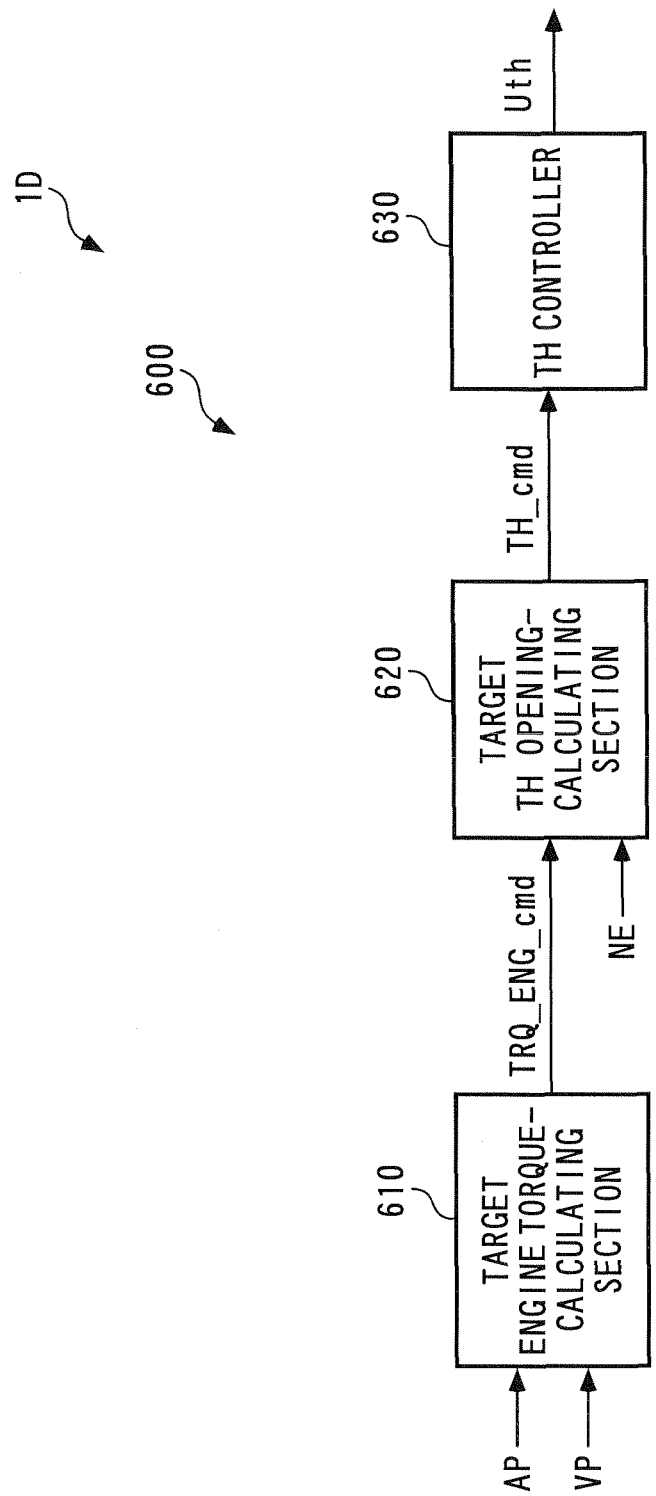
FIG. 44 is a block diagram of a throttle valve controller.

The control apparatus 10 includes a clutch controller 500 shown in FIG. 39, and a throttle valve controller 600 shown in FIG. 44. Each of the controllers 500 and 600 is implemented by the ECU 2.

First, the clutch controller 500 will be described with reference to FIG. 39. The clutch controller 500 controls the engagement and disengagement of the clutch 410 when the above-described clutch control conditions are satisfied. As shown in FIG. 39, the clutch controller 500 includes a target main shaft rotational speed-calculating section 510, a variable dead time state predictor (hereinafter referred to as the "state predictor") 520, an onboard scheduled model parameter identifier (hereinafter referred to as the "onboard identifier") 530, and a frequency shaping controller 540.

In the present embodiment, the ECU 2 corresponds to the identification means, the control input-calculating means, the reference parameter-detecting means, the weight function value-calculating means, the range identification error-calculating means, the modification value-calculating means, the identified value-calculating means, the first reference parameter-detecting means, the second reference parameter-detecting means, the reference model parameter-calculating means, and the identification gain-calculating means. Further, the onboard identifier 530 corresponds to the identification means, the weight function value-calculating means, the range identification error-calculating means, the modification value-calculating means, the identified value-calculating means, the reference model parameter-calculating means, and the identification gain-calculating means, and the frequency shaping controller 540 corresponds to the control input-calculating means.

Figure 40:
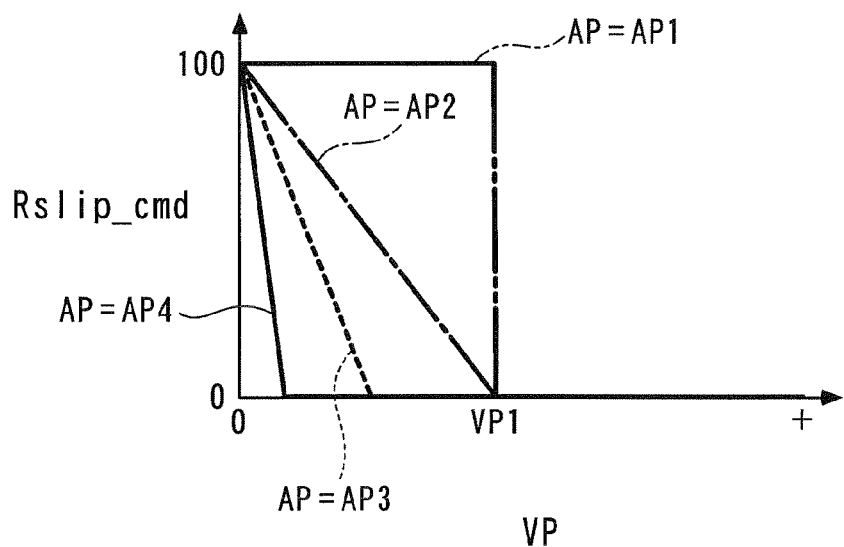
FIG. 40 is a diagram showing an example of a map for use in calculating a target clutch slip ratio Rslip_cmd.

The target main shaft rotational speed-calculating section 510 calculates a target main shaft rotational speed NM_cmd by a method, described hereinafter. First, the target main shaft rotational speed-calculating section 510 calculates a target clutch slip ratio Rslip_cmd by searching a map shown in FIG. 40 according to the accelerator pedal opening AP and the vehicle speed VP. This target clutch slip ratio Rslip_cmd is a value which serves as the target of the clutch slip ratio (NE/NM: ratio between an input-side rotational speed and an output-side rotational speed of the clutch 410). In FIG. 40, AP1 to AP4 represent predetermined values of the accelerator pedal opening AP, and are set such that AP1<AP2<AP3<AP4 holds. Particularly, AP1 is set to a value to be assumed when the accelerator pedal is fully closed, and AP4 is set to a value to be assumed when the accelerator pedal is fully open. Further, In FIG. 40, VP1 represents a predetermined vehicle speed.

As shown in FIG. 40, in a region of VP≤VP1 and AP>AP1, the target clutch slip ratio Rslip_cmd is set to a smaller value as the accelerator pedal opening AP is larger or the vehicle speed VP is higher. This is because as the accelerator pedal opening AP is larger or the vehicle speed VP is higher, it is necessary to increase the torque transmission efficiency of the clutch 410.

Next, the target main shaft rotational speed NM_cmd is calculated using the target clutch slip ratio Rslip_cmd calculated as described above, by the following equation (106):

$$NM\_cmd(k) = Rslip\_cmd(k) \cdot NE(k) \tag{106}$$

Next, a description will be given of the above-mentioned state predictor 520. This state predictor 520 takes into account the characteristic of the dead time d" described with reference to FIG. 38, and calculates a predicted main shaft rotational speed PRE_NM with the same prediction algorithm as employed in the aforementioned state predictor 40 of the first embodiment.

The predicted main shaft rotational speed PRE_NM corresponds to a value which the main shaft rotational speed NM is predicted to assume at a time when the dead time d" elapses. Specifically, it is calculated by a prediction algorithm expressed by the following equations (107) to (111). Further, this prediction algorithm is derived by the same method as the method used for deriving the prediction algorithm for the state predictor 40 of the first embodiment.

First, a zeroth predicted value PRE_NM_0 is calculated by the following equation (107):

$$PRE\_NM\_0(k) = NM(k) \tag{107}$$

Further, a first predicted value PRE_NM_1 is calculated by the following equation (108):

$$PRE\_NM\_1(k) = (1 - \alpha id''(k)) \cdot NM(k) + \alpha id''(k) \cdot Uact(k-1) \tag{108}$$

In this equation (108), αid" represents an identified value of the model parameter α", and is calculated by the onboard identifier 530, as described hereinafter.

Further, a second predicted value PRE_NM_2 is calculated by the following equation (109):

$$PRE\_NM\_2(k) = (1-\alpha id''(k))^2 \cdot NM(k) + (1-\alpha id''(k)) \cdot \alpha id''(k) \cdot Uact(k-2) + \alpha id''(k) \cdot Uact(k-1) \tag{109}$$

Then, a third predicted value PRE_NM_3 is calculated by the following equation (110):

$$PRE\_NM\_3(k) = (1-\alpha id''(k))^3 \cdot NM(k) + (1-\alpha id''(k))^2 \cdot \alpha id''(k) \cdot NM(k-3) + (1-\alpha id''(k)) \cdot \alpha id''(k) \cdot Uact(k-2) + \alpha id''(k) \cdot Uact(k-1) \tag{110}$$

Finally, the predicted main shaft rotational speed PRE_NM is calculated by the following equation (111):

$$\text{PRE\_NM}(k) = \sum_{i=1}^{4} Wdi''(k) \cdot \text{PRE\_NM\_4} - i(k) \quad (111)$$

Figure 41:
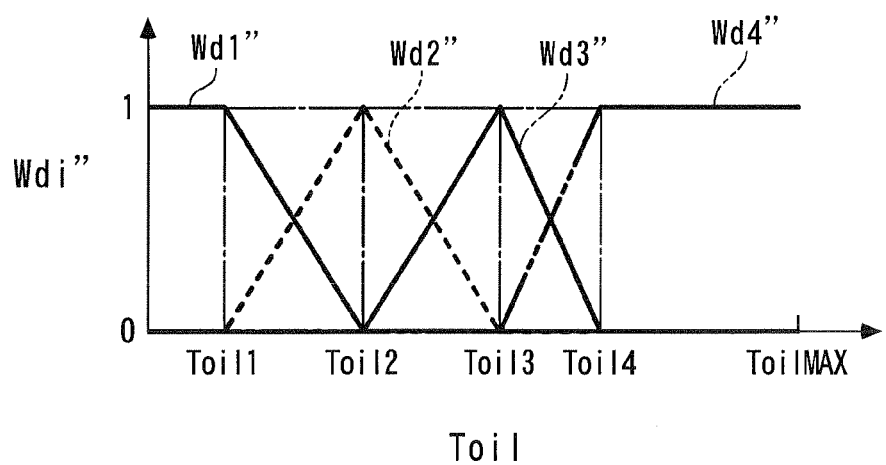
FIG. 41 is a diagram showing an example of a map for use in calculating a weight function value Wdi"

In the above equation (111), Wdi" (i=1 to 4) represents a weight function value, and is calculated by searching a map shown in FIG. 41 according to the oil temperature Toil. As shown in FIG. 41, when a range within which the oil temperature Toil can change is divided into four ranges of Toil≤Toil2, Toil1≤Toil≤Toil3, Toil2≤Toil≤Toil4, and Toil3≤Toil≤ToilMAX, four weight function values Wd1" to Wd4" are set such that they are associated with the above four ranges, respectively, and are set to positive values not larger than 1 in the associated ranges, whereas in ranges other than the associated ranges, they are set to 0.

Specifically, the weight function value Wd1" is set, in the range associated therewith (Toil≤Toil2), to a smaller positive value as the oil temperature Toil is higher with a maximum value of 1 when Toil≤Toil1 holds, while in the other ranges, it is set to 0. The weight function value Wd2" is set, in the range associated therewith (Toil1≤Toil≤Toil3), to such a value as changes along the inclined sides of a triangle with a maximum value of 1 when Toil=Toil2 holds, while in the other ranges, it is set to 0.

The weight function value Wdi" is set, in the range associated therewith (Toil2≤Toil≤Toil4), to such a value as changes along the inclined sides of a triangle with a maximum value of 1 when Toil=Toil3 holds, while in the other ranges, it is set to 0. The weight function value Wd4" is set, in the range associated therewith (Toil3≤Toil≤ToilMAX), to a larger positive value as the oil temperature Toil is higher with a maximum value of 1 when Toil4≤Toil holds, while in the other ranges, it is set to 0.

Further to the above, the four ranges with which the respective four weight function values Wdi" (i=1 to 4) are associated are set such that adjacent ones thereof overlap each other, as described above, and the sum of the values of the weight function values Wdi" associated with each value of the oil temperature Toil in the overlapping ranges is set such that it becomes equal to the maximum value of 1 of each of the weight function values Wdi".

Further, as is apparent from a comparison between FIG. 41 and FIG. 38, referred to hereinabove, the three ranges overlapping each other are set such that they correspond to three ranges, respectively, within which the slope of the dead time d" is held constant. In addition to this, the weight function values Wd1", WD2", WD3", and Wd4" are set such that the weights thereof are maximized for the dead time d"=3, the dead time d"=2, the dead time d"=1, and the dead time d"=0, respectively.

Therefore, the predicted main shaft rotational speed PRE_NM is calculated as the total sum of products obtained by multiplying the four predicted values PRE_NM_4-i by the four weight function values Wdi" set as above, respectively, and hence even when the dead time d" sequentially changes between 0 to 3, as shown in FIG. 38, according to changes in the oil temperature Toil, it is possible to calculate the predicted main shaft rotational speed PRE_NM as such a value that smoothly changes, while properly causing such changes in the dead time d" to be reflected thereon.

Next, a description will be given of the above-mentioned onboard identifier 530. This onboard identifier 530 calculates the identified value αid" with a scheduled modification type identification algorithm with a restraint condition, expressed by the following equations (112) to (124). This identification algorithm is derived by the same method as the method used for deriving the identification algorithm for the above-described onboard identifier 60.

First, a modified control input Uact_mod is calculated by the following equation (112):

$$\text{Uact\_mod}(k) = \sum_{i=1}^{4} Wdi''(k) \cdot Uact(k - 4 + i) \quad (112)$$

Next, a combined signal value W_act" is calculated by the following equation (113):

$$W\_\text{act}''(k) = NM(k) - NM(k-1) \quad (113)$$

Further, an estimated combined signal value W_hat" is calculated by the following equations (114) and (115):

$$\zeta''(k-1) = U\text{act\_mod}(k-1) - NM(k-1) \quad (114)$$

$$W\_\text{hat}''(k) = \alpha\text{id}''(k-1) \cdot \zeta''(k-1) \quad (115)$$

Next, an identification error eid" is calculated by the following equation (116):

$$e\text{id}''(k) = W\_\text{act}''(k) - W\_\text{hat}''(k) \quad (116)$$

Further, an identification gain Kp" is calculated by the following equations (117) and (118):

$$P''(k) = \frac{1}{\lambda 1} \cdot \left(1 - \frac{\lambda 2 \cdot P''(k-1) \cdot \zeta''(k-1)}{\lambda 1 + \lambda 2 \cdot P''(k-1) \cdot \zeta''(k-1)}\right) P''(k-1) \quad (117)$$

$$Kp''(k) = \frac{P''(k) \cdot \zeta''(k-1)}{1 + P''(k) \cdot \zeta''(k-1)} \quad (118)$$

In the above equation (117), an initial value P"(0) of the gain P" is defined by the following equation (119):

$$P''(0) = P0'' \quad (119)$$

wherein PO" is set to a predetermined value.

Further, in the above equation (117), λ1 and λ2 represent weight parameters. As described hereinbefore, by setting these values λ1 and λ2 as described below, it is possible to select one of the following three algorithms as an identification algorithm.

λ1=1, λ2=0: fixed gain algorithm;
λ1=1, λ2=1: least-squares method algorithm; and
λ1=2, λ2=1: weighted least-squares method algorithm, wherein λ represents a predetermined value set such that 0<λ<1 holds. In the present embodiment, the weighted least-squares method algorithm is used so as to properly secure identification accuracy and control accuracy.

Then, a gain coefficient H" is calculated by the following equations (120) to (122):

When α_H"<αid"(k−1) holds, $$H''(k) = \zeta'' \quad (120)$$

When α_L"≤αid"(k−1)≤α_H" holds, $$H''(k) = 1 \quad (121)$$

When αid"(k−1)<α_L" holds, $$H''(k) = \eta'' \quad (122)$$

In the above equations (120) to (122), α_L" represents a predetermined lower limit value, and α_H" represents a predetermined higher limit value. Further, η" represents a forgetting coefficient, and is set such that 0<η"≤1 holds. The forgetting coefficient η" is used for calculating the identified value αid" because when the steady operating condition of the engine 3 continues for a long time period, there is a fear that the identified value αid" increases and becomes improper. To avoid this inconvenience, the forgetting coefficient η" is used.

Further, four modification terms dαi" (i=1 to 4) as the modification values are calculated by the following equation (123):

$$d\alpha i''(k)=H''(k)\cdot d\alpha i''(k-1)+Wai''(k)\cdot Kp''(k)\cdot eid''(k) \quad (123)$$

Figure 42:
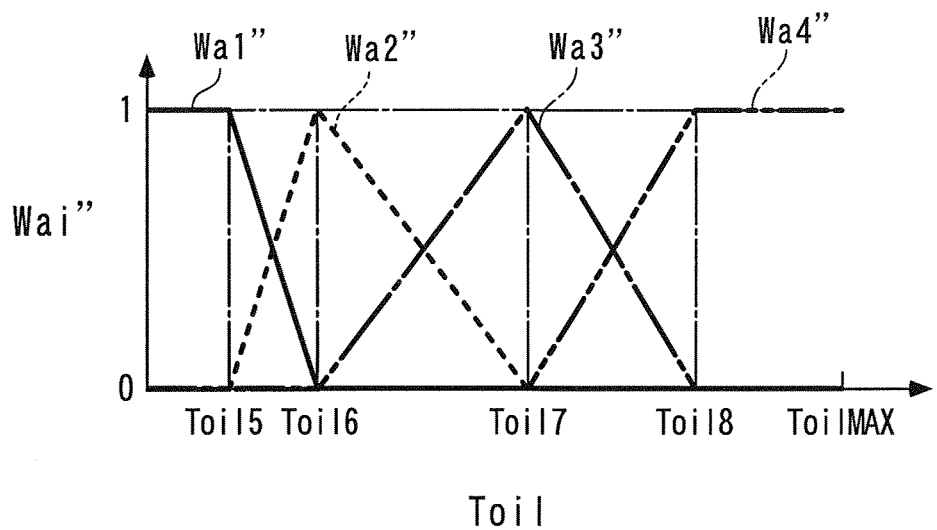
FIG. 42 is a diagram showing an example of a map for use in calculating a weight function value Wai"

In the above equation (123), Wai" represents a weight function value, and is calculated by searching a map shown in FIG. 42 according to the oil temperature Toil. In FIG. 42, Toil5 to Toil8 represent predetermined values of the oil temperature Toil, and are set such that Toil5≤Toil6≤Toil7≤Toil8≤ToilMAX holds. As shown in FIG. 42, when a range within which the oil temperature Toil can change is divided into the four ranges of first to fourth oil temperature ranges of Toil≤Toil6, Toil5≤Toil≤Toil7, Toil6≤Toil≤Toil8, and Toil7≤Toil≤ToilMAX, the four weight function values Wa1" to Wa4" are set such that they are associated with the above four ranges, respectively, and are set to positive values not larger than 1 in the associated ranges, whereas in ranges other than the associated ranges, they are set to 0.

The weight function value Wa1" is set, in the first oil temperature range associated therewith (Toil≤Toil6), to a smaller positive value as the oil temperature Toil is higher with a maximum value of 1 when Toil≤Toil5 holds, while in the other ranges, it is set to 0. The weight function value Wa2" is set, in the second oil temperature range associated therewith (Toil5≤Toil≤Toil7), to such a value as changes along the inclined sides of a triangle with a maximum value of 1 when Toil=Toil6 holds, while in the other ranges, it is set to 0.

The weight function value Wa3" is set, in the third oil temperature range associated therewith (Toil6≤Toil≤Toil8), to such a value as changes along the inclined sides of a triangle with a maximum value of 1 when Toil=Toil7 holds, while in the other ranges, it is set to 0. The weight function value Wa4" is set, in the fourth oil temperature range associated therewith (Toil7≤Toil≤ToilMAX), to a larger positive value as the oil temperature Toil is higher with a maximum value of 1 when Toil8≤Toil holds, while in the other ranges, it is set to 0.

Further to the above, the first to fourth ranges with which the respective four weight function values Wa1" to Wa4" are associated are set such that adjacent ones thereof overlap each other, as described above, and the sum of the values of the weight function values Wai" associated with the overlapping ranges is set such that it becomes equal to the maximum value of 1 of each of the weight function values Wai". Further, as is apparent from a comparison between FIG. 42 and FIG. 43, referred to hereinafter, the three ranges overlapping each other are set such that they correspond to three ranges, respectively, within which the slope of the reference model parameter αbs" is held constant.

Then, the identified value αid" is finally calculated by the following equation (124):

$$\alpha id''(k) = \alpha bs''(k) + \sum_{i=1}^{4} Wai''(k)\cdot d\alpha i''(k) \quad (124)$$

Figure 43:
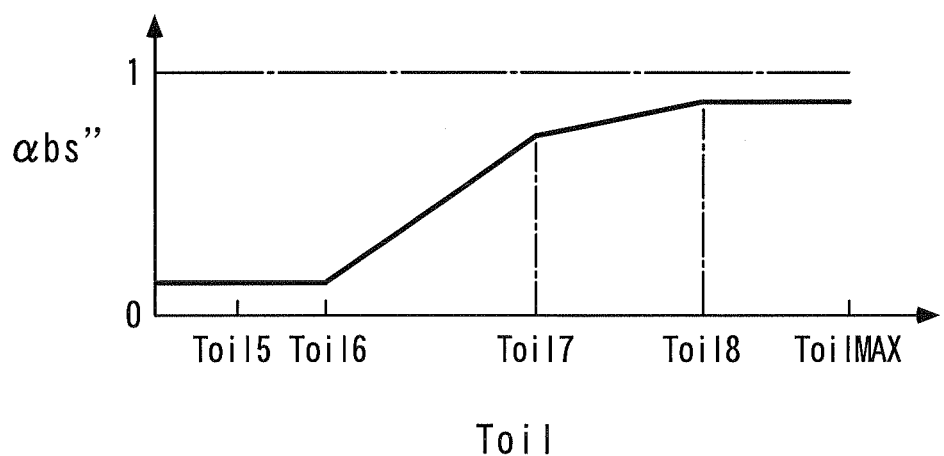
FIG. 43 is a diagram showing an example of a map for use in calculating a reference model parameter α bs"

In the above equation (124), αbs" represents a reference model parameter, and is calculated by searching a map shown in FIG. 43 according to the oil temperature Toil. In this map, the reference model parameter αbs" is set to a larger value as the oil temperature Toil is higher. This is because as the oil temperature Toil becomes higher, the response of the clutch actuator becomes higher to make the dead time d" smaller, whereby the degree of influence of the control input Uact on the main shaft rotational speed NM becomes larger, and to cope with this, the reference model parameter αbs" is configured as mentioned above.

Next, a description will be given of the above-mentioned frequency shaping controller 540. This frequency shaping controller 540 calculates the control input Uact using the target main shaft rotational speed NM_cmd, the predicted main shaft rotational speed PRE_NM, and the identified value αid", by the following equations (125) and (126). A control algorithm expressed by the equations (125) and (126) is derived by the same principle as that of the control algorithm for the above-described frequency shaping controller 130.

$$PRE\_e''(k)=PRE\_NM(k)-NM\_\mathrm{cmd}(k) \quad (125)$$

$$Uact(k) = \frac{1}{\alpha id''(k)} \cdot \{\beta'' \cdot PRE\_e''(k) - \\ (1-\alpha id''(k))\cdot \beta''\cdot PRE\_e''(k-1) - \alpha id''(k)\cdot Uact(k-1)\} \quad (126)$$

In the above equation (125), PRE_e" represents a predicted follow-up error. In the above equation (126), β" represents a sensitivity-setting parameter, and is configured to satisfy the above-mentioned control condition φ.

The frequency shaping controller 540 calculates the control input Uact, as described above. Then, the ECU 2 supplies a control input signal corresponding to the control input Uact to the clutch actuator 413, whereby the main shaft rotational speed NM is feedback-controlled such that it converges to the target main shaft rotational speed NM_cmd.

Next, the above-mentioned throttle valve controller 600 will be described with reference to FIG. 44. This throttle valve controller 600 controls the degree of opening of the throttle valve 6a, and as shown in FIG. 44, includes a target engine torque-calculating section 610, a target TH opening-calculating section 620, and a TH controller 630.

Figure 45:
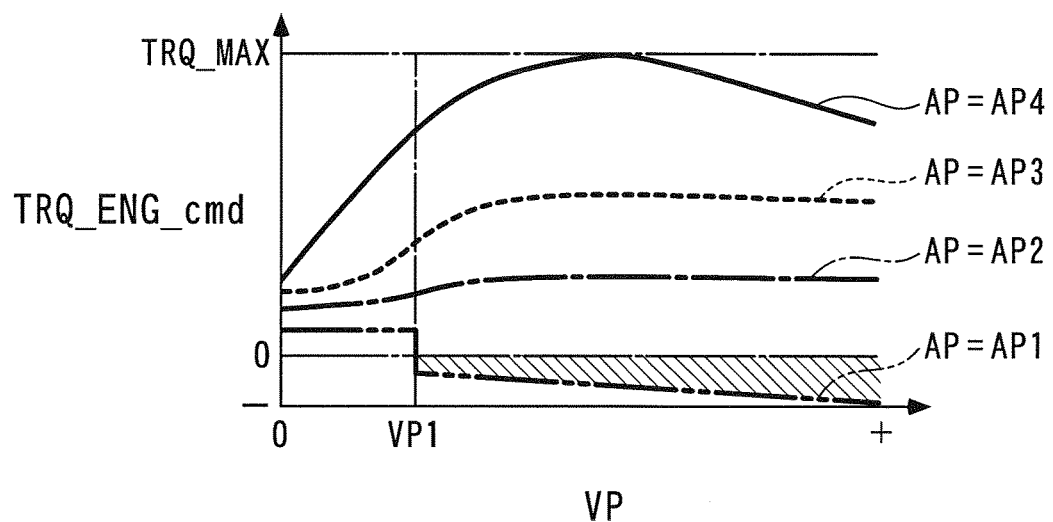
FIG. 45 is a diagram showing an example of a map for use in calculating a target engine torque TRQ_ENG_cmd.

The target engine torque-calculating section 610 calculates a target engine torque TRQ_ENG_cmd by searching a map shown in FIG. 45 according to the accelerator pedal opening AP and the vehicle speed VP. In FIG. 45, TRQ_MAX represents the maximum value of the torque that can be generated by the engine 3. Further, an area indicated by hatching in FIG. 45 represents an area in which a fuel cut operation should be performed since the accelerator pedal is fully closed (AP=AP1) and at the same time the vehicle is traveling (VP>VP1). Therefore, the target engine torque TRQ_ENG_cmd is set to a negative value in this area.

Figure 46:
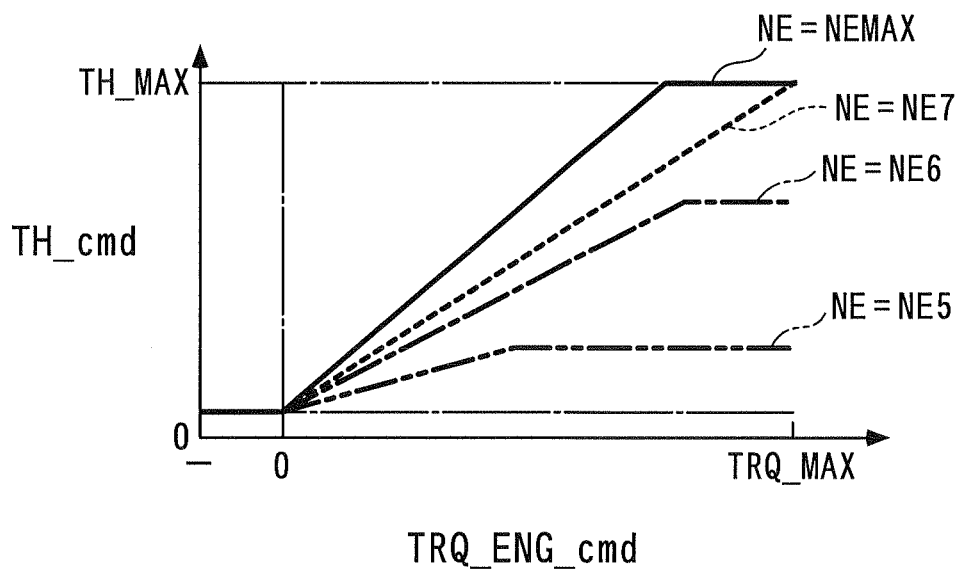
FIG. 46 is a diagram showing an example of a map for use in calculating a target TH opening TH_cmd.

Further, the target TH opening-calculating section 620 calculates a target TH opening TH_cmd by searching a map shown in FIG. 46 according to the target engine torque TRQ_ENG_cmd and the engine speed NE. In FIG. 46, NE5 to NE7 represent predetermined values of the engine speed NE, and are set such that 0<NE5<NE6<NE7<NEMAX holds. In this map, in a high-engine speed range, the target TH opening TH_cmd is set to a larger value as the target engine torque TRQ_ENG_cmd is larger, so as to ensure an intake air amount which can realize the large target engine torque TRQ_ENG_cmd. Further, the target TH opening TH_cmd is set to a larger value as the engine speed NE is higher, so as to ensure an intake air amount which can realize the high engine speed NE.

Next, the TH controller 630 calculates a control input Uth by searching a map, not shown, according to the target TH opening TH_cmd. Then, a control input signal corresponding to the control input Uth is supplied to the TH actuator 6b by the ECU 2, whereby the degree of opening of the throttle valve 6a is controlled such that it converges to the target TH opening TH_cmd.

Figure 47:
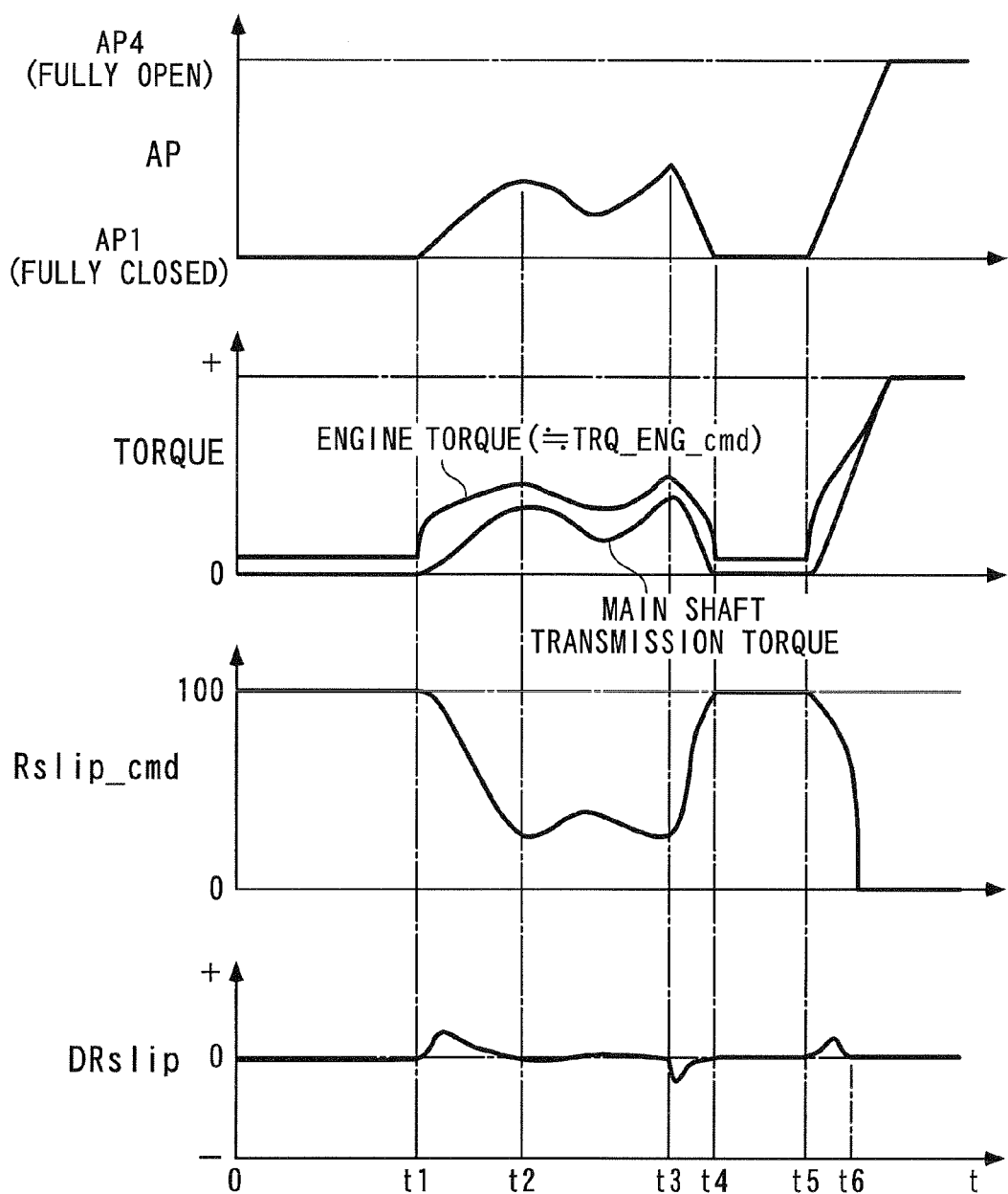
FIG. 47 is a timing diagram of an example of results of a simulation of clutch control performed by the control apparatus according to the fifth embodiment.

Next, results of a simulation of the clutch control performed by the control apparatus 1D according to the fifth embodiment (hereinafter referred to as "control results") will be described with reference to FIG. 47. In FIG. 47, Dslip represents a slip ratio difference indicative of the difference between an actual clutch slip ratio Rslip (=NE/NM) and the target clutch slip ratio Rslip_cmd (=Rslip−Rslip_cmd).

As shown in FIG. 47, the accelerator pedal is stepped on to increase the accelerator pedal opening AP from AP1 (=0) at a time point t1, and immediately thereafter, the actual clutch slip ratio Rslip overshoots the target clutch slip ratio Rslip_cmd, so that the slip ratio difference Dslip suddenly and temporarily increases. However, as the control proceeds, the slip ratio difference Dslip decreases, and between time points t2 and t3, the slip ratio difference Dslip is held at a value close to 0. From the above it is understood that high control accuracy is secured.

After the accelerator pedal is released at a time point t3, the actual clutch slip ratio Rslip undershoots the target clutch slip ratio Rslip_cmd, so that the slip ratio difference Dslip suddenly and temporarily decreases. However, as the control proceeds, the slip ratio difference Dslip increases toward 0, and between time points t4 and t5, the slip ratio difference Dslip is held at a value close to 0. From the above, it is understood that high control accuracy is secured.

Then, at a time point t5, the accelerator pedal is stepped on again, and immediately thereafter, the actual clutch slip ratio Rslip overshoots the target clutch slip ratio Rslip_cmd, so that the slip ratio difference Dslip temporarily increases. After that, as the control proceeds, the slip ratio difference Dslip decreases, and after a time point t6, the clutch 410 is directly engaged, so that the slip ratio difference Dslip is held at 0.

As described hereinabove, according to the control apparatus 1D of the fifth embodiment, the onboard identifier 530 calculates the identified value $\alpha id''$ of the model parameter $\alpha''$ with the aforementioned identification algorithm expressed by the equations (112) to (124) using the equation (105) as the control target model. In this case, the identification algorithm expressed by the equations (112) to (124) is derived by the same method as the method used for deriving the identification algorithm for the above-described onboard identifier 60, and hence it is possible to accurately calculate the identified value $\alpha id''$ of the model parameter $\alpha''$ while satisfying the restraint condition between the two model parameters $\alpha''$ and $1-\alpha''$ in the equation (105). Further, the control input Uact is calculated using the identified value $\alpha id''$ identified as above, and hence it is possible to prevent a modeling error due to changes in the first-order lag characteristic caused by changes in the oil temperature Toil, variation between individual products of the engine and aging of the component parts from increasing, whereby it is possible to improve the control accuracy and stability in the clutch control.

Further, the onboard identifier 530 calculates the identified value $\alpha id''$ of the model parameter by adding the total sum of the products $Wai'' \cdot d\alpha i''$ of the four weight function values $Wai''$ (i=1 to 4) and the four modification terms $d\alpha i''$ to the reference model parameter $\alpha bs''$, so that the reference model parameter $\alpha bs''$ is used as an initial value of the identified value $\alpha id''$ at a time when the identification computation is started. In addition to this, the oil temperature Toil has a high correlation with the first-order lag characteristic between the control input Uact and the main shaft rotational speed NM, and the reference model parameter $\alpha bs''$ is calculated by searching the FIG. 43 map according to the oil temperature Toil. Therefore, even immediately after the computation of the identified value $\alpha id''$ of the model parameter is started, it is possible to calculate the identified value $\alpha id''$ while causing the actual state of the first-order lag characteristic to be reflected on the identified value $\alpha id''$.

Further, the four range identification errors $Wai'' \cdot Kp'' \cdot eid''$ are calculated by multiplying the four weight function values $Wai''$ by the identification error $eid''$ and the identification gain $Kp''$, and the four modification values $d\alpha i''$ are calculated such that the four range identification errors $Wai'' \cdot Kp'' \cdot eid''$ are each minimized. In this case, the four weight function values $Wai''$ are calculated by searching the FIG. 42 map according to the oil temperature Toil, so that the four modification terms $d\alpha i''$ are calculated such that the identification errors in the above-mentioned first to fourth oil temperature ranges are each minimized, while causing changes in the first-order lag characteristic caused by changes in the oil temperature Toil to be reflected thereon. Further, the identified value $\alpha id''$ is calculated by adding the total sum of the products $Wai'' \cdot d\alpha i''$ of the four modification values $d\alpha i''$ calculated as above and the four weight function values $Wai''$ to the reference model parameter $\alpha bs''$, and hence it is possible to calculate the identified value $\alpha id''$ such that it approaches the actual value of the model parameter while causing changes in the first-order lag characteristic caused by changes in the oil temperature Toil to be reflected on the identified value $\alpha id''$.

Further, the identification gain $Kp''$ is calculated by the above equations (114) and (117) to (119) such that the identification gain $Kp''$ defines the direction (positive or negative) and amount of modification of the identified value $\alpha id''$, and the identified value $\alpha id''$ of the model parameter is calculated such that the four range identification errors $Wai'' \cdot Kp'' \cdot eid''$ as the products of the identification gain $Kp''$, the four weight function values $Wai''$, and the identification error $eid''$ are each minimized. Therefore, even when it is necessary to change the direction of modification of the reference model parameter $\alpha bs''$ due to changes in the operation conditions of the clutch 410, it is possible to modify the reference model parameter $\alpha bs''$ in an appropriate direction. From the above, it is possible to further improve the control accuracy and stability in the clutch control.

In addition to this, the equations (125) and (126) for calculating the control input Uact in the frequency shaping controller 540 are derived based on the sensitivity function which is set such that it satisfies the above-mentioned control condition $\phi$ (i.e. such that the predetermined frequency characteristic is obtained), and the control target model obtained by omitting the dead time $d''$ from the equation (105) defined using the above-described identified value $\alpha id''$. Therefore, it is possible to directly specify (set) the disturbance suppression characteristic and the robustness of the control apparatus 1 on the frequency axis while properly compensating for changes in the first-order lag characteristic caused by changes in the oil temperature Toil. This makes it possible to make a dramatic improvement in the ability of suppressing a disturbance and the robustness in a frequency range within which fluctuation in the controlled variable due to the disturbance is desired to be prevented.

Note that the control apparatus 1D according to the fifth embodiment may be configured such that the equation obtained by replacing 1−a" with 6" in the above-mentioned equation (105) is used as the control target model, and the onboard identifier 530 calculates the two model parameters δ" and α" with the same identification algorithm as that used by the above-mentioned onboard identifier 260. In this case, the state predictor 520 and the frequency shaping controller 540 are only required to be configured such that the predicted value PRE_NM and the control input Uact are calculated with the same control algorithms as those used by the above-mentioned state predictor 240 and the frequency shaping controller 330, respectively.

Further, although in the fifth embodiment, as the M weight function values, there are used the four function values Wa1" to Wa4", by way of example, the number of weight function values is not limited to this, but it is only required to be not less than two.

Next, a control apparatus 1E according to a sixth embodiment of the present invention will be described with reference to FIG. 48. Similarly to the control apparatus 1D according to the fifth embodiment, the control apparatus 1E controls e.g. the engagement and disengagement operations of a clutch of the automatic transmission 400. The control apparatus 1E according to the sixth embodiment has the same mechanical configuration as that of the control apparatus 1D according to the fifth embodiment, except that a wet clutch (not shown) is used in place of the dry clutch 410, so that in the following description, the same component elements of the control apparatus 1S as those of the control apparatus 1D according to the fifth embodiment are denoted by the same reference numerals, and detailed description thereof is omitted.

In general, the wet clutch has a characteristic that it is more difficult to develop a judder than the dry clutch, because of its structure. Therefore, it is only required to control the wet clutch such that the rotational difference between the rotational speed NE on the upstream side of the clutch and the rotational speed NM on the downstream side of the clutch smoothly converges to 0 in a time series manner, without taking the aforementioned control condition φ into account. For the above reason, the control apparatus 1S according to the present embodiment calculates the control input Uact with a control algorithm, described hereinafter.

As shown in FIG. 48, the control apparatus 1E includes a clutch controller 700. This clutch controller 700 is distinguished from the above-described FIG. 39 clutch controller 500 only in that it is provided with an adaptive disturbance observer 740, and that a two-degree-of-freedom response-specifying controller 750 replaces the above-described frequency shaping controller 540. Therefore, the following description will be given only of these different points.

First, a description will be given of the adaptive disturbance observer 740. The adaptive disturbance observer 740 calculates a disturbance estimated value ε" with a control algorithm, described hereinafter. First, an estimated main shaft rotational speed NM_adv for estimating a disturbance is calculated by the following equation (127):

$$NM\_adv(k)=(1-\alpha id''(k)) \cdot NM(k)+\alpha id''(k) \cdot Uact\_mod(k)+\epsilon''(k-1) \quad (127)$$

This equation (127) corresponds to an equation obtained by replacing NM(k+1), α", and Uact(k−d") of the aforementioned equation (105) with NM_adv(k), αid"(k), and Uact_mod(k), respectively, and adding the disturbance estimated value ε" to the right side of the equation (105).

Then, a follow-up error e_adv" is calculated by the following equation (128):

$$e\_adv''(k)=NM\_adv(k)-NM(k) \quad (128)$$

Finally, the disturbance estimated value ε" is calculated by the following equation (129):

$$\varepsilon''(k) = \varepsilon''(k-1) + \frac{\pi''}{1+\pi''} \cdot e\_adv''(k) \quad (129)$$

In this equation (129), π" represents a disturbance estimated gain, and is set such that π">0 holds.

Next, a description will be given of the above-mentioned two-degree-of-freedom response-specifying controller 750. This two-degree-of-freedom response-specifying controller 750 calculates the control input Uact with a target value filter-type two-degree-of-freedom response-specifying control algorithm which additionally takes into account the above-mentioned disturbance estimated value ε", as will be described hereinafter.

Specifically, first, a filtering value NM_cmd_f of the target main shaft rotational speed is calculated by the following equation (130):

$$NM\_cmd\_f(k)=-POLE\_f'' \cdot NM\_cmd\_f(k-1)+(1+POLE\_f'') \cdot NM\_cmd(k) \quad (130)$$

wherein POLE_f" represents a target value filter-setting parameter, and is set such that the relationship of −1<POLE_f"<0 holds.

Then, a predicted follow-up error PRE_e_f" is calculated by the following equation (131):

$$PRE\_e\_f''(k)=PRE\_NM(k)-NM\_cmd\_f(k-1) \quad (131)$$

Further, a switching function σ_f" is calculated by the following equation (132):

$$\sigma\_f''(k)=PRE\_e\_f''(k)+POLE'' \cdot PRE\_e\_f''(k-1) \quad (132)$$

wherein POLE" represents a switching function-setting parameter, and is set such that the relationship of −1<POLE"<0 holds.

Then, an equivalent control input Ueq_f" is calculated by the following equation (133):

$$Ueq\_f''(k) = \frac{1}{\alpha id''(k)} \cdot \{(\alpha id''(k) - POLE'') \cdot PRE\_NM(k) + POLE'' \cdot PRE\_NM(k-1) - \varepsilon''(k) + NM\_cmd\_f(k) + (POLE'' - 1) \cdot NM\_cmd\_f(k-1) - POLE'' \cdot NM\_cmd\_f(k-2)\} \quad (133)$$

Further, a reaching law input Urch_f" is calculated by the following equation (134):

$$Urch\_f''(k) = \frac{Krch''}{\alpha id''(k)} \cdot \sigma\_f''(k) \quad (134)$$

wherein, Krch" represents a predetermined feedback gain.
Then, finally, the control input Uact is calculated by the following equation (135):

$$Uact(k)=Ueq\_f''(k)+Urch\_f''(k) \quad (135)$$

The above-described control apparatus 1E according to the sixth embodiment is provided with the same state predictor 520 and onboard identifier 530 as provided in the control apparatus 1D according to the fifth embodiment, and hence it is possible to obtain the same advantageous effects as provided by the control apparatus 1D of the fifth embodiment. Further, the adaptive disturbance observer 740 calculates the disturbance estimated value ε" with the above-described control algorithm, and the two-degree-of-freedom response-specifying controller 750 calculates the control input Uact using the disturbance estimated value ε". This makes it possible to enhance the ability of suppressing a disturbance, i.e. the robustness, of the clutch control.

Further, since the control apparatus 1E is provided with the adaptive disturbance observer 740, it is possible to improve the stability of control by setting the disturbance estimation gain such that π">P0" holds and reducing the identification speed of the onboard identifier 530. Furthermore, for the same reason, to prevent the resonance of the control system, or to prevent the gain characteristic of the control target model to which the computation result of the identified value αid" is applied, from becoming too small, it is possible to filter input and output data used for the identified value αid" and the identification algorithm, thereby making it possible to ensure higher controllability.

Next, a control apparatus 1F according to a seventh embodiment of the present invention will be described with reference to FIG. 49. Similarly to the above-described control apparatus 1, the control apparatus 1F controls the air-fuel ratio by calculating the air-fuel ratio correction coefficient KAF, etc. In the seventh embodiment, the following equation (136) is used as a control target model in place of the equation (2) used in the first embodiment.

$$KACT(k+1)=a1 \cdot KACT(k)+a2 \cdot KACT(k-1)+b1 \cdot KAF(k-d) \tag{136}$$

In the above equation (136), a1, a2, and b1 are model parameters, and the equation (136) is a second-order ARX model in which two autoregressive terms exist, i.e. a control target model of a second-order lag system.

Figure 49:
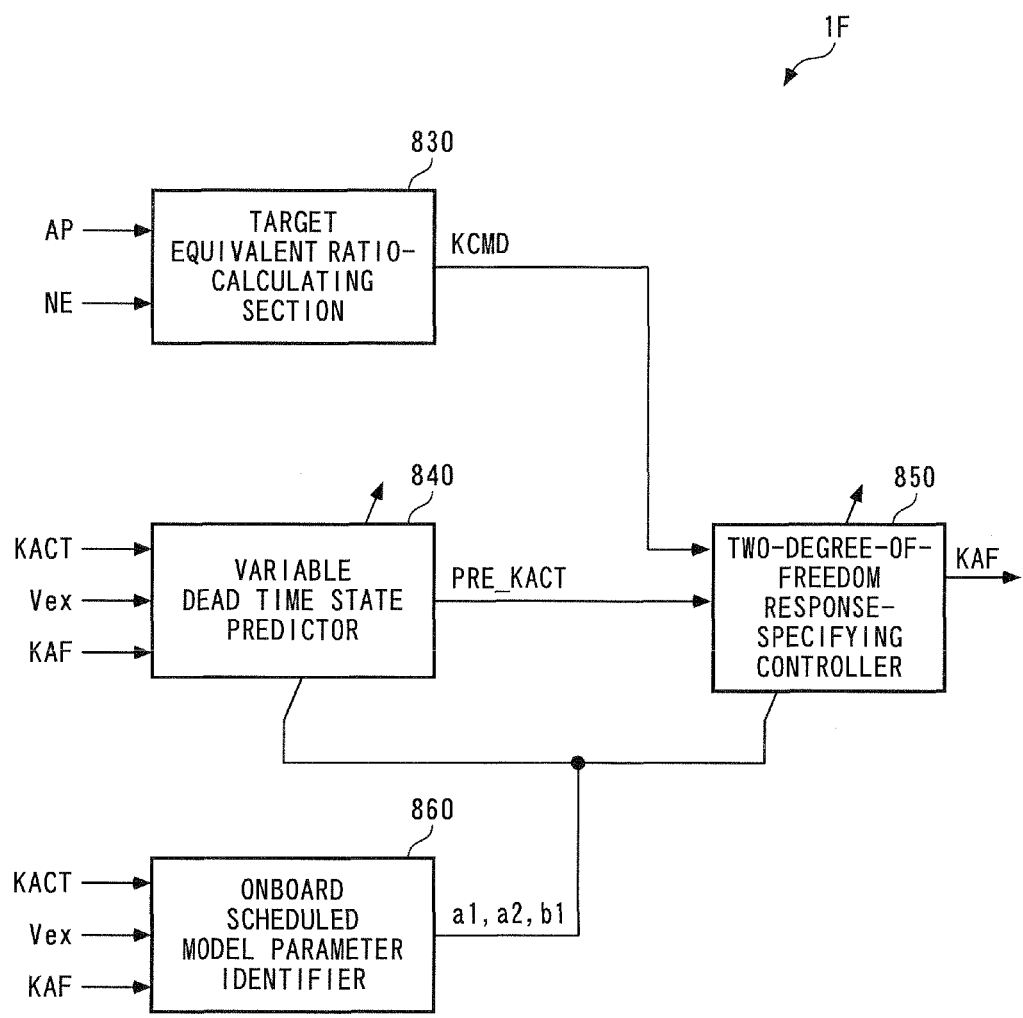
FIG. 49 is a block diagram of a control apparatus according to a seventh embodiment of the present invention.

As shown in FIG. 49, the control apparatus 1F includes a target equivalent ratio-calculating section 830, a variable dead time state predictor (hereinafter referred to as the "state predictor") 840, an onboard scheduled model parameter identifier (hereinafter referred to as the "onboard identifier") 860, and a two-degree-of-freedom response-specifying controller 850, all of which are implemented by the ECU 2.

In the present embodiment, the ECU 2 corresponds to the identification means, the control input-calculating means, the reference parameter-detecting means, the weight function value-calculating means, the range identification error vector-calculating means, the modification value vector-calculating means, model parameter vector-identifying means, the first reference parameter-detecting means, the second reference parameter-detecting means, reference model parameter vector-calculating means, and identification gain vector-calculating means. Further, the onboard identifier 860 corresponds to the identification means, the weight function value-calculating means, the range identification error vector-calculating means, the modification value vector-calculating means, the model parameter vector-identifying means, the reference model parameter vector-calculating means, and the identification gain vector-calculating means, and the two-degree-of-freedom response-specifying controller 850 corresponds to the control input-calculating means.

The target equivalent ratio-calculating section 830 calculates the target equivalent ratio KCMD by the same method as the method used by the above-mentioned target equivalent ratio-calculating section 30.

Further, the state predictor 840 calculates the predicted equivalent ratio PRE_KACT with a predetermined prediction algorithm. The prediction algorithm for the state predictor 840 is derived by the same method as the method used for deriving the prediction algorithm for the above-mentioned state predictor 40. More specifically, the equations for calculating the three values KACT(k+1), KACT(k+2), and KACT(k+3) of the detected equivalent ratio each to be assumed when d=1 to 3 is set are derived based on the above equation (136). Further, in these equations, KACT(k+1), KACT(k+2), and KACT(k+3) are replaced with the three predicted values PRE_KACT1 to PRE_KACT3, and the model parameters a1, a2, and b1 are replaced with the identified values thereof a1(k), a2(k), and b1(k), respectively, and PRE_KACT_0(k)=KACT(k) is set. Then, finally, the predicted equivalent ratio PRE_KACT(k) is calculated by the above-mentioned equation (7).

Next, a description will be given of the onboard identifier 860. The onboard identifier 860 calculates the three model parameters a1(k), a2(k), and b1(k) with a scheduled modification-type identification algorithm with a restraint condition, expressed by the following equations (137) to (150).

First, a combined signal value W_act$^\#$ is calculated by the following equation (137):

$$W\_act^\#(k)=KACT(k)-a\_stab \cdot KACT(k-1) \tag{137}$$

In the above equation (137), a_stab represents a predetermined stability condition value, and is set to a fixed value (e.g. 0.99) which satisfies 0<a_stab<1 for a reason described hereinafter.

Next, two vectors $\zeta^\#$ and $\theta^\#$ are calculated by the following equations (138) and (139), respectively:

$$\theta^\#(k-1)=[a1(k-1)\,b1(k-1)]^T \tag{138}$$

$$\zeta^\#(k)=[KACT(k-1)-KACT(k-2)\,KAF(k-d-1)]^T \tag{139}$$

Then, an estimated combined signal value W_hat$^\#$ is calculated by the following equation (140):

$$W\_hat^\#(k)=\theta^\#(k-1)^T \cdot \zeta^\#(k) \tag{140}$$

Next, an identification error eid$^\#$ is calculated by the following equation (141):

$$eid^\#(k)=W\_act^\#(k)-W\_hat^\#(k) \tag{141}$$

Then, an identification gain vector Kp$^\#$ is calculated by the following equations (142) and (143):

$$P^\#(k) = \frac{1}{\lambda 1} \cdot \left( I - \frac{\lambda 2 \cdot P^\#(k-1) \cdot \zeta^\#(k-1) \cdot \zeta^\#(k-1)^T}{\lambda 1 + \lambda 2 \cdot \zeta^\#(k-1)^T \cdot P^\#(k-1) \cdot \zeta^\#(k-1)} \right) P^\#(k-1) \tag{142}$$

$$Kp^\#(k) = \frac{P^\#(k) \cdot \zeta^\#(k-1)}{1+\zeta^\#(k-1)^T \cdot P^\#(k) \cdot \zeta^\#(k-1)} \tag{143}$$

In the above equation (142), P$^\#$ represents a square matrix of order 2 an initial value of which is defined by the following equation (144):

$$P^\#(0) = \begin{bmatrix} P0 & 0 \\ 0 & P0 \end{bmatrix} \tag{144}$$

Next, four modification term vectors $d\theta^\#i$ (i=1 to 4) are calculated by the following equations (145) to (147):

$$\eta = \begin{bmatrix} \eta1 & 0 \\ 0 & \eta2 \end{bmatrix} \quad (145)$$

$$d\theta^\#i(k-1)=[da1i(k-1)\,db1i(k-1)]^T \quad (146)$$

$$d\theta^\#i(k)=\eta \cdot d\theta^\#i(k-1)+Wai(k)\cdot Kp^\#(k)\cdot eid^\#(k) \quad (147)$$

In the above equation (146), $da1i$ and $db1i$ represent modification terms. Further, in the above equation (147), $Wai\cdot Kp^\#\cdot eid^\#$ represents a range identification error vector, and the weight function values $Wai$ of the equation (147) are calculated by the above-described method of searching the FIG. 11 map.

Further, the reference model parameter vector $\theta^\#bs$ is calculated by the following equation (148):

$$\theta^\#bs(k)=[a1bs(k)\,b1bs(k)]^T \quad (148)$$

Figure 50:
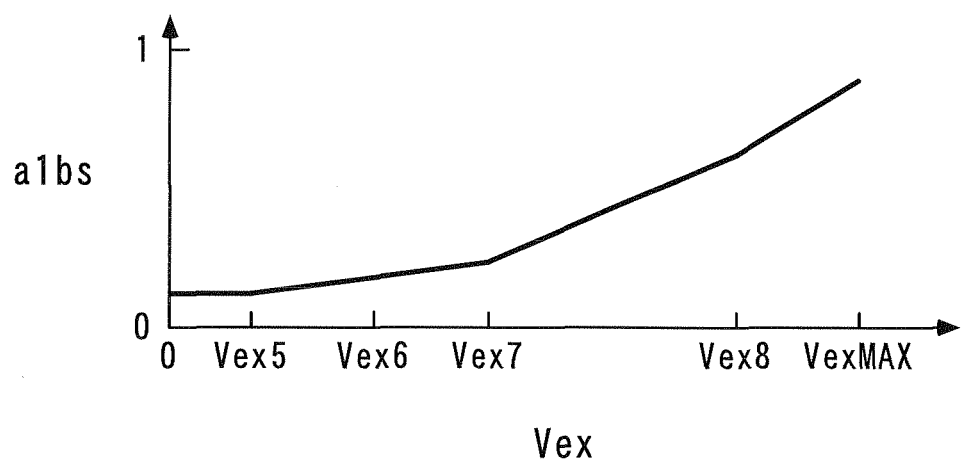
FIG. 50 is a diagram showing an example of a map for use in calculating a reference model parameter a1bs.

In the above equation (148), $a1bs$ and $b1bs$ represent reference model parameters. The reference model parameter $a1bs$ is calculated by searching a map shown in FIG. 50 according to the exhaust gas volume Vex. As shown in FIG. 50, the reference model parameter $a1bs$ is set to a larger value as the exhaust gas volume Vex is larger. As described concerning the method of calculating the reference model parameter $\alpha bs$, this is because as the exhaust gas volume Vex is larger, the exchange of exhaust gases via the holes of a sensor cover of the LAF sensor 23 is promoted to make the lag characteristic of the LAF sensor 23 smaller, to thereby increase the degree of influence of the air-fuel ratio correction coefficient KAF on the detected equivalent ratio KACT.

Figure 51:
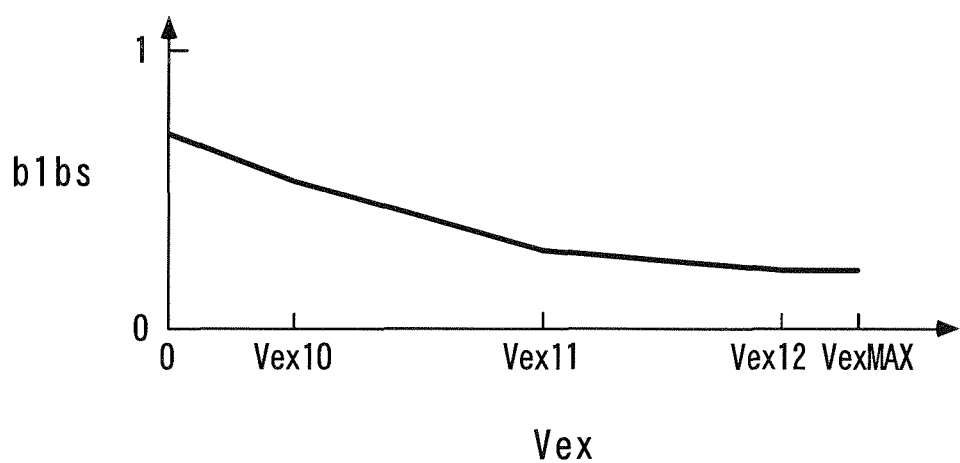
FIG. 51 is a diagram showing an example of a map for use in calculating a reference model parameter bibs.

Further, the reference model parameter $b1bs$ is calculated by searching a map shown in FIG. 51 according to the exhaust gas volume Vex. In FIG. 51, Vex10 to Vex12 represent predetermined values of the exhaust gas volume Vex, and are set such that 0<Vex10<Vex11<Vex12<VexMAX holds. As shown in FIG. 51, the reference model parameter $b1bs$ is set to a smaller value as the exhaust gas volume Vex is larger. This is because as the exhaust gas volume Vex is larger, the exchange of exhaust gases via the holes of a sensor cover of the LAF sensor 23 is promoted to make the lag characteristic of the LAF sensor 23 smaller, to thereby reduce the degree of influence of the air-fuel ratio correction coefficient KAF(k−d) the dead time d earlier, on the detected equivalent ratio KACT.

Then, the model parameter vector $\theta^\#$ is calculated by the following equations (149):

$$\theta^\#(k) = \theta^\#bs(k) + \sum_{i=1}^{4} Wai(k)\cdot d\theta^\#i(k) \quad (149)$$

Then, the model parameter $a2(k)$ is finally calculated by the following equation (150), using the model parameter $a1(k)$ calculated by the above equation (149)

$$a2(k)=a\_stab-a1(k) \quad (150)$$

Next, a description will be given of a method of deriving the identification algorithm for the onboard identifier 860. When the model parameters a1, a2, and b1 of the control target model expressed by the above equation (136) are identified onboard with the sequential identification algorithm, an autoexcitation condition is insufficient when the input and output of the controlled object become steady, whereby a phenomenon that the absolute value of a result of identification of the model parameter increases (hereinafter referred to as the "drift phenomenon") is liable to occur, which causes a phenomenon that the control system becomes unstable and oscillative.

As one of methods for preventing the drift phenomenon, there is known a method that sets (identifies) a combination of the two model parameters a1 and a2 within a triangular limiting range indicated by hatching in FIG. 52, and in this case, to set the two model parameters a1 and a2 within the limiting range, it is only required to set the values of the two model parameters a1 and a2 such that the following equation (151) holds:

$$a1+a2=a\_stab \quad (151)$$

By transforming the above equation (151), there is obtained the following equation (152):

$$a2=a\_stab-a1 \quad (152)$$

If the equation (152) is substituted into the equation (136), there is obtained the following equation (153):

$$KACT(k+1) = a1\cdot KACT(k) + (a\_stab - a1)\cdot \quad (153)$$
$$KACT(k-1) + b1\cdot KAF(k-d)$$
$$= a1\cdot (KACT(k) - KACT(k-1)) + b1\cdot$$
$$KAF(k-d) + a\_stab\cdot KACT(k-1)$$

By arranging the equation (153) such that a group of terms multiplied by the model parameter a1 or b2 and a group of terms not multiplied by the same are on the respective different sides, there is obtained the following equation (154):

$$KACT(k+1)-a\_stab\cdot KACT(k-1)=a1\cdot(KACT(k)-KACT(k-1))+b1\cdot KAF(k-d) \quad (154)$$

The left side and right side of the above equation (154) are defined as the combined signal value W_act$^\#$ and the estimated combined signal value W_hat$^\#$ as expressed by the following equations (155) and (156):

$$W\_act^\#(k+1)=KACT(k+1)-a\_stab\cdot KACT(k-1) \quad (155)$$

$$W\_hat^\#(k+1)=a1\cdot(KACT(k)-KACT(k-1))+b1\cdot KAF(k-d) \quad (156)$$

Then, when the sequential least-squares method is applied such that the combined signal value W_act$^\#$ and the estimated combined signal value W_hat$^\#$ become equal to each other (i.e. such that the above-described identification error eid$^\#$ is minimized), the above-mentioned equations (137) to (149) are derived.

Next, a description will be given of the two-degree-of-freedom response-specifying controller 850. The two-degree-of-freedom response-specifying controller 850 calculates the air-fuel ratio correction coefficient KAF with the following target value filter-type two-degree-of-freedom response-specifying control algorithm. Specifically, first, a filtering value KCMD_f of the target equivalent ratio, a predicted follow-up error PRE_e_f, and a switching function σ_f are calculated by the following equations (157) to (159) which are the same as the equations (89) to (91) for the above-mentioned response-specifying controller 350

$$KCMD\_f(k)=-POLE\_f\cdot KCMD\_f(k-1)+(1+POLE\_f)\cdot KCMD(k) \quad (157)$$

$$PRE\_e\_f(k)=PRE\_KACT(k)-KCMD\_f(k-1) \quad (158)$$

$$\sigma\_f(k)=PRE\_e\_f(k)+POLE\cdot PRE\_e\_f(k-1) \quad (159)$$

Then, an equivalent control input $Ueq\_f^{\#}$ is calculated by the following equation (160):

$$Ueq\_f^{\#}(k) = \frac{1}{b1(k)} \cdot \{(1 - a1(k) - POLE) \cdot PRE\_KACT(k) + \quad (160)$$
$$(POLE - a2(k)) \cdot PRE\_KACT(k-1) + KCMD\_f(k) +$$
$$(POLE - 1) \cdot KCMD\_f(k-1) - POLE \cdot KCMD\_f(k-2)\}$$

Further, a reaching law input $Urch\_f^{\#}$ is calculated by the following equation (161):

$$Urch\_f^{\#}(k) = \frac{Krch^{\#}}{b1(k)} \cdot \sigma\_f(k) \quad (161)$$

wherein, $Krch^{\#}$ represents a predetermined feedback gain.

Further, an adaptive law input $Uadp\_f^{\#}$ is calculated by the following equation (162):

$$Uadp\_f^{\#}(k) = \frac{Kadp^{\#}}{b1(k)} \cdot \sum_{i=0}^{k} \sigma_f(i) \quad (162)$$

wherein, $Kadp^{\#}$ represents a predetermined feedback gain.

Then, finally, the air-fuel ratio correction coefficient KAF is calculated by the following equation (163):

$$KAF(k) = Ueq\_f^{\#}(k) + Urch\_f^{\#}(k) + Uadp\_f^{\#}(k) \quad (163)$$

The target value filter-type two-degree-of-freedom response-specifying algorithm expressed by the above equations (157) to (163) is derived based on the control target model expressed by the aforementioned equation (136).

According to the control apparatus 1F according to the seventh embodiment, the onboard identifier 860 calculates the identified values $a1(k)$, $a2(k)$, and $b1(k)$ for the parameters with the identification algorithm expressed by the above-mentioned equations (137) to (150) using the equation (136) as the control target model. In the case of this equation (136), between the two model parameters a1 and a2, the restraint condition that a sum of them becomes equal to a predetermined stability condition value a_stab is set, and hence, if a general identification algorithm, such as the sequential least-squares method, is directly employed, it is impossible to identify the two model parameters a1 and a2 such that the restraint condition is satisfied.

On the other hand, in the case of the above-described onboard identifier 860, respective defining equations (137) and (140) of the combined signal value $W\_act^{\#}$ and the estimated combined signal value $W\_hat^{\#}$ are derived by substituting the equation (152) into the equation (136), and the model parameter vector $\theta^{\#}$ which is composed of the elements of the two model parameters a1 and b1 is identified with the identification algorithm to which the sequential least-squares method is applied, such that the identification error $eid^{\#}$ as the difference between combined signal value $W\_act^{\#}$ and the estimated combined signal value $W\_hat^{\#}$ is minimized. Further, the model parameter a2 is calculated using the identified model parameter a1. This makes it possible to accurately identify onboard the three model parameters a1, a2, and b1 while satisfying the above-mentioned restraint condition. Further, the air-fuel ratio correction coefficient KAF is calculated using the model parameters a1, a2, and b1 identified as above, and hence it is possible to prevent a modeling error caused by changes in the second-order lag characteristic caused by changes in the exhaust gas volume Vex, variation between individual products of the engine, and aging of the same from increasing, whereby it is possible to improve the control accuracy and stability in the air-fuel ratio control.

Further, the two-degree-of-freedom response-specifying controller 850 calculates the air-fuel ratio correction coefficient KAF with the above-described control algorithm, and hence it is possible to separately and directly specify a behavior of convergence of the disturbance-caused difference between the target equivalent ratio KCMD and the detected equivalent ratio KACT to 0, and a follow-up characteristic of the detected equivalent ratio KACT with respect to a change in the target equivalent ratio KCMD.

Although in the seventh embodiment, the equation (136) having one input term is used as the control target model, by way of example, the control target model of the present invention is not limited to this, but any suitable control target model may be used insofar as it represents the dynamic characteristics of the controlled object. For example, an ARX model having two autoregressive terms and two input terms may be used. In this case, when a restraint condition exists not only between the two model parameters of the autoregressive term, but also between the two model parameters of the input term, it is only required to be configured such that one of the model parameters of the autoregressive term and one of the model parameters of the input term are identified onboard by the above-described identification method, and the others of the respective model parameters are calculated using the identified values. Further, as the control target model, there may be used a control target model having a third or higher order lag characteristic, or a control target model having two or more pairs of model parameters, one pair of which is formed by two model parameters set such that they satisfy a mutual restraint condition.

Further, the onboard identifier 860 may be configured such that the three model parameters a1, a2, and b1 are identified with the same identification algorithm as the identification algorithm for the onboard identifier 260 according to the above-described second embodiment in place of the identification algorithm for the onboard identifier 860 according to the seventh embodiment. In this case, it is only required to define the model parameter vector $\theta^{\#}$ as a vector composed of the elements of the three values of a1, $\delta1$, and b1, the modification term vector $d\theta^{\#}i$ as a vector composed of the elements of a1$bs$, $\delta1bs$, and b1$bs$, and $\delta1bs$=a_stab−a1$bs$.

Further, although in the seventh embodiment, as a control algorithm for calculating the air-fuel ratio correction coefficient KAF as a control input, the two-degree-of-freedom response-specifying control algorithm expressed by the equations (157) to (163) is used, by way of example, in place of this, there may be used a control algorithm derived by the same method (method using a sensitivity function) that is used for deriving the control algorithm for the above-described frequency shaping controller 130 of the first embodiment. In the case of this configuration, it is possible to directly specify (set) a disturbance suppression characteristic and robustness of the control apparatus 1F on the frequency axis while properly compensating for changes in the second-order lag characteristic caused by changes in the exhaust gas volume Vex. This makes it possible to make a dramatic improvement in the ability of suppressing a disturbance and the robustness in a frequency range within which fluctuation in the controlled variable caused by the disturbance is desired to be suppressed.

Further, although the first and fifth embodiments are examples in which the predetermined restraint condition between a plurality of model parameters of the control target model is that the sum of the two model parameters $\alpha$ and $1-\alpha$ (or a" and 1-a") becomes equal to 1, and the seventh embodiment is an example in which the predetermined restraint condition is that the sum of the two model parameters a1 and a2 becomes equal to the predetermined stability condition value a_stab (0<a_stab<1), the predetermined restraint condition between a plurality of model parameters of the control target model of the present invention is not limited to these, but it is only required to restrain the relationship between a plurality of model parameters such that one predetermined model parameter defines the other model parameters. For example, when the number of the plurality of model parameters is two, the predetermined restraint condition may be that the sum of the two model parameters a1 and a2 becomes a fixed value not smaller than 1, that the difference between the two model parameters becomes a fixed value, or that a ratio of the two model parameters becomes a fixed value. Further, when the number of the plurality of model parameters is three or more, the predetermined restraint condition may be that ratios of the other model parameters with respect to one predetermined model parameter become fixed values, respectively.

Although in the first to fourth, and seventh embodiments, the present invention is applied to the control apparatuses for controlling the air-fuel ratio of the engine 3 as a controlled object, and in the fifth and sixth embodiments, the present invention is applied to the control apparatuses for controlling the clutch 410 as a controlled object, by way of example, this is not limitative, the present invention may be applied to any suitable control apparatus insofar as it controls a controlled object having a characteristic that a first or higher order lag characteristic changes according to reference parameters. For example, the present invention may be applied to a control apparatus for controlling operation of a robot as a controlled object.

It is further understood by those skilled in the art that the foregoing are preferred embodiments of the invention, and that various changes and modifications may be made without departing from the spirit and scope thereof.

What is claimed is:

1. A control apparatus for controlling a controlled variable of a controlled object using a control target model of a discrete-time system which represents a dynamic characteristic of the controlled object,
    wherein the control target model includes, as model parameters, at least one set of model parameters, each set being formed by a plurality of model parameters defined to be required to satisfy a predetermined restraint condition, and the predetermined restraint condition is that a predetermined one model parameter of the plurality of model parameters defines the other model parameters,
    the control apparatus comprising:
    identification means for arranging the control target model such that a group of terms which are not multiplied by at least one model parameter including the predetermined model parameter and a group of terms which are multiplied by the same are on respective different sides of the control target model, and, assuming that one of the different sides of the control target model represents a combined signal value and the other of the different sides of the control target model represents an estimated combined signal value, identifying onboard the at least one model parameter such that an error between the combined signal value and the estimated combined signal value is minimized; and
    control input-calculating means for calculating a control input for controlling the controlled variable, using the identified at least one model parameter and a control algorithm derived from the control target model.

2. The control apparatus as claimed in claim 1, wherein the controlled object has a first-order lag characteristic as the dynamic characteristics, and
    wherein the at least one model parameter is the predetermined model parameter,
    the control apparatus further comprising reference parameter-detecting means for detecting a reference parameter which influences the first-order lag characteristic,
    wherein said identification means comprises:
    weight function value-calculating means for calculating, according to the detected reference parameter, M weight function values (M represents an integer not smaller than 2) associated with the reference parameter;
    range identification error-calculating means for calculating M first products by multiplying the error by the M calculated weight function values, and calculating M range identification errors using the M first products;
    modification value-calculating means for calculating M modification values such that the M calculated range identification errors are each minimized; and
    identified value-calculating means for calculating M second products by multiplying the M modification values by the M weight function values, respectively, and calculating an identified value of the predetermined model parameter using a total sum of the M second products, and
    wherein the M weight function values are associated with M ranges of the reference parameter, respectively, the M weight function values each being set to values other than 0 in an associated range and set to 0 in ranges other than the associated range, and adjacent ones of the M ranges overlap each other.

3. The control apparatus as claimed in claim 2, wherein said identification means further comprises identification gain-calculating means for calculating an identification gain according to the control input and the controlled variable, and
    wherein said range identification error-calculating means calculates products of the calculated identification gain and the M first products, as the M range identification errors.

4. The control apparatus as claimed in claim 1, wherein the controlled object has a first-order lag characteristic as the dynamic characteristics, and
    wherein the at least one model parameter is the predetermined model parameter,
    the control apparatus further comprising:
    first reference parameter-detecting means for detecting a first reference parameter which influences the first-order lag characteristic; and
    second reference parameter-detecting means for detecting a second reference parameter which influences the first-order lag characteristic,
    wherein said identification means comprises:
    reference model parameter-calculating means for calculating, according to the detected first reference parameter, a reference model parameter as a reference value of the predetermined model parameter;
    weight function value-calculating means for calculating, according to the detected second reference parameter, M weight function values (M represents an integer not smaller than 2) associated with the second reference parameter;

range identification error-calculating means for calculating M first products by multiplying the error by the M calculated weight function values, and calculating M range identification errors using the M first products;

modification value-calculating means for calculating M modification values such that the M calculated range identification errors are each minimized; and identified value-calculating means for calculating M second products by multiplying the M modification values by the M weight function values, respectively, and calculating onboard an identified value of the predetermined model parameter by adding a total sum of the M second products to the reference model parameter, and wherein the M weight function values are associated with M ranges of the second reference parameter, respectively, the M weight function values each being set to values other than 0 in an associated range and set to 0 in ranges other than the associated range, and adjacent ones of the M ranges overlap each other.

5. The control apparatus as claimed in claim 4, wherein said identification means further comprises identification gain-calculating means for calculating an identification gain according to the control input and the controlled variable, and wherein said range identification error-calculating means calculates products of the calculated identification gain and the M first products, as the M range identification errors.

6. The control apparatus as claimed in claim 1, wherein the controlled object has a first-order lag characteristic as the dynamic characteristic, wherein the at least one model parameter is the predetermined model parameter, and wherein said identification means calculates an identification gain according to the control input and the controlled variable, and identifies the predetermined model parameter such that a product of the calculated identification gain and the error is minimized.

7. The control apparatus as claimed in claim 1, wherein the controlled object has a second or higher order lag characteristic as the dynamic characteristic, and wherein the at least one model parameter comprises N model parameters (N represents an integer not smaller than 2), the control apparatus further comprising reference parameter-detecting means for detecting a reference parameter which influences the lag characteristic, wherein said identification means comprises:

weight function value-calculating means for calculating, according to the detected reference parameter, M weight function values (M represents an integer not smaller than 2) associated with the reference parameter;

range identification error vector-calculating means for calculating M first products by multiplying the error by the calculated M weight function values, and calculating M range identification error vectors each composed of N range identification errors as elements, using the M first products;

modification value vector-calculating means for calculating M modification value vectors each composed of N modification values as elements such that the calculated M range identification error vectors are each minimized; and model parameter vector-identifying means for calculating M second product vectors each composed of N second products as elements by multiplying the M modification value vectors by the M weight function values, respectively, and identifying onboard a model parameter vector which is composed of the N model parameters as elements, using a total sum of the M second product vectors, and wherein the M weight function values are associated with M ranges of the reference parameter, respectively, the M weight function values each being set to values other than 0 in an associated range and set to 0 in ranges other than the associated range, and adjacent ones of the M ranges overlap each other.

8. The control apparatus as claimed in claim 7, wherein said identification means further comprises identification gain vector-calculating means for calculating an identification gain vector which is composed of N identification gains as elements, according to the control input and the controlled variable, and wherein said range identification error vector-calculating means calculates products of the calculated identification gain vector and the M first products, as the M range identification error vectors.

9. The control apparatus as claimed in claim 1, wherein the controlled object has a second or higher order lag characteristic as the dynamic characteristics, and wherein the at least one model parameter comprises N model parameters (N represents an integer not smaller than 2), the control apparatus further comprising:

first reference parameter-detecting means for detecting a first reference parameter which influences the lag characteristic; and second reference parameter-detecting means for detecting a second reference parameter which influences the lag characteristic, and wherein said identification means comprises:

reference model parameter vector-calculating means for calculating, according to the detected first reference parameter, a reference model parameter vector which is composed of N reference model parameters as elements, which are reference values of the N model parameters;

weight function value-calculating means for calculating, according to the detected second reference parameter, M weight function values (M represents an integer not smaller than 2) associated with the second reference parameter;

range identification error vector-calculating means for calculating M first products by multiplying the error by the calculated M weight function values, and calculating M range identification error vectors each composed of N range identification errors as elements, using the M first products;

modification value vector-calculating means for calculating M modification value vectors each composed of N modification values as elements such that the calculated M range identification error vectors are each minimized;

model parameter vector-identifying means for calculating M second product vectors each composed of N second products as elements by multiplying the M modification value vectors by the M weight function values, respectively, and identifying onboard a model parameter vector which is composed of the N model parameters as elements by adding a total sum of the M second product vectors to the reference model parameter vector, and wherein the M weight function values are associated with M ranges of the second reference parameter, respectively, the M weight function values each being set to values other than 0 in an associated range and set to 0 in ranges other than the associated range, and adjacent ones of the M ranges overlap each other.

10. The control apparatus as claimed in claim 9, wherein said identification means further comprises identification gain vector-calculating means for calculating an identification gain vector which is composed of N identification gains as elements, according to the control input and the controlled variable, and wherein said range identification error vector-calculating means calculates products of the calculated identification gain vector and the M first products, as the M range identification error vectors.

11. The control apparatus as claimed in claim 1, wherein said control input-calculating means calculates the control input with a control algorithm derived based on one of a sensitivity function, a complementary sensitivity function, and a transfer function that are set such that a predetermined frequency characteristic is obtained, and the control target model.

12. A control apparatus for controlling a controlled variable of a controlled object having a first or higher order lag characteristic by a control input, comprising:

reference parameter-detecting means for detecting a reference parameter which influences the lag characteristic;

weight function value-calculating means for calculating, according to the detected reference parameter, M weight function values (M represents an integer not smaller than 2) associated with the reference parameter;

estimated controlled variable-calculating means for calculating an estimated controlled variable, which is an estimated value of the controlled variable, using a control target model of a discrete-time system defining a relationship between the controlled variable and the control input of the controlled object;

error-calculating means for calculating an error between the calculated estimated controlled variable and the controlled variable;

range identification error-calculating means for calculating M first products by multiplying the calculated error by the calculated M weight function values, and calculating M range identification errors using the M first products;

modification value-calculating means for calculating M modification values such that the calculated M range identification errors are each minimized;

identification means for calculating M second products by multiplying the calculated M modification values by the M weight function values, respectively, and identifying onboard a model parameter of the control target model using a total sum of the M second products; and control input-calculating means for calculating the control input using the identified model parameter and a control algorithm derived based on the control target model, wherein the M weight function values are associated with M ranges of the reference parameter, respectively, the M weight function values each being set to values other than 0 in an associated range and set to 0 in ranges other than the associated range, and adjacent ones of the M ranges overlap each other.

13. The control apparatus as claimed in claim 12, wherein the control target model includes N model parameters (N represents an integer not smaller than 2), wherein said range identification error-calculating means calculates M range identification error vectors each composed of N values as elements, as the M range identification errors, wherein said modification value-calculating means calculates M modification value vectors each composed of N values as elements, as the M modification values, wherein said identification means calculates M second product vectors each composed of N values as elements, as the M second products, by multiplying the M modification value vectors by the M weight function values, respectively, and identifies onboard a model parameter vector which is composed of the N model parameters as elements, using a total sum of the M second product vectors, and wherein said control input-calculating means calculates the control input using the identified model parameter vector and the control algorithm.

14. The control apparatus as claimed in claim 13, further comprising identification gain vector-calculating means for calculating an identification gain vector which is composed of N identification gains as elements, according to the control input and the controlled variable, and wherein said range identification error-calculating means calculates products of the calculated identification gain vector and the M first products as the M range identification error vectors.

15. The control apparatus as claimed in claim 12, further comprising identification gain-calculating means for calculating an identification gain according to the control input and the controlled variable, and wherein said range identification error-calculating means calculates products of the calculated identification gain and the M first products, as the M range identification errors.

16. The control apparatus as claimed in claim 12, wherein the control algorithm is derived based on not only the control target model, but also one of a sensitivity function, a complementary sensitivity function, and a transfer function that are set such that a predetermined frequency characteristic is obtained.

17. A control apparatus for controlling a controlled variable of a controlled object having a first or higher order lag characteristic, by a control input, comprising:

first reference parameter-detecting means for detecting a first reference parameter which influences the lag characteristic;

second reference parameter-detecting means for detecting a second reference parameter which influences the lag characteristic;

reference model parameter-calculating means for calculating, according to the detected first reference parameter, a reference model parameter as a reference value of a model parameter of the control target model;

weight function value-calculating means for calculating, according to the detected second reference parameter, M weight function values (M represents an integer not smaller than 2) associated with the second reference parameter;

estimated controlled variable-calculating means for calculating an estimated controlled variable which is an estimated value of the controlled variable using a control target model of a discrete-time system defining a relationship between the controlled variable and the control input of the controlled object;

error-calculating means for calculating an error between the calculated estimated controlled variable and the controlled variable;

range identification error-calculating means for calculating M first products by multiplying the calculated error by the calculated M weight function values, and calculating M range identification errors using the M first products;

modification value-calculating means for calculating M modification values such that the calculated M range identification errors are each minimized;

identification means for calculating M second products by multiplying the M calculated modification values by the M weight function values, respectively, and identifying onboard the model parameter by adding a total sum of the M second products to the calculated reference model parameter; and control input-calculating means for calculating the control input using the identified model parameter and a control algorithm derived based on the control target model, wherein the M weight function values are associated with M ranges of the first reference parameter, respectively, the M weight function values each being set to values other than 0 in an associated range and set to 0 in ranges other than the associated range, and adjacent ones of the M ranges overlap each other.

18. The control apparatus as claimed in claim 17, wherein the control target model includes N model parameters (N represents an integer not smaller than 2), wherein said reference model parameter-calculating means calculates a reference model parameter vector which is composed of N reference model parameters as elements, which are reference values of the N model parameters, wherein said range identification error-calculating means calculates M range identification error vectors each composed of N values as elements, as the M range identification errors;

wherein said modification value-calculating means calculates M modification value vectors each composed of N values as elements, as the M modification values;

wherein said identification means calculates M second product vectors each composed of N values as elements, as the M second products, by multiplying the M modification value vectors by the M weight function values, respectively, and identifies onboard a model parameter vector which is composed of the N model parameters as elements, by adding a total sum of the M second product vectors to the reference model parameter vector, and wherein said control input-calculating means calculates the control input using the identified model parameter vector and the control algorithm.

19. The control apparatus as claimed in claim 18, wherein the N reference model parameters include a plurality of reference model parameters defined such that a predetermined restraint condition is satisfied, and one of the plurality of reference model parameters is calculated according to the first reference parameter.

20. The control apparatus as claimed in claim 18, further comprising identification gain vector-calculating means for calculating an identification gain vector which is composed of N identification gains as elements, according to the control input and the controlled variable, and wherein said range identification error-calculating means calculates products of the calculated identification gain vector and the M first products as the M range identification error vectors.

21. The control apparatus as claimed in claim 17, further comprising identification gain-calculating means for calculating an identification gain according to the control input and the controlled variable, and wherein said range identification error-calculating means calculates products of the calculated identification gain and the M first products, as the M range identification errors.

22. A control apparatus for controlling a controlled variable of a controlled object having a first or higher order lag characteristic by a control input, comprising:

reference parameter-detecting means for detecting a reference parameter which influences the lag characteristic;

reference model parameter-calculating means for calculating N reference model parameters as reference values of the N model parameters (N represents an integer not smaller than 2) in a control target model of a discrete-time system which represents a dynamic characteristic of the controlled object, according to the detected reference parameter;

estimated controlled variable-calculating means for calculating an estimated controlled variable which is an estimated value of the controlled variable, using the control target model;

error-calculating means for calculating an error between the calculated estimated controlled variable and the controlled variable;

modification value-calculating means for calculating N modification values associated with the N reference model parameters, respectively, such that the calculated error is minimized;

identification means for identifying onboard the N model parameters by adding the calculated N modification values to the N reference model parameters, respectively; and control input-calculating means for calculating a control input for controlling the controlled variable using the identified N model parameters and a control algorithm derived based on the control target model, wherein said reference model parameter-calculating means calculates one of the N reference model parameters according to the detected reference parameter, and calculates the reference model parameters other than the one reference model parameter such that a predetermined restraint condition is satisfied between the one reference model parameter and the other reference model parameters.

* * * * *